United States Patent
Wigren et al.

(10) Patent No.: US 12,360,198 B2
(45) Date of Patent: Jul. 15, 2025

(54) INITIALIZING STATE ESTIMATION FOR AERIAL USER EQUIPMENT (UES) OPERATING IN A WIRELESS NETWORK

(71) Applicant: Telefonaktiebolaget LM Ericsson (publ), Stockholm (SE)

(72) Inventors: Torbjörn Wigren, Uppsala (SE); Sholeh Yasini, Sundbyberg (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 303 days.

(21) Appl. No.: 18/020,116

(22) PCT Filed: Sep. 18, 2020

(86) PCT No.: PCT/SE2020/050871
§ 371 (c)(1),
(2) Date: Feb. 7, 2023

(87) PCT Pub. No.: WO2022/060263
PCT Pub. Date: Mar. 24, 2022

(65) Prior Publication Data
US 2023/0273287 A1   Aug. 31, 2023

(51) Int. Cl.
*G01S 5/02* (2010.01)
*H04W 64/00* (2009.01)

(52) U.S. Cl.
CPC ........ *G01S 5/0294* (2013.01); *G01S 5/02213* (2020.05); *H04W 64/006* (2013.01);
(Continued)

(58) Field of Classification Search
CPC . G01S 5/0294; G01S 5/02213; H04W 64/006
(Continued)

(56) References Cited

U.S. PATENT DOCUMENTS

| | | |
|---|---|---|
| 2018/0206075 A1 | 7/2018 | Demirdag et al. |
| 2019/0028950 A1 | 1/2019 | Triolo et al. |
| 2020/0059832 A1* | 2/2020 | Wang ............. H04W 36/00 |

FOREIGN PATENT DOCUMENTS

| | | |
|---|---|---|
| CN | 107205225 A | 9/2017 |
| CN | 109990786 A | 7/2019 |

(Continued)

OTHER PUBLICATIONS

Wigren, Torbjörn, "LTE Fingerprinting Localization with Altitude", Proc. IEEE VTC2012 Fall, Quebec City, Canada, Sep. 3-6, 2012, pp. 1-5.
(Continued)

*Primary Examiner* — Harry K Liu
(74) *Attorney, Agent, or Firm* — Murphy, Bilak & Homiller, PLLC

(57) ABSTRACT

Embodiments include methods for estimating movement of an aerial user equipment (UE) by a first RAN node serving the aerial UE in a cell of the RAN. Such methods include determining initialization parameters for an interacting multiple-model (IMM) for movement of the aerial UE in the cell. The initialization parameters include a plurality of neighbor cells, in the RAN, in which positioning measurements should be performed for the aerial UE, and/or for at least one movement mode of the IMM, an initial state comprising a plurality of initial position estimates for the aerial UE. Such methods include determining a movement state for the aerial UE at a first time based on the initialization parameters and positioning measurements of the aerial UE that are performed in the cell and in at least a portion of the neighbor cells. Other embodiments include complementary methods for a second RAN node.

24 Claims, 22 Drawing Sheets

(52) U.S. Cl.
CPC ... *G01S 2205/003* (2013.01); *G01S 2205/008* (2013.01); *G01S 2205/03* (2020.05)

(58) Field of Classification Search
USPC .......................................................... 342/451
See application file for complete search history.

(56) References Cited

FOREIGN PATENT DOCUMENTS

| | | |
|---|---|---|
| CN | 111356075 A | 6/2020 |
| WO | 2012155219 A1 | 11/2012 |
| WO | WO-2021089833 A1 * 5/2021 ........... H04B 17/309 |

OTHER PUBLICATIONS

Wigren, Torbjörn, et al., "RTT Positioning in WCDMA", Proc 5th International Conference on Wireless and Mobile Communications, Cannes, France, 2009, pp. 303-308.

Wigren, Torbjörn, "Wireless Hybrid Positioning Based on Surface Modeling with Polygon Support", Proc. VTC 2018 Spring, Porto, Portugal, Jun. 2018, pp. 1-7.

* cited by examiner

INITIALIZING STATE ESTIMATION FOR AERIAL USER EQUIPMENT (UES) OPERATING IN A WIRELESS NETWORK

TECHNICAL FIELD

The present disclosure generally relates to wireless networks, and particularly relates to estimating movement states for airborne user equipment (also referred to as "aerial UEs" or "drones") that communicate with their operators via a wireless network (e.g., cellular network).

BACKGROUND

Long Term Evolution (LTE) is an umbrella term for so-called fourth generation (4G) radio access technologies developed within the Third-Generation Partnership Project (3GPP) and initially standardized in Release 8 (Rel-8) and Release 9 (Rel-9), also known as Evolved Universal Mobile Telecommunications System (UMTS) Terrestrial Radio Access Network (UTRAN) (E-UTRAN). LTE is targeted at various licensed frequency bands and is accompanied by improvements to non-radio aspects commonly referred to as System Architecture Evolution (SAE), which includes Evolved Packet Core (EPC) network. LTE continues to evolve through subsequent releases that are developed according to standards-setting processes with 3GPP and its working groups (WGs), including the Radio Access Network (RAN) WG, and sub-working groups (e.g., RAN1, RAN2, etc.).

LTE Rel-10 supports bandwidths larger than 20 MHz. One important requirement on Rel-10 is backward compatibility with LTE Rel-8. This also includes spectrum compatibility in which a wideband LTE Rel-10 carrier (e.g., wider than 20 MHz) should appear as multiple carriers to an LTE Rel-8 ("legacy") terminal ("user equipment" or UE). Each such carrier can be referred to as a Component Carrier (CC). For efficient usage, legacy terminals can be scheduled in all parts of the wideband LTE Rel-10 carrier. This can be done by Carrier Aggregation (CA), in which a Rel-10 terminal receives multiple CCs, each having the same structure as a Rel-8 carrier. LTE Rel-12 introduced dual connectivity (DC) whereby a UE can be connected to two network nodes simultaneously, thereby improving connection robustness and/or capacity.

Communications between an LTE network and user equipment (UEs) is based on a multi-layer protocol stack that includes Physical (PHY), Medium Access Control (MAC), Radio Link Control (RLC), Packet Data Convergence Protocol (PDCP), and Radio Resource Control (RRC) layers. The multiple access scheme for the LTE PHY is based on Orthogonal Frequency Division Multiplexing (OFDM) with a cyclic prefix (CP) in the downlink (DL), e.g., E-UTRAN to user equipment (UE), and on Single-Carrier Frequency Division Multiple Access (SC-FDMA) with a cyclic prefix in the uplink (UL), e.g., UE to E-UTRAN. An LTE E-UTRAN comprises a plurality of evolved Node B's (eNBs), each of which communicates with UEs via one or more cells.

Currently the fifth generation ("5G") of cellular systems, also referred to as New Radio (NR), is being standardized within the Third-Generation Partnership Project (3GPP). NR is developed for maximum flexibility to support many different use cases. These include mobile broadband, machine type communication (MTC), ultra-low latency critical communications (URLCC), side-link device-to-device (D2D), and several other use cases. Fifth-generation NR technology shares many similarities with fourth-generation LTE, particularly in relation to the protocol layers and radio interface. In addition to providing coverage via cells, as in LTE, NR networks also provide coverage via "beams." In general, a DL "beam" is a coverage area of a network-transmitted reference signal (RS) that may be measured or monitored by a UE. UL beams are transmitted by UEs in a similar manner.

3GPP standards provide various ways for positioning (e.g., determining the position of, locating, and/or determining the location of) UEs operating in LTE networks. In general, an LTE positioning node (referred to as Evolved Serving Mobile Location Center, "E-SMLC" or "location server") configures a target device (e.g., UE), an eNB, and/or a radio network node dedicated for positioning measurements (e.g., a "location measurement unit" or "LMU") to perform one or more positioning measurements according to one or more positioning methods. For example, the positioning measurements can include timing (and/or timing difference) measurements on UE, network, and/or satellite transmissions. The positioning measurements are used by the target device (e.g., UE), the measuring node, and/or the E-SMLC to determine the location of the target device. UE positioning (also referred to as "location services" or LCS) is also expected to be an important feature for NR networks.

Airborne radio-controlled drones (i.e., unmanned aerial vehicles or UAVs for short) are becoming more and more common. Conventionally, drones have been limited to operate within the propagation range of radio signals from dedicated or associated controllers used by drone operators. However, recently functionality allowing drones to be remotely controlled over the cellular network has increased their range considerably. However, a recent trend is to extend drone operational range by attaching an LTE UE and coupling the UE to the drone's navigation system, thereby creating an "airborne UE" or "aerial UE". With this arrangement, the drone can be controlled over a much wider range covering multiple cells, limited primarily by the drone's battery capacity. In some markets, this is already being regulated, such as by requiring UEs attached to drones in this manner to be registered as aerial UEs. Even so, many operators fail (or refuse) to register their aerial UEs, such that these drones become "rogue drones". In the following, the terms "aerial UE" and "drone" are used interchangeably unless otherwise noted.

Aerial UEs need to be restricted in flight for various reasons. For example, aerial UEs may experience radio propagation conditions that are different than those experienced by a conventional UE on or close to the ground. When an aerial UE is flying at a low altitude relative to a base station antenna height, the aerial UE behaves like a conventional UE. When the aerial UE is flying well above the base station antenna height, however, the uplink signal from the aerial UE can be received by multiple (e.g., many) cells since the lack of obstructions at this height creates highly favorable (e.g., line-of-sight) propagation conditions.

As such, the uplink signal from the aerial UE can increase interference in neighbor cells. Increased interference negatively impacts conventional UEs (e.g., smartphones, Internet-of-Things (IoT) devices, etc.) on or near the ground. Thus, the network may need to limit the admission of aerial UE in the network to restrict the impact to the performance of the conventional UEs. Furthermore, because the base station antenna beam patterns are typically down-tilted (e.g., negative elevation angle) to serve UEs at or near ground level, conventional UEs typically receive from/transmit to the antenna pattern's main lobe. However, aerial UEs flying significantly above antenna height are likely served by the antenna pattern's side lobes, which can vary significantly within a small area. Accordingly, aerial UEs may experience sudden signal loss that can cause the operator to lose control of the drone.

Furthermore, aerial UEs can create hazardous situations when flying illegally in certain parts of the airspace. For example, rogue drones have endangered commercial air traffic by flying in restricted airspace near major airports, with many such events reported in both Europe and the U.S. In 2019 there were several such events that temporarily closed Heathrow, Gatwick, and Newark international airports. Other hazardous situations include entry into military restricted areas and airspace over densely populated areas where a crash would likely cause human injuries.

Accordingly, it can be beneficial to restrict and/or limit aerial UEs operating as "rogue drones" in such scenarios. Possible solutions include limiting, releasing, and/or disconnecting aerial UE communications with the network (e.g., E-UTRAN) and/or alerting relevant government authorities who can take appropriate action against rogue drone operation. A prerequisite for these and other solutions is network knowledge of the current position, speed, and directional bearing (collectively "state") of aerial UEs. Although conventional UEs can provide such information based on 3GPP LCS techniques, operators of aerial UEs often disable such features, leaving it up to the network to determine or estimate the current state of aerial UEs based on measurements made by the network.

Although there are existing techniques for estimating state of a moving object based on measurements, these have various problems, issues, and/or difficulties when applied to state estimation for aerial UEs or drones, particularly in relation to a drone's unique movement patterns.

SUMMARY

Embodiments of the present disclosure provide specific improvements to controlling aerial UEs engaged in unauthorized aerial operation (e.g., as "rogue drones"), such as by providing, enabling, and/or facilitating solutions to overcome exemplary problems summarized above and described in more detail below.

Some embodiments include methods (e.g., procedures) for estimating movement of an aerial user equipment (UE, e.g., drone). These exemplary methods can be implemented by a first radio access network (RAN) node (e.g., base station, eNB, gNB, ng-eNB, en-gNB, etc.) serving the aerial UE in a cell of the RAN (e.g., E-UTRAN, NG-RAN).

These exemplary methods can include determining initialization parameters for an interacting multiple-model (IMM) for movement of the aerial UE in the cell. The determined initialization parameters can include one or more of the following: a plurality of neighbor cells, in the RAN, in which positioning measurements should be performed for the aerial UE; and for at least one movement mode of the IMM, an initial state comprising a plurality of initial position estimates for the aerial UE. These exemplary methods can also include determining a movement state for the aerial UE at a first time based on the determined initialization parameters and positioning measurements of the aerial UE that are performed in the cell and in at least a portion of the neighbor cells.

In some embodiments, the determining operations can include selecting the plurality of neighbor cells in the RAN based on one or more of the following criteria:

least distance from the center of the cell serving the aerial UE;
antenna coverage in the direction of the center of the cell serving the aerial UE; and
randomly from a number of suitable neighbor cells that is greater than the plurality.

In some embodiments, these exemplary methods can also include receiving, at each of one or more second times, positioning measurements for the aerial UE performed in at least a portion of the neighbor cells; and selecting a subset of the neighbor cells based on one or more of the following: likelihood that each neighbor cell will report positioning measurements for the aerial UE; and quality of received positioning measurements performed in each neighbor cell. In some of these embodiments, these exemplary methods can also include determining further initialization parameters, for the IMM, that includes the selected subset of the plurality of neighbor cells that were included in the initialization parameters.

In various embodiments, the positioning measurements can include measurements of one or more of the following: range or distance between the UE and an antenna for the cell; range and distance between the UE and respective antennas for the neighbor cells; and range rate or Doppler shift between the UE and respective antennas for the cell and the neighbor cells. In some of these embodiments, the plurality of neighbor cells can include at least three neighbor cells and the positioning measurements only include range rate or Doppler shift between the UE and the respective antennas.

In some embodiments, the IMM model can include the following features:
a first model, including an almost-constant velocity model with a Doppler shift bias state,
a second model, including at least one maneuver model with a Doppler shift bias state, and
estimated probabilities associated with the first and second models.

In some embodiments, the IMM can also include a Hidden Markov Model (HMM) comprising respective transition probabilities of the aerial UE between any of the first and second models during successive updates of the movement state. Each transition probability can be dependent on the duration between successive updates of the movement state.

In some of these embodiments, the determining operations can include determine first and second movement states for the aerial UE based on the respective first and second models; and combining the first and second movement states according to estimated probabilities associated with the first and second models. In some of these embodiments, the first and second movement states can be determined using respective extended Kalman filters (EKFs).

In some of these embodiments, the second maneuver model can include a plurality of maneuver models associated with a respective plurality of initial position estimates and a respective plurality of estimated probabilities. In such embodiments, the determining operations can include determining states for the respective maneuver models at the first time based on the positioning measurements and the respective initial position estimates.

In some of these embodiments, these exemplary methods can also include determining movement states for the aerial UE at a plurality of second times after the first time, including updated states for the first model and for the respective (plurality of) maneuver models; and subsequently determining respective sums of the updated estimated probability associated with the first model and the updated estimated probabilities associated with the respective maneuver models. These embodiments can also include selecting one of the maneuver models that has a sum within a threshold difference from unity, and determine a movement state for the aerial UE at a third time after the second times, including updated states only for the first model and the selected maneuver model.

In some of these embodiments the determining operations can also include selecting the plurality of initial position estimates for the plurality of maneuver models based on one or more of the following criteria:
 the center of the cell serving the aerial UE;
 randomly from a coordinate space of the cell serving the aerial UE;
 a deterministic grid of points in the coordinate space of the cell serving the aerial UE; and
 a deterministic grid of points near boundaries of the cell serving the aerial UE.

In some of these embodiments, the plurality of initial position estimates can include a first number of points selected from the deterministic grid of points near boundaries of the cell serving the aerial UE, and a second number of points selected according to a different one of the criteria listed above.

In some of these embodiments, the plurality of maneuver models can also be associated with a respective plurality of initial covariance matrices. In such embodiments, the determining operations can include determining initial covariance matrices for the respective maneuver models at the first time based on one or more of the following: radius of the cell serving the aerial UE, maximum altitude of the aerial UE, maximum velocity of the aerial UE, and maximum acceleration of the aerial UE.

In some embodiments, these exemplary methods can also include sending respective state estimation initialization messages to one or more neighbor RAN nodes serving the plurality of neighbor cells; receiving respective state estimation reports from the one or more neighbor RAN nodes; and receiving, from the one or more neighbor RAN nodes, respective measurement reports including the positioning measurements for the aerial UE performed in at least a portion of the neighbor cells.

In some embodiments, each state estimation initialization message can include one or more of the following: an identifier of the serving cell; scrambling code associated with the aerial UE's uplink (UL) transmission in the serving cell; and timing alignment of the aerial UE's UL transmissions in relation to the serving cell.

In some embodiments, the determining operations can include selecting the plurality of neighbor cells in the RAN based on the state estimation reports. For example, each state estimation report can include one or more of the following for at least one neighbor cell: identifier of the neighbor cell, type of antenna used for the neighbor cell, geographic location of the antenna for the neighbor cell, direction or orientation of the antenna for the neighbor cell, and downlink transmission power used in the neighbor cell.

In some embodiments, each state estimation initialization message can be sent and each state estimation report can be received a standardized message, a vendor-specific private message, or a vendor-specific information element in a standardized message.

In some embodiments, the movement state for the aerial UE can include one or more of the following:
 three-dimensional position relative to mean sea level;
 three-dimensional position relative to local ground level;
 two-dimensional position;
 three-dimensional velocity; and
 two-dimensional velocity.

In some embodiments, the movement state for the aerial UE can also include a Doppler shift bias.

Other embodiments include methods (e.g., procedures) for second RAN nodes. These exemplary methods can be implemented by a second RAN node (e.g., base station, eNB, gNB, ng-eNB, en-gNB, etc.) serving one or more neighbor cells of a cell serving an aerial UE in the RAN (e.g., E-UTRAN, NG-RAN).

These exemplary methods can include receiving, from a first RAN node serving the cell, a state estimation initialization message indicating that positioning measurements should be made for the aerial UE in the one or more neighbor cells. These exemplary methods can also include sending, to the first RAN node, a state estimation report including one or more of the following for each of the one or more neighbor cells: identifier of the neighbor cell, type of antenna used for the neighbor cell, geographic location of the antenna for the neighbor cell, direction or orientation of the antenna for the neighbor cell, and downlink transmission power used in the neighbor cell.

In some embodiments, these exemplary methods can also include performing the positioning measurements for the aerial UE in the one or more neighbor cells; and sending, to the first RAN node, a measurement report including the positioning measurements for the aerial UE in the one or more neighbor cells.

In various embodiments, the state estimation initialization message, the state estimation report, the positioning measurements, and the measurement report can have any of the characteristics summarized above in relation to first RAN node embodiments. In some embodiments, performing the positioning measurements can be based on the information received in the state estimation initialization message.

Other embodiments include RAN nodes (e.g., base stations, eNBs, gNBs, ng-eNBs, en-gNBs, etc. or components thereof) configured to perform operations corresponding to any of the exemplary methods described herein. Other embodiments include non-transitory, computer-readable media storing program instructions that, when executed by processing circuitry, configure such RAN nodes to perform operations corresponding to any of the exemplary methods described herein.

These and other objects, features, and advantages of embodiments disclosed herein will become apparent upon reading the following Detailed Description in view of the Drawings briefly described below.

BRIEF DESCRIPTION OF THE DRAWINGS

FIG. 17, which includes

FIG. 21, which includes

DETAILED DESCRIPTION

Figure 1:
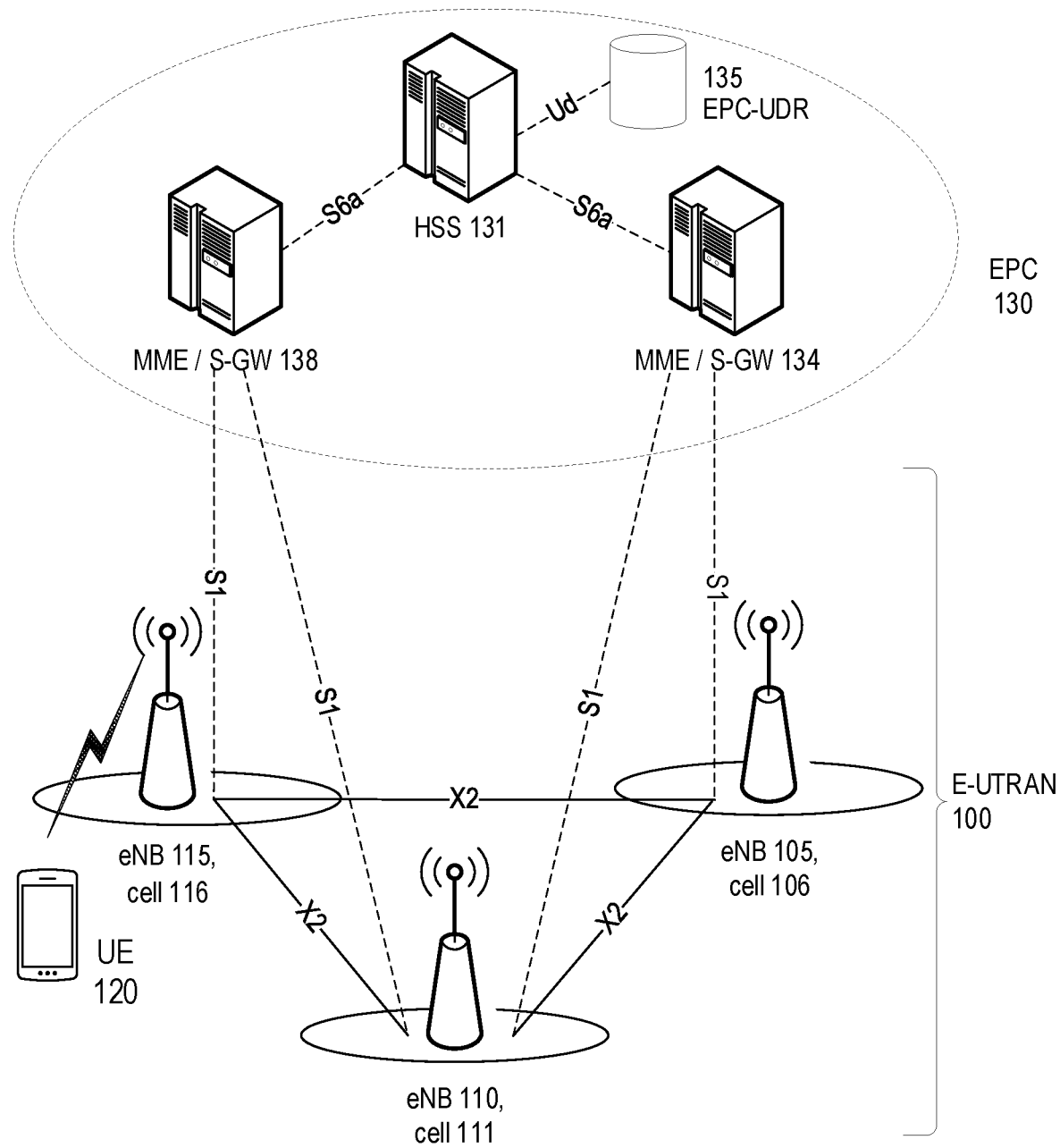
FIG. 1 is a high-level block diagram of an exemplary architecture of the Long-Term Evolution (LTE) Evolved UTRAN (E-UTRAN) and Evolved Packet Core (EPC) network, as standardized by 3GPP.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided as examples to convey the scope of the subject matter to those skilled in the art.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods and/or procedures disclosed herein do not have to be performed in the exact order disclosed, unless a step is explicitly described as following or preceding another step and/or where it is implicit that a step must follow or precede another step. Any feature of any of the embodiments disclosed herein can be applied to any other embodiment, wherever appropriate. Likewise, any advantage of any of the embodiments can apply to any other embodiments, and vice versa. Other objects, features, and advantages of the enclosed embodiments will be apparent from the following description.

Furthermore, the following terms are used throughout the description given below:

Radio Node: As used herein, a "radio node" can be either a "radio access node" or a "wireless device."

Radio Access Node: As used herein, a "radio access node" (or equivalently "radio network node," "radio access network node," or "RAN node") can be any node in a radio access network (RAN) of a cellular communications network that operates to wirelessly transmit and/or receive signals. Some examples of a radio access node include, but are not limited to, a base station (e.g., a New Radio (NR) base station (gNB) in a 3GPP Fifth Generation (5G) NR network or an enhanced or evolved Node B (eNB) in a 3GPP LTE network), base station distributed components (e.g., Centralized Unit (CU) and Distributed Unit (DU)), a high-power or macro base station, a low-power base station (e.g., micro, pico, femto, or home base station, or the like), an integrated access backhaul (IAB) node, a transmission point (TP), a transmission reception point (TRP), a remote radio unit (RRU) or Remote Radio Head (RRH), and a relay node.

Core Network Node: As used herein, a "core network node" is any type of node in a core network. Some examples of a core network node include, e.g., a Mobility Management Entity (MME), a serving gateway (SGW), a Packet Data Network (PDN) Gateway (P-GW), a Policy and Charging Rules Function (PCRF), an access and mobility management function (AMF), a session management function (SMF), a user plane function (UPF), a Charging Function (CHF), a Policy Control Function (PCF), an Authentication Server Function (AUSF), a location management function (LMF), or the like.

Wireless Device: As used herein, a "wireless device" (or "WD" for short) is any type of device that has access to (i.e., is served by) a cellular communications network by communicate wirelessly with network nodes and/or other wireless devices. Communicating wirelessly can involve transmitting and/or receiving wireless signals using electromagnetic waves, radio waves, infrared waves, and/or other types of signals suitable for conveying information through air. Unless otherwise noted, the term "wireless device" is used interchangeably herein with "user equipment" (or "UE" for short). Some examples of a wireless device include, but are not limited to, smart phones, mobile phones, cell phones, voice over IP (VoIP) phones, wireless local loop phones, desktop computers, personal digital assistants (PDAs), wireless cameras, gaming consoles or devices, music storage devices, playback appliances, wearable devices, wireless endpoints, mobile stations, tablets, laptops, laptop-embedded equipment (LEE), laptop-mounted equipment (LME), smart devices, wireless customer-premise equipment (CPE), mobile-type communication (MTC) devices, Internet-of-Things (IoT) devices, vehicle-mounted wireless terminal devices, aerial UEs (or drones), etc.

Network Node: As used herein, a "network node" is any node that is either part of the radio access network (e.g., a radio access node or equivalent name discussed above) or of the core network (e.g., a core network node discussed above) of a cellular communications network. Functionally, a network node is equipment capable, configured, arranged, and/or operable to communicate directly or indirectly with a wireless device and/or with other network nodes or equipment in the cellular communications network, to enable and/or provide wireless access to the wireless device, and/or to perform other functions (e.g., administration) in the cellular communications network.

Base station: As used herein, a "base station" may comprise a physical or a logical node transmitting or controlling the transmission of radio signals, e.g., eNB, gNB, ng-eNB, en-gNB, centralized unit (CU)/distributed unit (DU), transmitting radio network node, transmission point (TP), transmission reception point (TRP), remote radio head (RRH), remote radio unit (RRU), Distributed Antenna System (DAS), relay, etc.

Positioning node: As used herein, "positioning node" can refer to a network node with positioning functionality, e.g., ability to provide assistance data, request positioning measurements, calculate a location based on positioning measurements, and/or provide a calculated location to other network nodes or to an external client.

Positioning signals: As used herein, "positioning signals" may include any signal or channel to be received by a UE or a network node for performing a positioning measurement such as a DL reference signal, Positioning Reference Signals (PRS), Synchronization Signal Block (SSB), synchronization signal, Demodulation Reference Signal (DM-RS), Channel State Information Reference Signal (CSI-RS), Sounding Reference Signal (SRS), satellite signal, etc.

Positioning measurements: As used herein, "positioning measurements" may include timing measurements (e.g., time difference of arrival, TDOA, RSTD, time-of-arrival, TOA, Rx-Tx time difference, Round Trip Time (RTT), etc.), power-based measurements (e.g., reference signal received power (RSRP), reference signal received quality (RSRQ), signal-to-interference-plus-noise ratio (SINR), path loss, etc.), identifier detection/measurement (e.g., cell ID, beam ID, etc.), and/or other sensor measurement (e.g., barometric pressure) that are configured for a positioning method (e.g., OTDOA, Enhanced Cell ID, E-CID, Assisted GNSS, A-GNSS, etc.). UE positioning measurements may be reported to a network node or may be used for positioning purposes by the UE.

Position measurement: As used herein, "position measurement" (or equivalent "location result") is an estimated position or location of an entity (e.g., UE) that is computed from positioning measurements.

The above definitions are not meant to be exclusive. In other words, various ones of the above terms may be explained and/or described elsewhere in the present disclosure using the same or similar terminology. Nevertheless, to the extent that such other explanations and/or descriptions conflict with the above definitions, the above definitions should control.

Note that the description given herein focuses on a 3GPP cellular communications system and, as such, 3GPP terminology or terminology similar to 3GPP terminology is oftentimes used. However, the concepts disclosed herein are not limited to a 3GPP system. Furthermore, although the term "cell" is used herein, it should be understood that (particularly with respect to 5G NR) beams may be used instead of cells and, as such, concepts described herein apply equally to both cells and beams.

As briefly mentioned above, there are existing techniques for estimating state of a moving object based on measurements; these have various problems, issues, and/or difficulties when applied to state estimation for aerial UEs or drones, particularly in relation to a drone's unique movement patterns. This is discussed in more detail after the following discussion of LTE and 5G/NR network architectures and LTE and NR positioning architectures.

An overall exemplary architecture of a network comprising LTE and SAE is shown in FIG. 1. E-UTRAN 100 includes one or more evolved Node B's (eNB), such as eNBs 105, 110, and 115, and one or more user equipment (UE), such as UE 120. As used within the 3GPP standards, "user equipment" or "UE" means any wireless communication device (e.g., smartphone or computing device) that is capable of communicating with 3GPP-standard-compliant network equipment, including E-UTRAN as well as UTRAN and/or Global System for Mobile Communications (GSM) Enhanced Data rates for GSM Evolution (EDGE) Radio Access Network (GERAN), as the third-generation ("3G") and second-generation ("2G") 3GPP RANs are commonly known.

As specified by 3GPP, E-UTRAN 100 is responsible for all radio-related functions in the network, including radio bearer control, radio admission control, radio mobility control, scheduling, and dynamic allocation of resources to UEs (e.g., UE 120) in uplink and downlink, as well as security of the communications with UEs. These functions reside in the eNBs, such as eNBs 105, 110, and 115. Each of the eNBs can serve a geographic coverage area including one more cells, including cells 106, 111, and 116 served by eNBs 105, 110, and 115, respectively.

The eNBs in the E-UTRAN communicate with each other via the X2 interface, as shown in FIG. 1. The eNBs also are responsible for the E-UTRAN interface to the EPC 130, specifically the S1 interface to the Mobility Management Entity (MME) and the Serving Gateway (SGW), shown collectively as MME/S-GWs 134 and 138 in FIG. 1. Generally speaking, the MME/S-GW handles both the overall control of the UE and data flow between the UE and the rest of the EPC. More specifically, the MME processes the signaling (e.g., control plane) protocols between the UE and the EPC, which are known as the Non-Access Stratum (NAS) protocols. The SGW handles all Internet Protocol (IP) data packets (e.g., data or user plane) between the UE and the EPC and serves as the local mobility anchor for the data bearers when UE 120 moves between eNBs, such as eNBs 105, 110, and 115.

EPC 130 can also include a Home Subscriber Server (HSS) 131, which manages user- and subscriber-related information. HSS 131 can also provide support functions in mobility management, call and session setup, user authentication and access authorization. The functions of HSS 131 can be related to the functions of legacy Home Location Register (HLR) and Authentication Centre (AuC) functions or operations. HSS 131 can also communicate with MME/S-GWs 134 and 138 via respective S6a interfaces.

In some embodiments, HSS 131 can communicate with a user data repository (UDR)-labelled EPC-UDR 135 in FIG. 1—via a Ud interface. EPC-UDR 135 can store user credentials after they have been encrypted by AuC algorithms. These algorithms are not standardized (i.e., vendor-specific), such that encrypted credentials stored in EPC-UDR 135 are inaccessible by any other vendor than the vendor of HSS 131.

Figure 2A:
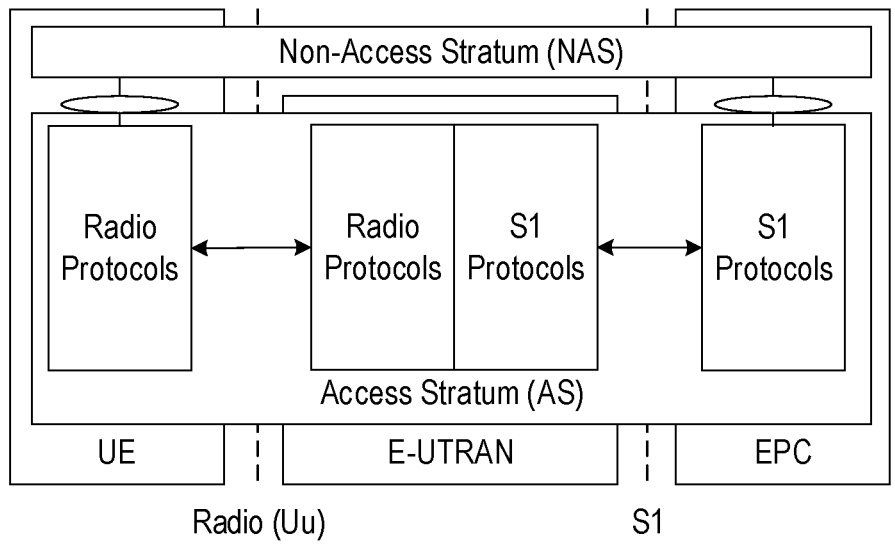
FIG. 2A is a high-level block diagram of an exemplary E-UTRAN architecture in terms of its constituent components, protocols, and interfaces.

FIG. 2A shows a high-level block diagram of an exemplary LTE architecture in terms of its constituent entities—UE, E-UTRAN, and EPC—and high-level functional division into the Access Stratum (AS) and the Non-Access Stratum (NAS). FIG. 2A also illustrates two particular interface points, namely Uu (UE/E-UTRAN Radio Interface) and S1 (E-UTRAN/EPC interface), each using a specific set of protocols, i.e., Radio Protocols and S1 Protocols.

Figure 2B:
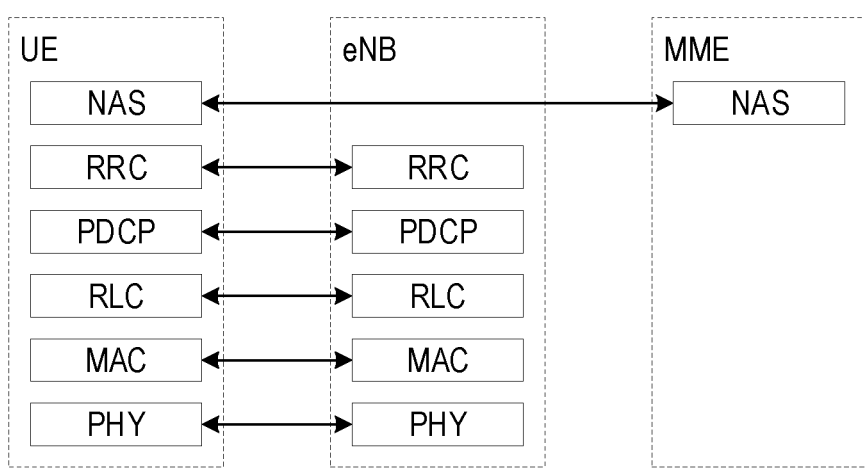
FIG. 2B is a block diagram of exemplary protocol layers of the control-plane portion of the radio (Uu) interface between a user equipment (UE) and the E-UTRAN.

FIG. 2B illustrates a block diagram of an exemplary Control (C)-plane protocol stack between a UE, an eNB, and an MME. The exemplary protocol stack includes Physical (PHY), Medium Access Control (MAC), Radio Link Control (RLC), Packet Data Convergence Protocol (PDCP), and Radio Resource Control (RRC) layers between the UE and eNB. The PHY layer is concerned with how and what characteristics are used to transfer data over transport channels on the LTE radio interface. The MAC layer provides data transfer services on logical channels, maps logical channels to PHY transport channels, and reallocates PHY resources to support these services. The RLC layer provides error detection and/or correction, concatenation, segmentation, and reassembly, reordering of data transferred to or from the upper layers. The PDCP layer provides ciphering/deciphering and integrity protection for both U-plane and C-plane, as well as other functions for the U-plane such as header compression. The exemplary protocol stack also includes non-access stratum (NAS) signaling between the UE and the MME.

The RRC layer controls communications between a UE and an eNB at the radio interface, as well as the mobility of a UE between cells in the E-UTRAN. After a UE is powered ON it will be in the RRC_IDLE state until an RRC connection is established with the network, at which time the UE will transition to RRC_CONNECTED state (e.g., where data transfer can occur). The LTE returns to RRC_IDLE after the connection with the network is released. In RRC_IDLE state, the UE's radio is active on a discontinuous reception (DRX) schedule configured by upper layers, During DRX active periods (also referred to as "DRX On durations"), an RRC_IDLE UE receives system information (SI) broadcast by a serving cell, performs measurements of neighbor cells to support cell reselection, and monitors a paging channel on PDCCH for pages from the EPC via eNB. A UE in RRC_IDLE state is known in the EPC and has an assigned IP address, but is not known to the serving eNB (e.g., there is no stored context).

Logical channel communications between a UE and an eNB are via radio bearers. Since LTE Rel-8, signaling radio bearers (SRBs) SRB0, SRB1, and SRB2 have been available for the transport of control plane (CP) messages including RRC and NAS. SRB0 is used for RRC connection setup, RRC connection resume, and RRC connection re-establishment. Once any of these operations has succeeded, SRB1 is used for handling RRC messages (which may include a piggybacked NAS message) and for NAS messages prior to establishment of SRB2. SRB2 is used for NAS messages and lower-priority RRC messages (e.g., logged measurement information). SRB0 and SRB1 are also used for establishment and modification of data radio bearers (DRBs) for carrying user plane (UP) data between the UE and eNB.

Figure 3:
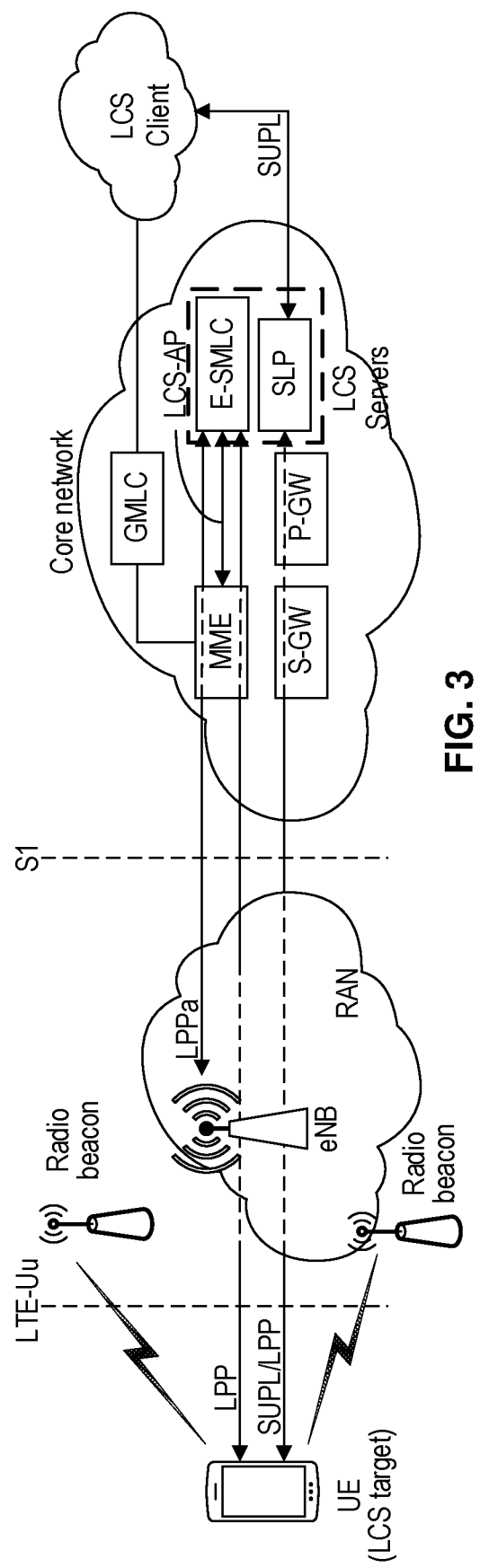
FIG. 3 illustrates a high-level architecture for supporting UE positioning in LTE networks.

FIG. 3 shows an exemplary positioning architecture within an LTE network. Three important functional elements of the LTE positioning architecture are LCS Client, LCS target, and LCS Server. The LCS Server is a physical or logical entity (e.g., as embodied by the E-SMLC or SLP in FIG. 3) that manages positioning for an LCS target (e.g., as embodied by the UE in FIG. 3) by collecting positioning measurements and other location information, assisting the terminal in positioning measurements when necessary, and estimating the LCS target location.

In general, LCS Servers are located in a Core Network (CN, e.g., EPC) and communicate with and/or via other CN nodes and/or functions such as MME, S-GW, and Packet Data Network Gateway (P-GW). The E-SMLC is responsible for control-plane (CP) positioning and communicates with various entities using different protocols. For example, E-SMLC communicates with MIME via LCS Application Protocol (LCS-AP), with the RAN (e.g., E-UTRAN) via LTE Positioning Protocol A (LPPa) (which can be transparent to MME), and with the LCS target via LTE Positioning Protocol (LPP) (which can be transparent to both RAN and MME). In contrast, the SLP is responsible for user-plane (UP) positioning procedures. The SLP communicates with the UE via LPP and/or secure user plane location (SUPL) protocols, which can be transparent to other UP entities including RAN, S-GW, and P-GW. The LTE radio interface between RAN and UE is also referred to as LTE-Uu.

An LCS Client is a software and/or hardware entity that interacts with an LCS Server for the purpose of obtaining location information for one or more LCS targets (i.e., the entities being positioned) such as the UE in FIG. 3. LCS Clients may also reside in the LCS targets themselves. An LCS Client sends a request to an LCS Server to obtain location information, and the LCS Server processes and serves the received requests and sends the positioning result and optionally a velocity estimate to the LCS Client. A positioning request can originate from the terminal or a network node or external client. For example, an external LCS client can communicate with SLP via SUPL and with E-SMLC via Gateway Mobile Location Centre (GMLC) and MME.

In the LTE architecture shown in FIG. 3, position calculation can be conducted, for example, by the LCS Server (e.g., E-SMLC or SLP) or by the LCS target (e.g., a UE). The former approach corresponds to the UE-assisted positioning mode when it is based on UE positioning measurements, whilst the latter corresponds to the UE-based positioning mode. The following positioning methods are supported in LTE:

Enhanced Cell ID (E-CID). Utilizes information to associate the UE with the geographical area of a serving cell, and then additional information to determine a finer granularity position. The following positioning measurements are supported for E-CID: Angle of Arrival (AoA) (base station only), UE Rx-Tx time difference, timing advance (TA) types 1 and 2, reference signal received power (RSRP), and reference signal received quality (RSRQ).

Assisted GNSS. The UE receives and measures Global Navigation Satellite System (GNSS) signals, supported by assistance information provided to the UE from E-SMLC.

OTDOA (Observed Time Difference of Arrival). The UE receives and measures LTE signals transmitted by the RAN (including eNBs and radio beacons), supported by assistance information provided to the UE from E-SMLC.

UTDOA (Uplink TDOA). The UE is requested to transmit a specific waveform that is detected by multiple location measurement units (LMUs, which may be standalone, co-located or integrated into an eNB) at known positions. These positioning measurements are forwarded to the E-SMLC for multilateration.

A Terrestrial Beacon System (TBS) may be used to further enhance the positioning methods based on radio signals received by an LCS target (e.g., UE). The TBS can include a network of ground-based transmitters that broadcast signals only for positioning purposes. These can include the (non-LTE) Metropolitan Beacon System (MBS) signals as well as LTE Positioning Reference Signals (PRS), discussed in more detail below.

In addition, one or more of the following positioning modes can be utilized in each of the positioning methods listed above:

UE-Assisted: The UE performs positioning measurements with or without assistance from the network and sends these measurements to the E-SMLC where the position calculation may take place.

UE-Based: The UE performs positioning measurements and calculates its own position with assistance from the network.

Standalone: The UE performs positioning measurements and calculates its own position without network assistance.

The detailed assistance data may include information about network node locations, beam directions, etc. The assistance data can be provided to the UE via unicast or via broadcast.

Figure 4:
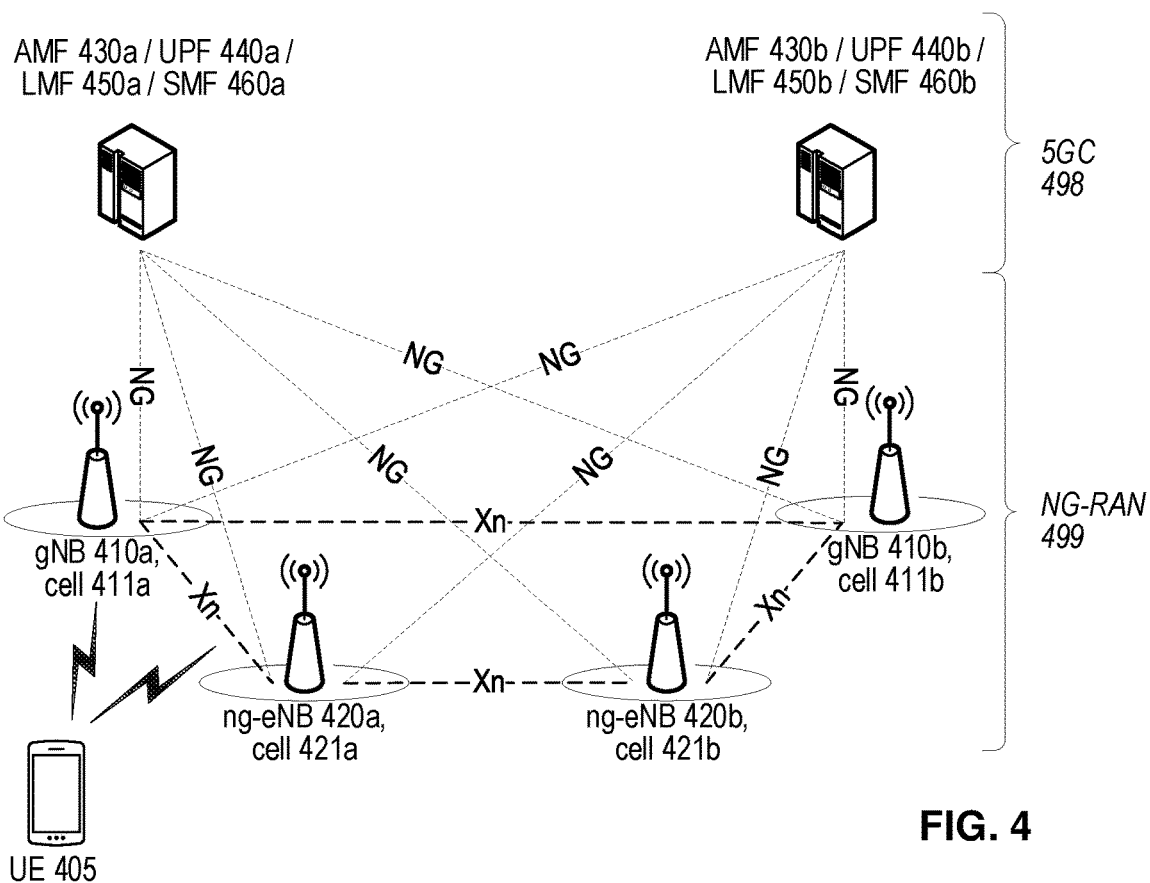
FIG. 4 shows a high-level view of an exemplary 5G network architecture, according to various exemplary embodiments of the present disclosure.

As mentioned above, positioning is also expected to be an important application for 5G networks. FIG. 4 shows a high-level view of an exemplary 5G network architecture, including a Next Generation Radio Access Network (NG-RAN) 499 and a 5G Core (5GC) 498. As shown in the figure, NG-RAN 499 can include gNBs 410 (e.g., 410a,b) and ng-eNBs 420 (e.g., 420a,b) that are interconnected with each other via respective Xn interfaces. The gNBs and ng-eNBs are also connected via the NG interfaces to 5GC 598, more specifically to the AMF (Access and Mobility Management Function) 430 (e.g., AMFs 430a,b) via respective NG-C interfaces and to the UPF (User Plane Function) 440 (e.g., UPFs 440a,b) via respective NG-U interfaces. Moreover, AMFs 430a,b and UPFs 440a,b can communicate with one or more location management functions (LMFs, e.g., LMFs 450a,b) and session management functions (SMFs, e.g., SMFs 460a,b). The AMFs, UPFs, LMFs, and SMFs are described further below.

Each of the gNBs 410 can support the NR radio interface including frequency division duplexing (FDD), time division duplexing (TDD), or a combination thereof. In contrast, each of ng-eNBs 420 can support the LTE radio interface but, unlike conventional LTE eNBs (such as shown in FIG. 1), can also connect to the 5GC via the NG interface. Each of the gNBs and ng-eNBs can serve a geographic coverage area including one or more cells, including cells 411a-b and 421a-b shown as exemplary in FIG. 4. As mentioned above, the gNBs and ng-eNBs can also use various directional beams to provide coverage in the respective cells. Depending on the particular cell in which it is located, a UE 405 can communicate with the gNB or ng-eNB serving that particular cell via the NR or LTE radio interface, respectively.

Each of the gNBs 410 may include and/or be associated with a plurality of Transmission Reception Points (TRPs). Each TRP is typically an antenna array with one or more antenna elements and is located at a specific geographical location. In this manner, a gNB associated with multiple TRPs can transmit the same or different signals from each of the TRPs. For example, a gNB can transmit different version of the same signal on multiple TRPs to a single UE. Each of the TRPs can also employ beams for transmission and reception towards the UEs served by the gNB, as discussed above.

UPFs 440a,b support handling of user plane traffic based on the rules received from SMFs 460a,b, including packet inspection and different enforcement actions (e.g., event detection and reporting). UPFs communicate with the RAN (e.g., NG-RAN) via the N3 reference point, with SMFs via the N4 reference point, and with an external packet data network (PDN) via the N6 reference point. The N9 reference point is for communication between two UPF s.

SMFs 460a,b interact with the decoupled traffic (or user) plane, including creating, updating, and removing Protocol Data Unit (PDU) sessions and managing session context with the UPF, e.g., for event reporting. For example, SMFs perform data flow detection (e.g., based on filter definitions included in Policy and Charging Control (PCC) rules), online and offline charging interactions, and policy enforcement.

AMFs 430a,b terminate the RAN CP interface and handle all mobility and connection management of UEs (similar to MME in EPC). AMFs communicate with UEs via the N1 reference point and with the RAN (e.g., NG-RAN) via the N2 reference point.

LMFs 450a,b support various functions related to determination of UE locations, including location determination for a UE and obtaining any of the following: DL positioning measurements or a location estimate from the UE; UL positioning measurements from the NG RAN; and non-UE associated assistance data from the NG RAN.

In a typical operation, an AMF can receive a request for a location service associated with a particular target UE from another entity (e.g., a gateway mobile location center (GMLC)), or the AMF itself can initiate some location service on behalf of a particular target UE (e.g., for an emergency call from the UE). The AMF then sends a location services (LS) request to the LMF. The LMF processes the LS request, which may include transferring assistance data to the target UE to assist with UE-based and/or UE-assisted positioning; and/or positioning of the target UE. The LMF then returns the result of the LS (e.g., a position estimate for the UE and/or an indication of any assistance data transferred to the UE) to the AMF or to another entity (e.g., GMLC) that requested the LS.

An LMF may have a signaling connection to an E-SMLC, enabling the LMF to access information from E-UTRAN, e.g., to support E-UTRA OTDOA positioning using downlink positioning measurements obtained by a target UE. An LMF can also have a signaling connection to an SLP, the LTE entity responsible for user-plane positioning.

Various interfaces and protocols are used for, or involved in, NR positioning. The LTE Positioning Protocol (LPP) is used between a target device (e.g., UE in the control-plane, or SET in the user-plane) and a positioning server (e.g., LMF in the control-plane, SLP in the user-plane). LPP can use either the control- or user-plane protocols as underlying transport. NR Positioning Protocol (NRPP) is terminated between a target device and the LMF. RRC protocol is used between UE and gNB (via NR radio interface) and between UE and ng-eNB (via LTE radio interface).

Furthermore, the NR Positioning Protocol A (NRPPa) carries information between the NG-RAN Node and the LMF and is transparent to the AMF. As such, the AMF routes the NRPPa PDUs transparently (e.g., without knowledge of the involved NRPPa transaction) over NG-C interface based on a Routing ID corresponding to the involved LMF. More specifically, the AMF carries the NRPPa PDUs over NG-C interface either in UE associated mode or non-UE associated mode. The NGAP protocol between the AMF and an NG-RAN node (e.g., gNB or ng-eNB) is used as transport for LPP and NRPPa messages over the NG-C interface. NGAP is also used to instigate and terminate NG-RAN-related positioning procedures.

LPP/NRPP are used to deliver messages such as positioning capability request, OTDOA positioning measurements request, and OTDOA assistance data to the UE from a positioning node (e.g., location server). LPP/NRPP are also used to deliver messages from the UE to the positioning node including, e.g., UE capability, UE positioning measurements for UE-assisted OTDOA positioning, UE request for additional assistance data, UE configuration parameter(s) to be used to create UE-specific OTDOA assistance data, etc. NRPPa is used to deliver the information between ng-eNB/gNB and LMF in both directions. This can include LMF requesting some information from ng-eNB/gNB, and ng-eNB/gNB providing some information to LMF. For example, this can include information about PRS transmitted by ng-eNB/gNB that are to be used for OTDOA positioning measurements by the UE.

NR networks will support positioning methods similar to LTE E-CID, OTDOA, and UTDOA but based on NR positioning measurements. NR may also support one or more of the following position methods:

Multi-RTT: The device (e.g. UE) computes UE Rx-Tx time difference and gNBs compute gNB Rx-Tx time difference. The results are combined to find the UE position based upon round trip time (RTT) calculation.

DL angle of departure (DL-AoD): gNB or LMF calculates the UE angular position based upon UE DL RSRP measurement results (e.g., of PRS transmitted by network nodes).

UL angle of arrival (UL-AoA): gNB calculates the UL AoA based upon positioning measurements of a UE's UL SRS transmissions.

Each of the NR positioning methods can be supported in UE-assisted, UE-based or UE-standalone modes, similar to LTE discussed above.

Figure 5:
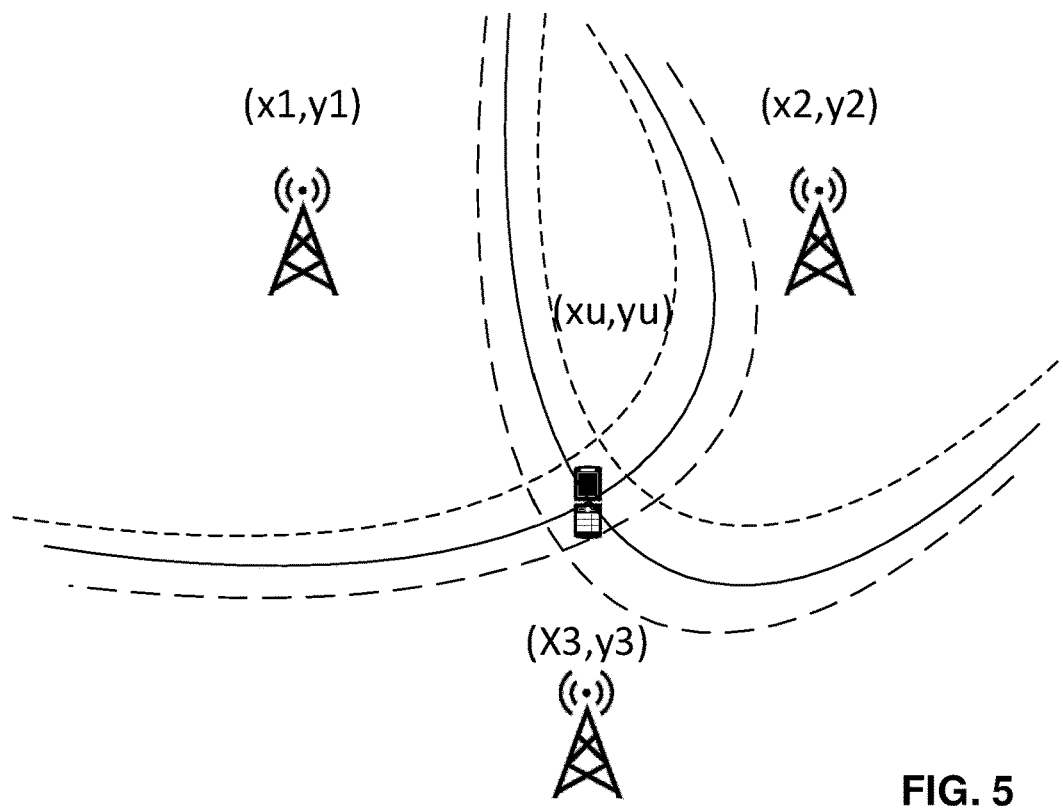
FIG. 5 shows an exemplary reference signal time difference (RSTD) measurement arrangement for observed time difference of arrival (OTDOA) positioning.

In OTDOA positioning, a UE measures the reference signal time difference (RSTD) between RS transmitted by a reference cell and RS transmitted by at least two neighbor cells. FIG. 5 shows an exemplary RSTD measurement arrangement for OTDOA positioning with three cells, i.e., the UE's serving cell and two neighbor cells. The UE measures time-of-arrival (TOA) for RS transmitted by each cells in the terminal. Each measurement depends on the time when the cell (e.g., eNB or gNB) transmitted the measured RS and the propagation distance of the RS between the cell and UE antennas. For example, the TOA for cell1 can be expressed as:

$$t_{TOA,1} + b_{clock} = T_1 \| r_1 - r_{Terminal} \| / C$$

where $T_1$ denotes the RS transmission time from cell1, c is the speed of light, and $b_{clock}$ denotes the unknown clock offset of the UE with respect to network time. The boldface quantities r are vector locations of the transmitting antenna and the UE (or terminal). The UE can then determine differences (i.e., RSTD) between the respective measurements, such as illustrated below for cell2 and cell1:

$$t_{TDOA,2} = t_{TOA,2} - t_{TOA,1} = T_2 - T_1 + |r_2 - r_{Terminal}|/c - |r_1 - r_{Terminal}|/c$$

A similar RSTD can be formed between TOA measurements for cell3 and cell2 or between cell3 and cell1 (both shown in FIG. 5). Note that the RSTD formation eliminates the common $b_{clock}$. Furthermore, the left-hand side can be considered known provided that any differences between transmission times (denoted "real time differences") can be measured, such as by LMUs, or can be fixed. The three-dimensional locations $r_i$ of the transmitters (e.g., base station antennas) are generally known to within a few meters. As such, the only remaining unknown is the UE location, $r_{terminal}$. In the case shown in FIG. 5, the two-dimensional UE location:

$$r_{Terminal} = (x_{Terminal} y_{Terminal})^T$$

can be determined from the two RSTDs. Alternately, a three-dimensional UE location:

$$r_{Terminal} = (x_{Terminal} y_{Terminal} z_{Terminal})^T$$

can be determined if a fourth cell and third RSTD is used. In practice, accuracy can be improved if more positioning measurements are collected and a maximum likelihood solution is introduced. There may also be multiple (false) solutions in cases where only a minimum number of sites are detected. OTDOA produces position estimates that can be related to the Cartesian position in the local earth tangential coordinate system, e.g., used for state estimation as discussed further below.

Although OTDOA can be relatively accurate, its inaccuracy is significantly larger than that of assisted GNSS. A primary advantage of OTDOA is that it provides high precision positioning indoors, where the availability of A-GNSS is very limited.

Assisted GNSS is an aggregation of several national or regional navigation systems including the U.S. Global Positioning System (GPS), the Russian GLObal NAvigation Satellite System (GLONASS), the European Galileo system, and the Chinese Compass and Beidu systems. Each includes a relatively large number of satellites that transmit positioning signals with properties that facilitate timing measurements. Each also provides highly accurate satellite orbital parameters such that receivers can accurately determine satellite positions and transmission timing associated with any measured signal. Given this information, receivers can determine a "pseudorange" to each satellite measured, which includes the receiver's unknown time offset from GNSS time. Given enough pseudoranges, the receiver can determine its own position and time offset with very high accuracy. In general, GNSS receivers produce position results that can be easily translated to Cartesian position in the local earth tangential coordinate system, e.g., used for state estimation as discussed further below.

Although conventional UEs can provide position measurements based on 3GPP A-GNSS techniques, operators of aerial UEs often disable such features. In such cases, the network (e.g., E-SMLC, LMF) must determine a position measurement and/or estimate the current state of the aerial UE based on positioning measurements made by RAN nodes.

In general, TDOA methods produce relatively poor estimates of UE altitude relative to local topography. This is due to inter-site measurement geometry, specifically that the base station transmitting/receiving antennas are all located at similar altitudes. Furthermore, aerial UEs are often flying at approximately the same altitudes as the antennas. Since all entities involved in these TDOA measurements are roughly in one plane, small variations in aerial UE altitude are obscured by noise or uncertainty of the TOA measurements, resulting in poor altitude accuracy. This effect is also known as a high vertical geographical dilution of precision (GDOP), which refers to a ratio of vertical position determination error to range measurement error.

Other positioning measurements can be used to improve altitude accuracy. One possibility is to augment TDOA measurements with barometric measurements, which can indicate altitude variation. Such measurements are standardized in LTE and NR and available in many UE brands. Barometric measurements can also be used to augment other positioning methods such as assisted GNSS.

Figure 6:
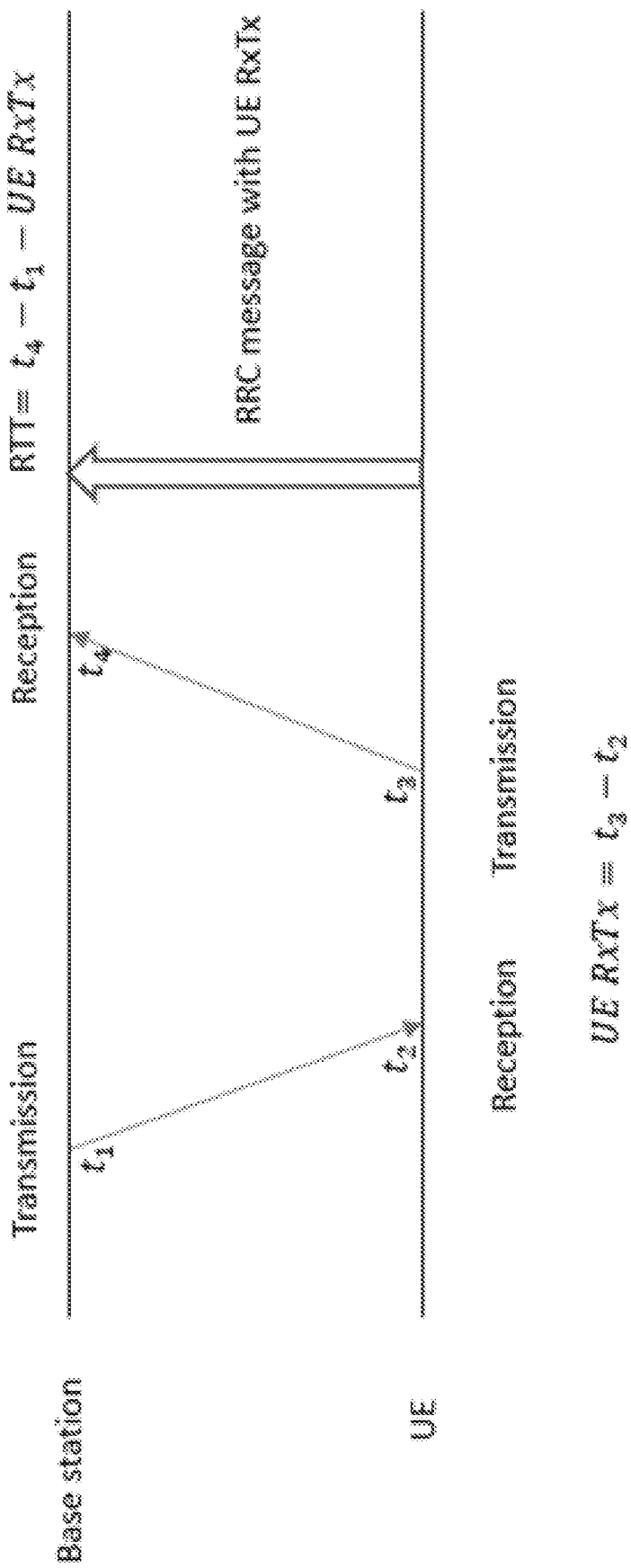
FIG. 6 illustrates principles of measuring round-trip time (RTT) between a UE and a base station.

In addition to UTDOA, various other positioning measurements can be performed by the network. For example, one way to measure range is to measure the travel time of radio waves from a base station to a UE and back, i.e., a round-trip-time (RTT) measurement. Given an RTT measurement, the range R can be computed as:

$$R = c\frac{RTT}{2},$$

where c denotes the speed of light. FIG. 6 illustrates principles of RTT measurement. As shown in FIG. 6, the RTT value is obtained as $$RTT = t_4 - t_1 - UERxTx,$$

where UE RxTX is measured in the UE as $$UE\ RxTx = t_3 - t_2$$

and reported back to the base station over the radio resource protocol (RRC).

The main inaccuracy in R originates from the signal reception processes in the UE and the base station. The theoretical inaccuracy of one such measurement is, in free space propagation, inversely proportional to the measurement bandwidth, as $$\Delta t \geq \frac{1}{4\pi}\frac{1}{\Delta f}.$$

For an example measurement bandwidth of 30 MHz, the best possible time inaccuracy (one standard deviation) is 2.65 ns, which is slightly less than 1 m in distance at the speed of light. Since two independent measurement processes are used for RTT a 40-MHz measurement bandwidth would result in a combined RTT measurement inaccuracy of about 1 m.

In addition, Doppler shift measurements can be made by base stations in the E-UTRAN and/or NG-RAN. A Doppler shift (or Doppler frequency) is related to the speed of a UE in the direction to or from a radio source (e.g., base station), computed as:

$$f_D = \frac{v}{c}f_c,$$

where $f_D$ is the Doppler frequency, v is the (departing) velocity of the UE relative to the base station, c is the speed of light and $f_c$ is the carrier frequency.

A Doppler shift measurement can be obtained in several ways: One approach is to use the Fourier transforms performed during OFDM reception in LTE and NR systems. The Fourier transform relationship $$e^{iw_0t}f(t) \leftrightarrow F(I(w-w_0))$$

can then be exploited in the uplink to compare the phase shift between reference signals on say two OFDM symbols after each other. This also allows for multi-base station doppler shift measurement.

In both LTE and NR, physical uplink control channel (PUCCH) transmissions by the UE can be measured for Doppler shift by base stations, while sounding reference signals (SRSs) can also be measured by NR base stations (e.g., gNBs).

In addition to signal measurements, prediction of signal pathloss can also be used for positioning purposes. Various empirical propagation models can be used to predict pathloss. Most model dependence of pathloss on carrier frequency, height of the transmitter and receiving antenna and parameters of propagation in the environment. One example is the log-distance model, which is used to predict the pathloss for a wide range of conditions, including both Line-of-Sight (LOS) and Non-Line-of-Sight (NLOS) scenarios. The log-distance model is given by:

$$PL = PL(d_0) + 10n\log_{10}\left(\frac{d}{d_0}\right) + X_\sigma,$$

where $PL(d_0)$ is the pathloss at reference distance $d_0$ and it is defined as $$PL(d_0) = 20\log_{10}\left(\frac{4\pi d_0}{\lambda}\right),$$

where $d_0$=100m, d is distance between transmitter and receiver, n is the pathloss exponent, $\lambda_\sigma$ is the zero-mean Gaussian-distributed random variable (in dB) with standard deviation $\sigma$ (in dB), and $\lambda$ is wavelength (m).

Another example is the Hata model, which is valid for microwave frequencies from 150 to 1500 MHz by analyzing Okumura's propagation curves. The pathloss in this model is given by:

$$PL = 46.3 + 33.9\log_{10}(f) - 13.82\log_{10}(h_t) - a(h_r) + (44.9 - 6.55\log_{10}(h_t))\log_{10}d + c_m,$$

where f is carrier frequency (MHz), d is distance between transmitter and receiver (km), $h_t$ is transmitter antenna height (m). The parameter $a(h_r)$ is set according to the environment. For an urban environment it is defined as:

$$a(h_r) = 3.20(\log_{10}(11.75h_r))^2 - 4.97[dB],$$

where $h_r$ is the receiver antenna height (m). The parameter $c_m$ has different values for different environments, e.g., 0 dB for sub-urban and rural environments and 3 dB for urban areas.

Another example is the Ericsson model, which is a version of Okumura-Hata model that allows for parameter changes based on a particular propagation environment. Pathloss according to this model is defined as:

$$PL = a_0 + a_1 \log_{10}(d) + a_2 \log_{10}(h_{bs}) + a_3 \log_{10}(h_{bs}) \log_{10}(d) - 3.2(\log_{10}(11.75 h_{ms}))^2 + g(f),$$

where $g(f)$ is given by:

$$g(f) = 44.49 \log_{10}(f) - 4.78(\log_{10}(f))^2,$$

where f is carrier frequency (MHz), d is distance between base station and the mobile station (km), $h_{bs}$ is the base station antenna height and $h_{ms}$ is the mobile station antenna height in [m]. the values for parameters $a_0$, $a_1$, $a_2$ and $a_3$ are given in Table 1.

TABLE 1

| Type of terrain | $\alpha_0$ | $\alpha_1$ | $\alpha_2$ | $\alpha_3$ |
|---|---|---|---|---|
| Urban | 36.2 | 30.2 | −12 | 0.1 |
| Suburban | 43.2 | 68.93 | −12 | 0.1 |
| Rural | 45.95 | 100.6 | −12 | 0.1 |

In general, position estimates based on assisted GNSS, OTDOA, UTDOA, and barometric measurements are all typically expressed with respect to the mean sea level. For the case of aerial UEs, however, a more relevant value is altitude with respect to local ground level. Various techniques can be used to convert a position estimate between these two altitude references. One exemplary technique is to apply a complete geographical information system (GIS) that includes ground altitude maps covering a region of interest, e.g., a coverage area of the LTE or NR network in which an aerial UE can operate. Another exemplary technique is to use a configured altitude above ground for each antenna site in the network.

Figure 7:
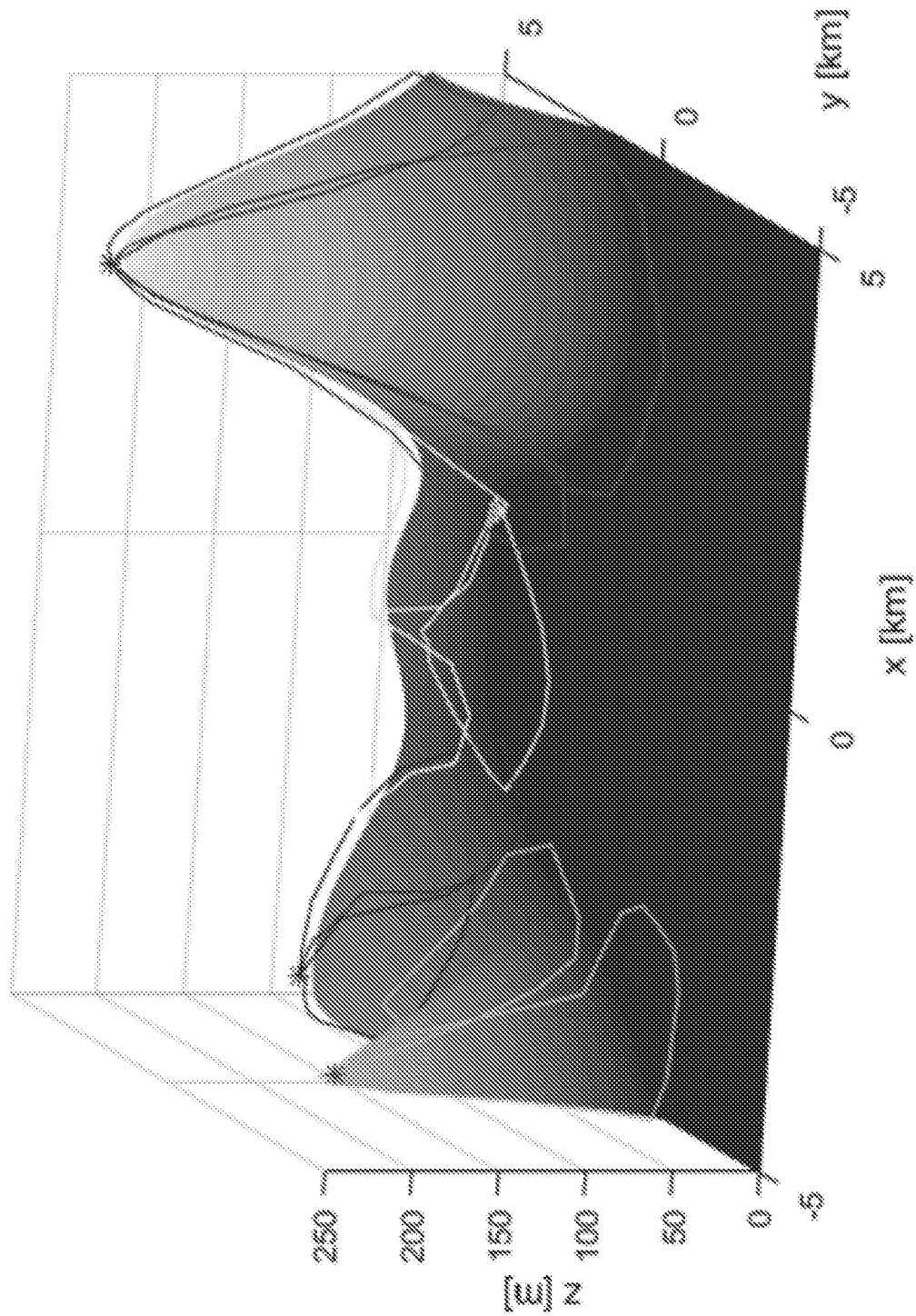
FIGS. 7-8 show two views of a topography model that can be used to estimate ground altitude in a coverage area of a wireless network.
Figure 8:
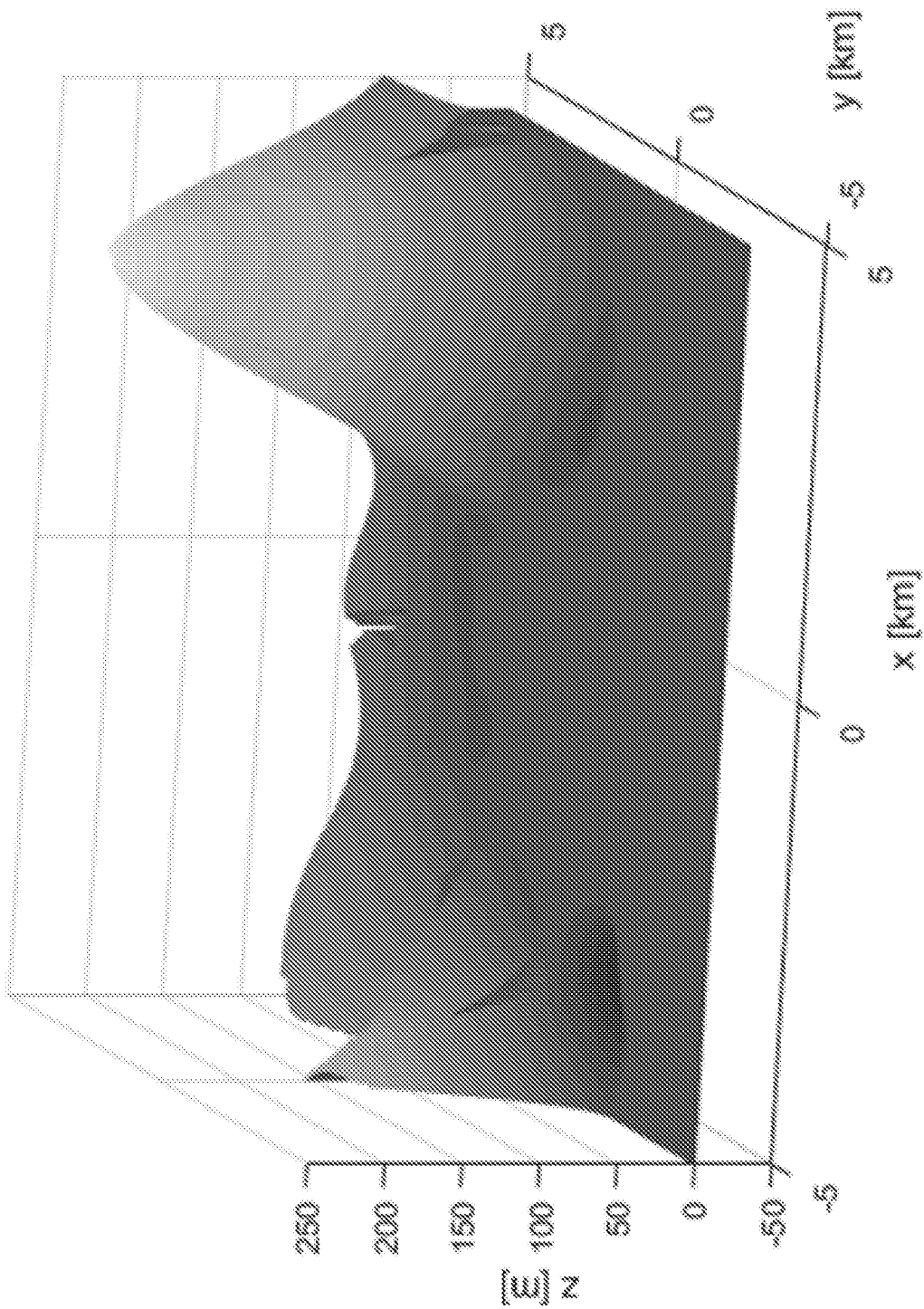

Another exemplary technique is to apply a model of the ground altitude within each cell of the network. An example of this technique is disclosed in "Wireless hybrid positioning based on surface modeling with polygon support", which was published in *Proc. VTC* 2018 Spring, June 2018 and is incorporated by reference in its entirety. FIG. 7 shows a topography intended to describe a coastal region, with zero altitude representing mean sea level. Coverage of cells are depicted with overlaid contour lines. This exemplary technique was used to compute a 3D surface estimate for each cell, with the result depicted in FIG. 8. When applied to UE position estimates, the exemplary technique can reduce the maximum vertical errors by approximately 80%. Furthermore, the vertical minimum mean-square error (MMSE) is less than 3 m in almost 50% of the coverage areas of the cells shown in FIGS. 7-8.

As briefly mentioned above, it can be beneficial to restrict and/or limit aerial UEs operating as "rogue drones". Possible solutions include limiting, releasing, and/or disconnecting aerial UE communications with the network (e.g., E-UTRAN) and/or alerting relevant government authorities who can take appropriate action against rogue drone operation. A prerequisite for these and other solutions is network knowledge of the current position, speed, and directional bearing (collectively "state") of aerial UEs. Although conventional UEs can provide such information based on 3GPP LCS techniques, such as assisted-GNSS, operators of aerial UEs often disable such features, leaving it up to the network to determine or estimate the current state of aerial UEs based on positioning measurements made by the network.

Figure 9:
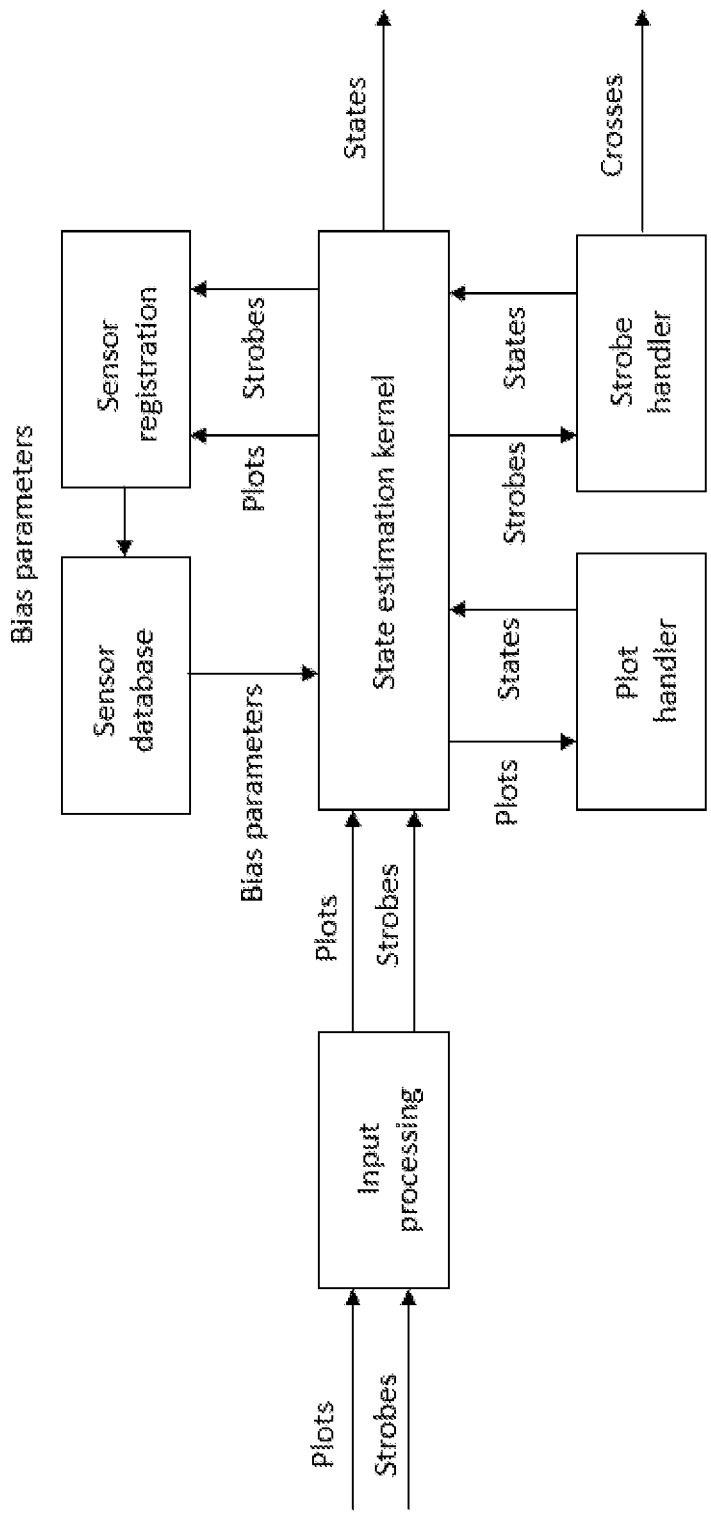
FIG. 9 shows an exemplary conventional air vehicle state estimation system.

FIG. 9 shows an exemplary conventional air vehicle state estimation system, also referred to as a "multi-sensor state estimation system". Strobes (i.e., angle-only measurements) and plots (i.e., cartesian position measurements) are first collected from the sensors attached to the state estimation system. The plots and strobes are input for association with existing 3-D state estimates, i.e., to determine which measurements belong to each state estimate. Measurements may be accompanied by identifiers (e.g., UE ID) that are also associated with the corresponding state estimate.

The state estimates can be transformed from an earth tangential Cartesian coordinate system to the measurement space of each sensor. The state estimates can be updated in the respective sensor measurement spaces with Kalman filtering-based techniques discussed below. Plots and strobes that are not associated may originate from new state estimates and they are sent to the plot handler or the strobe handler for initiation of new state estimates. Plots and strobes that are associated with high quality state estimates are also used for computation of sensor bias parameters in the sensor registration block.

Kalman filters can be used to estimate the state of a discrete-time linear dynamic system described by a linear vector difference equation with additive white Gaussian noise that models unpredictable disturbances. The dynamic model of a Kalman filter is given by:

$$x(k+1) = F(k)x(k) + v(k),$$

where $x(k)$ is the $n_x$-dimensional state vector, and $v(k)$, $k = 0, 1, \ldots$ is the sequence of zero-mean white Gaussian process noise (also $n_x$ vectors) with covariance $$\mathbb{E}[v(k)v(k)'] = Q(k).$$

The measurement equation is $$z(k) = H(k)x(k) + w(k) \quad k = 1, \ldots,$$

with $w(k)$ the sequence of zero-mean white Gaussian measurement noise with covariance $$\mathbb{E}[w(k)w(k)'] = R(k).$$

The matrices F, H, Q, and R are assumed known and possibly time varying. In other words, the system can be time varying and the noises nonstationary. The initial state $x(0)$, in general unknown, is modeled as a random variable, Gaussian distributed with known mean and covariance. The two noise sequences and the initial state are assumed mutually independent, which is also referred to as a "Linear-Gaussian (LG) assumption."

The conditional mean is defined as:

$$\hat{x}(j|k) = \mathbb{E}[x(j)|Z^k],$$

where $Z^k = \{z(j), j \leq k\}$ denotes a sequence of observations available at time k, and is the estimate of the state if $j = k$ and predicted value of the state if $j > k$. The conditional covariance matrix of $x(j)$ given the data $Z^k$ or the covariance associated with the estimate is $$P(j|k) = \mathbb{E}[x(j) - \hat{x}(j|k)][x(j) - \hat{x}(j|k)'|Z^k].$$

Figure 10:
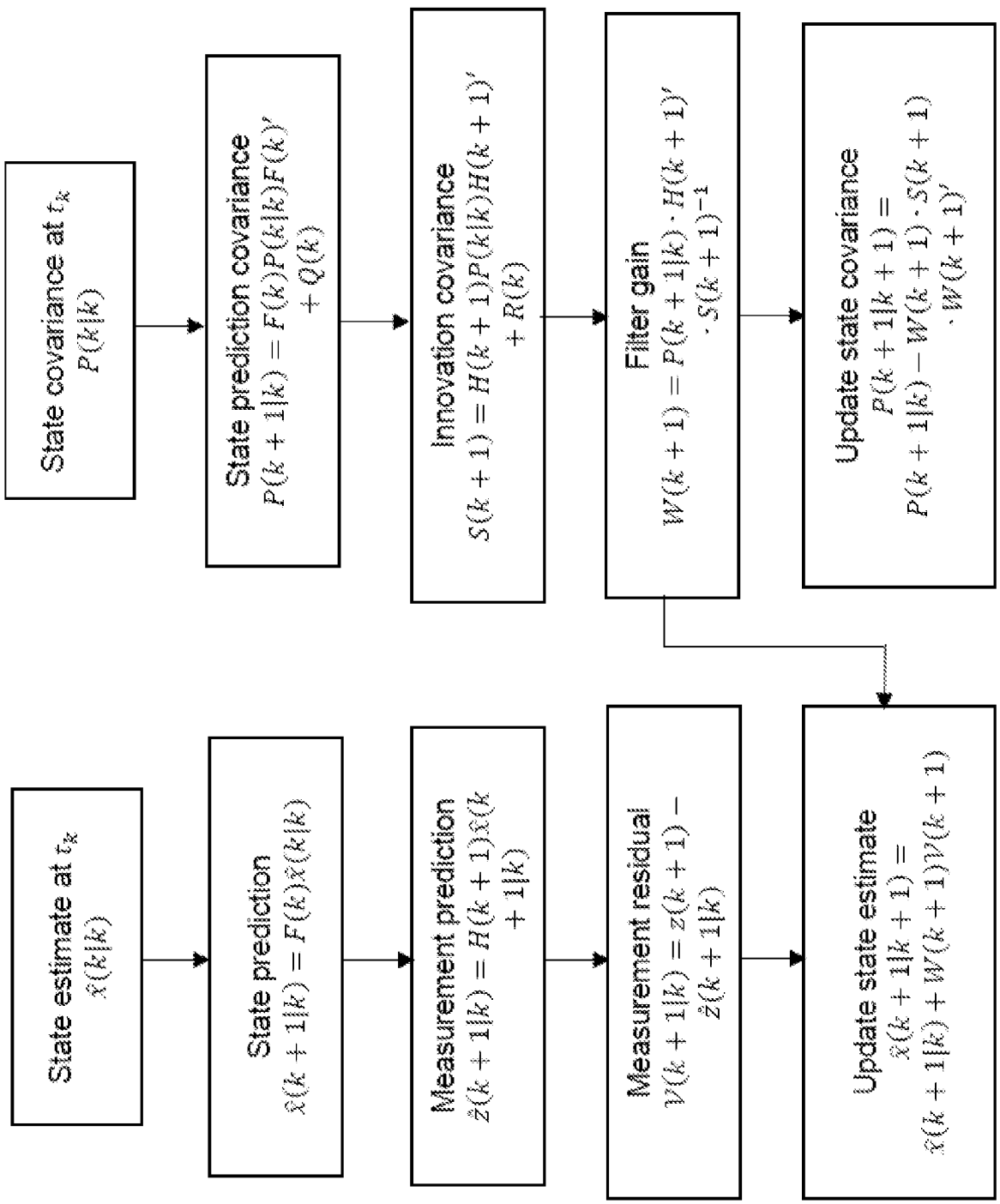
FIG. 10 shows an exemplary flow diagram of a Kalman filter.

FIG. 10 shows an exemplary flow diagram of a Kalman filter. The estimation algorithm starts with the initial estimate $\hat{x}(0|0)$ of $x(0)$ and the associated initial covariance $P(0|0)$, assumed to be available. The second (conditioning) index 0 stands for $Z^0$, the initial information. One cycle of the dynamic estimation algorithm—the Kalman filter (KF)—will thus consist of the computations to obtain the estimate $$\hat{x}(k|k) = \mathbb{E}[x(k)|Z^k],$$

which is the conditional mean of the state at time k (the current stage) given the observation up to and including time k, and the associated covariance matrix $$P(k|k) = \mathbb{E}[[x(k)-\hat{x}(k|k)][x(k)-x(k|k)]'|Z^k].$$

The extended Kalman filter (EKF) is a nonlinear version of the Kalman filter that linearizes about an estimate of the current mean and covariance. The EKF model is a linear state space differential equation and a non-linear measurement equation. The differential equation is then discretized as described below. Since the measurement update requires a linearized measurement matrix in case the Kalman filter is used as a basis for the EKF, it follows that the linearization is of the measurement equation around the predicted measurement, i.e., $$\hat{z}^i(t_k|t_{k-1}) = h(\hat{x}_i(t_k|t_{k-1})), i=1,\ldots,r.$$

The underlying state space model of the EKF is given by:

$$\hat{x}^i(t_{k+1}) = F^i(t_{k+1}, t_k)\hat{x}^i(t_k) + w^i(t_k)$$

$$\hat{z}^i(t_k) = h(\hat{x}^i(t_k)) + e(t_k), i=1,\ldots,r.$$

In the above, superscript i is a movement mode index (described in more detail below), h(x) is the measurement equation, and F is a discrete-time systems matrix. In addition, the quantities $w^i(t_k)$ and $e(t_k)$ are the systems and measurement noises, respectively. Their covariance matrices are given by:

$$Q^i(t_{k+1},t_k)E[w^i(t_k)(w^i(t_k))^T], i=1,\ldots,r.$$

$$R^i(t_{k+1},t_k)E[e(t_k)(e(t_k))^T], i=1,\ldots,r.$$

One iteration of the EKF for mode i is given by the following equations:

$$\hat{x}^i(t_k|t_{k-1}) = F^i(t_k, t_{k-1})\hat{x}^i(t_{k-1}|t_{k-1})$$

$$P^i(t_k|t_{k-1}) = F^i(t_k, t_{k-1})P^i(t_{k-1}|t_{k-1})(F^i(t_k, t_{k-1}))^T + Q^i(t_k, t_{k-1})$$

$$\hat{z}^i(t_k|t_{k-1}) = h(\hat{x}^i(t_k|t_{k-1}))$$

$$H^i(\hat{x}^i(t_k|t_{k-1})) = \frac{\partial h(\hat{x})}{\partial \hat{x}}\bigg|_{x=\hat{x}^i(t_k|t_{k-1})}$$

$$e^i(t_k) = z(t_k) - \hat{z}^i(t_k|t_{k-1})$$

$$S^i(t_k) = H^i(\hat{x}^i(t_k|t_{k-1}))P^i(t_k|t_{k-1})(H^i(\hat{x}^i(t_k|t_{k-1})))^T + R^i(t_k, t_{k-1})$$

$$W^i(t_k) = P^i(t_k|t_{k-1})(H^i(\hat{x}^i(t_k|t_{k-1})))^T (S^i(t_k))^{-1}$$

$$\hat{x}^i(t_k|t_k) = \hat{x}^i(t_k|t_{k-1}) + W^i v^i(t_k)$$

$$P^i(t_k|t_k) = P^i(t_k|t_{k-1}) - W^i(t_k)S^i(t_k)(W^i(t_k))^T.$$

Although Kalman filters may be used to model a movement state of some vehicles, such as surface vehicles and aircraft, a conventional Kalman filter is inadequate to model the state of an aerial UE such as a drone. More specifically, drones have very specific modes of movement that need to be reflected by the optimal estimator applied for measurement processing. Even so, there are various methods for state estimation of an object, such as a drone, that has multiple dynamic movement modes.

A general technique for performing such estimation is based on the joint probability distribution of the object's state. In general, propagation of the object's state forward in time is governed by the Fokker-Planck partial differential equation. The measurement processing is performed by a multi-dimensional integration to obtain the posterior probability state distribution from the likelihood of the measurement and the prior probability distribution. This process is more generally referred to as Bayesian inference. In general, however, implementation can be very complex in terms of computational and memory requirements. Bayesian inference methods can be simplified to some degree by approximation as "particle filters" in which the probability density functions are discretized as "particles". Even so, implementation of particle filtering can be very complex.

As an extreme simplification, each of the object's movement modes can be modeled and estimated separately, with ad-hoc logic used to select the movement mode applicable at any given time. For example, two movement modes can be used for estimating the state of a conventional air vehicle: a constant velocity mode (i.e., straight line movement) and a maneuver mode, which can respond to measurements with much higher agility than the constant velocity mode. A maneuver detector can select the maneuver mode if it is deemed to better match incoming measurements than the constant velocity mode. After a maneuver is terminated, a re-initialized constant velocity mode can be used for state estimation. One problem, issue, and/or difficulty with this approach is selection of appropriate threshold values for the maneuver detector.

Another approach to the multi-movement mode state estimation problem is the interacting-multiple-model (IMM) filter. The IMM algorithm assumes that the system behaves according to one of a finite number of models. These models can differ in noise levels and/or structure, such as having different state dimensions and unknown inputs. In the IMM approach, at time k the state estimate is computed for each possible model using r filters, with each filter using a different combination of the previous model-conditioned estimates, so-called "mixed initial conditions". The mixing of state estimates is thus performed in the beginning of a filter update cycle.

Figure 11:
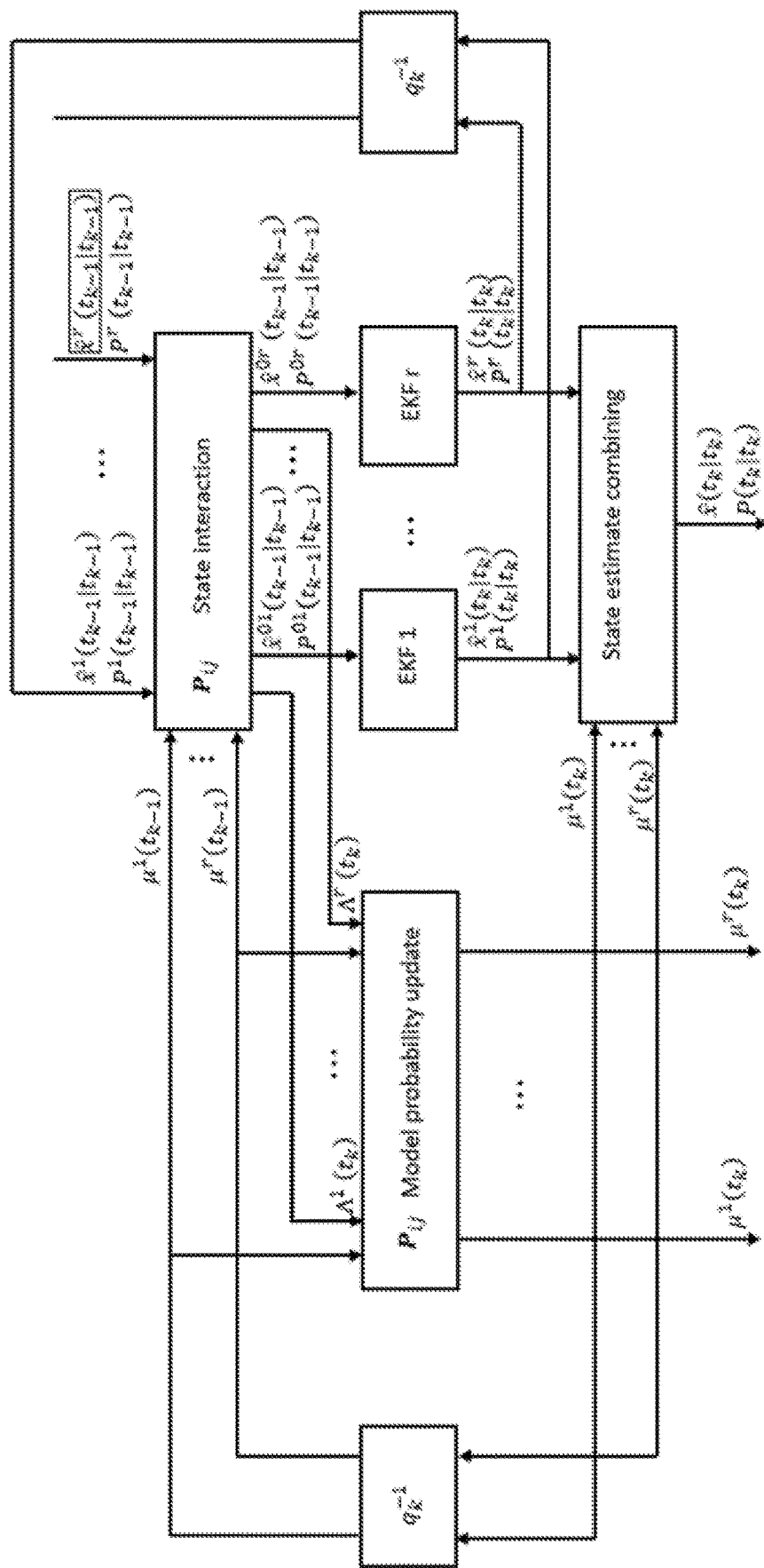
FIG. 11 shows a block diagram that illustrates one operation cycle of an interacting multiple-model (IMM) algorithm that includes r interacting enhanced Kalman filters (EKFs) operating in parallel.

FIG. 11 shows a block diagram that illustrates one cycle of operation of an IMM algorithm that includes r interacting EKFs operating in parallel. The overall structure of the IMM algorithm is given by:

$$(N_e; N_f) = (r; r),$$

where $N_e$ is the number of estimates at the start of the cycle of the algorithm and $N_f$ is the number of filters. One cycle of the algorithm includes the following operations:

1. State interaction. To provide initial conditions to the mode matched filtering, the state and covariance matrices of the previous iteration need to be mixed. This mixing is based on the mode transition probability matrix and the mode probabilities of the previous iteration, and is given by the so called mixing probabilities, $\mu_{i|j}$, i,j=1, ... r. The definition is based on the probability that mode $M_i$ was in effect at time $t_{k-1}$, given that mode $M_j$ is in effect at time $t_k$, conditioned on the data $Z^{k-1}$ up to time $t_{k-1}$. The result becomes:

$$\mu_{i|j}(t_{k-1}|t_{k-1}) = \frac{1}{\bar{c}_j}p_{ij}\mu_i(t_{k-1})$$

$$\bar{c}_j = \sum_{i=1}^{r} p_{ij}\mu_i(k-1)$$

2. Mixing (j=1, . . . r). Starting with $\hat{x}^i(k-1|k-1)$ one computes the mixed initial condition for the filter matched to $M_j(k)$ as:

$$\hat{x}^{0j}(k-1|k-1) = \sum_{i=1}^{r} \hat{x}^i(k-1|k-1)\mu_{i|j}(k-1|k-1) \; j=1,\ldots,r$$

The covariance corresponding to the above is given by:

$$P^{0j}(t_{k-1}|t_{k-1}) = \sum_{i=1}^{r} \mu_{i|j}(t_{k-1}|t_{k-1})\Big(P^i(t_{k-1}|t_{k-1}) + \big(\hat{x}^i(t_{k-1}|t_{k-1}) - \hat{x}^{0j}(t_{k-1}|t_{k-1})\big)\big(\hat{x}^i(t_{k-1}|t_{k-1}) - \hat{x}^{0j}(t_{k-1}|t_{k-1})\big)^T\Big).$$

3. Mode-matched filtering (j=1, . . . r). The estimate and the covariance obtained in step 2 are used as input to the r EKFs matched to the respective modes. An iteration of EKF computations is performed for each mode as described above. The likelihood function corresponding to the r filters is computed using the mixed initial condition and the associated covariance as:

$$\Lambda^j(t_k) = p(z(t_k)|M_j, \hat{x}^{0j}(t_{k-1}|t_{k-1}), P^{0j}(t_{k-1}|t_{k-1})),$$
$$j=1,\ldots,r.$$

4. Model probability update (j=1, . . . , r). Given the likelihood function, the model probabilities are updated according to:

$$\mu_j(k) = \frac{1}{c}\Lambda_j(k)\bar{c}_j \; j=1,\ldots,r$$

where $\bar{c}_j$ is given above and $$c = \sum_{j=1}^{r} \Lambda_j(k)\bar{c}_j$$

is the normalization factor.

5. Estimate and covariance combination. Combination of the model-conditioned estimates and covariances is done according to the mixture equations:

$$\hat{x}(t_k|t_k) = \sum_{j=1}^{r} \mu^j(t_k)\hat{x}^j(t_k|t_k),$$

$$P(t_k|t_k) =$$

$$\sum_{j=1}^{r} \mu^j(t_k)\Big(P^j(t_k|t_k) + \big(\hat{x}^j(t_k|t_k) - \hat{x}(t_k|t_k)\big)\big(\hat{x}^j(t_k|t_k) - \hat{x}(t_k|t_k)\big)^T\Big).$$

Prior to performing the calculations discussed above, the following three choices must be made to set up the IMM filter:

Definition of movement modes. For each movement mode, this amounts to definition of a state space model, i.e. one vector difference equation that defines the dynamics, and another static vector equation that defines the mapping of states to measurements. In addition, the inaccuracies of the measurement equation and the dynamic state model are defined in terms of the covariance matrices of the uncertainties.

Definition of transition probabilities. These describe how the modes interact. Typically, this is given as a hidden Markov model that expresses the probabilities of a mode transition of the estimated object between two discrete instances of time.

Selection of filter initial conditions. This amounts to defining the expected initial state and covariance of each model. However, existing techniques have various problems, issues, and/or difficulties when applied to drone state estimation in a cellular RAN.

It is desirable to have an aerial UE state estimation procedure that can be performed by the RAN node (e.g., eNB or gNB) that is currently serving the cell in which the aerial UE is operating/communicating. As compared to solutions that involve CN nodes (e.g., SMLC or LMF), these RAN-centric solutions can be more responsive to fast-moving aerial UEs and utilize less network signaling. However, there are problems, issues, and/or difficulties that prevent RAN-only implementation of a state estimation system for aerial UEs.

For example, as mentioned above, it may be beneficial for RAN nodes (e.g., eNBs and/or gNBs) serving various neighboring cells to make range and/or range rate (e.g., Doppler shift) measurements on signals transmitted by an aerial UE, and report such measurements to the serving RAN node. Currently, however, there is no way for the serving RAN node to determine the neighbor RAN nodes that should perform and report such measurements for a specific aerial UE.

As another example, the EKFs that form the basis of the IMM are based on linearization of a non-linear measurement model around a point. In some cases, the EKF may not converge (or exhibit other undesirable behavior) if an initial point is chosen too far away from the final solution. One approach to provide better initialization is per-cell calibration of initialization conditions, which can be costly and time-consuming. Currently, there are no methods for initialization of drone state estimation algorithms that result in fast, accurate and guaranteed convergence, without requiring such costly calibration.

Exemplary embodiments of the present disclosure can address these and other problems, issues, and/or difficulties by providing novel techniques for generating and utilizing a set of neighbor RAN nodes for measurement and reporting of range- and range rate-related measurements such as RTT, TOA, pathloss, Doppler shift, etc. For example, the set can be generated off-line on a per-cell basis and can be used whenever a drone state estimator is initiated. Additionally, embodiments include signaling techniques between RAN nodes to provide information associated with aerial UE movement state estimation. Furthermore, embodiments include techniques for initialization of an IMM drone state estimator in multiple points of the serving cell for an aerial UE.

Other embodiments and/or aspects of the present disclosure include the use of at least four, and preferably five, asynchronous range-rate (e.g., Doppler shift) measurement sequences (measured by different RAN nodes) for 3D Cartesian drone state estimation, in the absence of any range measurement information. Other embodiments and/or aspects include techniques for using such asynchronous measurements in combination with a sampled continuous-time mode transition matrix of the IMM.

Figure 12:
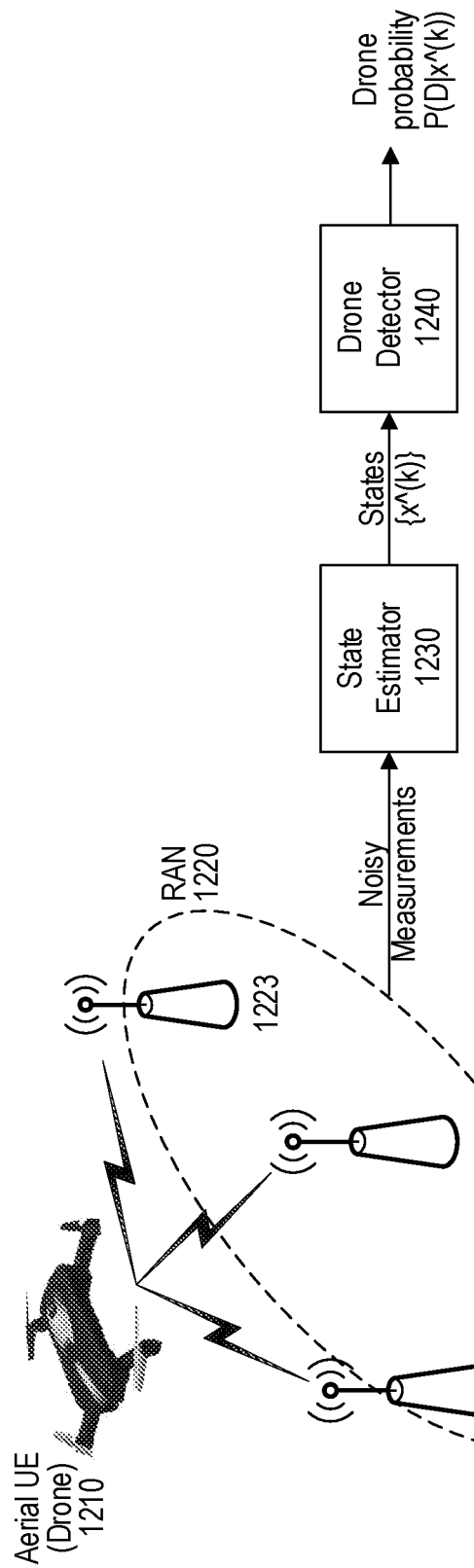
FIG. 12 is a block diagram illustrating the architecture of an exemplary aerial UE (or drone) state estimation system, according to various exemplary embodiments of the present disclosure.

FIG. 12 is a block diagram illustrating the architecture of an exemplary aerial UE (or drone) state estimation system, according to various exemplary embodiments of the present disclosure. In particular, FIG. 12 shows a drone 1210 that communicates with a RAN 1220 that includes three RAN nodes (labelled 1221-1223). The three RAN nodes may make positioning measurements on UL signals (e.g., SRS) transmitted by drone 1210, and/or transmit PRS or other signals to facilitate positioning measurements by drone 1210. In either case, noisy measurements are provided by (or via) RAN 1220 to a state estimator 1230, which operates on them according to techniques described in more detail below to produce state estimates at time instance k—called $\{\hat{x}(k)\}$—that correspond to multiple drone movement modes. These are input to drone detector 1240, which operates on this information to produce a conditional drone probability metric, $P(D|\hat{x}(k))$.

Some embodiments include a multi-mode movement model that includes individual movement models for the following three modes:
1. 3D (almost) constant velocity movement Wiener process;
2. 3D (almost) constant acceleration movement Wiener process; and
3. 3D (almost hovering) constant position Wiener process.

This movement model is suitable when there is at least one range related measurement in the measurement suite, e.g., RTT, TOA, pathloss, etc. The reason is that the hovering mode cannot be updated unless range-related measurements are available. The continuous time state space constant position (almost hovering) model is defined by the states $$x(t) = \begin{bmatrix} x_1(t) \\ x_2(t) \\ x_3(t) \end{bmatrix}$$

where the subscript defines the Cartesian coordinate directions. The model is given by:

$$\dot{x}(t) = Fx(t) + G\tilde{v}(t)$$

$$F = \begin{bmatrix} 0 & 0 & 0 \\ 0 & 0 & 0 \\ 0 & 0 & 0 \end{bmatrix}, G = \begin{bmatrix} 1 & 0 & 0 \\ 0 & 1 & 0 \\ 0 & 0 & 0.001 \end{bmatrix}.$$

The process noise covariance is Q. Note that the vertical state variable has much smaller velocity noise than the other state variables because drones normally maintain altitude while hovering.

As mentioned above, the EKF model is based on a non-linear measurement model that is linearized around a point. Various non-linear measurement models can be used, either individually or in combination.

In some embodiments, a nonlinear range measurement model can be used, based on an RTT measurement. For example, this can be serving cell timing advance (TA) in LTE or an actual RTT measurement by the base station (e.g., gNB) for NR, as discussed above. The RTT based range measurement model is given by:

$$h(\hat{x}(k)) = \frac{2\sqrt{(\hat{x}_1(k) - x_{s,1}(k))^2 + (\hat{x}_2(k) - x_{s,2}(k))^2 + (\hat{x}_3(k) - x_{s,3}(k))^2}}{c},$$

where $\hat{x}_i(\cdot) i=1,2,3$ denote the estimated position states for each coordinate direction, $x_s(\cdot)$ denotes the site position and the constant c is the speed of light. The derivative (Jacobian) of the measurement model is used for the hovering mode (as explained below) and is defined as follows for range measurements:

$$\frac{\partial h(\hat{x}(k))}{\partial \hat{x}} = \begin{pmatrix} \frac{2(\hat{x}_1(k) - x_{s,1}(k))}{c\sqrt{(\hat{x}_1(k) - x_{s,1}(k))^2 + (\hat{x}_2(k) - x_{s,2}(k))^2 + (\hat{x}_3(k) - x_{s,3}(k))^2}} \\ \frac{2(\hat{x}_2(k) - x_{s,2}(k))}{c\sqrt{(\hat{x}_1(k) - x_{s,1}(k))^2 + (\hat{x}_2(k) - x_{s,2}(k))^2 + (\hat{x}_3(k) - x_{s,3}(k))^2}} \\ \frac{2(\hat{x}_3(k) - x_{s,3}(k))}{c\sqrt{(\hat{x}_1(k) - x_{s,1}(k))^2 + (\hat{x}_2(k) - x_{s,2}(k))^2 + (\hat{x}_3(k) - x_{s,3}(k))^2}} \end{pmatrix}'$$

The above assumes a measurement performed at one RAN node, at the time of update. Other measurements performed at other RAN nodes would appear as additional rows.

In some embodiments, a nonlinear pathloss measurement/prediction model can be used. The pathloss for multiple sites can be obtained using transmit power in the RAN node and received power in the UE. The Ericsson model for the pathloss is used as illustration here and it is related to the estimated state in the following measurement equation:

$$PL = a_0 + a_1 \log_{10}(d) + a_2 \log_{10}(h_{bs}) + a_3 \log_{10}(h_{bs}) \log_{10}(d) - 3.2(\log_{10}(11.75h_m))^2 + g(f)$$

where $a_0, a_1, a_2, a_3$ are constants defined as in Table 1, $h_{bs}$ is the base station antenna height, $h_m$ is the UE antenna height, d is the distance between base station and UE, which can be defined as a function of the UE position as:

$$d(\hat{x}) = (\hat{x}_1 - x_{s,1})^2 + (\hat{x}_2 - x_{s,2})^2 + (\hat{x}_3 - x_{s,3})^2.$$

Therefore, the non-linear measurement path loss measurement model can be expressed as:

$$h(\hat{x}(k)) = PL(d(\hat{x}(k)))$$
$$= \alpha_0 + \alpha_1 \log_{10}\left(\sqrt{(\hat{x}_1 - x_{s,1})^2 + (\hat{x}_2 - x_{s,2})^2 + (\hat{x}_3 - x_{s,3})^2}\right) +$$
$$\alpha_2 \log_{10}(h_{bs})$$
$$+ \alpha_3 \log_{10}(h_{bs}) \log_{10}\left(\sqrt{(\hat{x}_1 - x_{s,1})^2 + (\hat{x}_2 - x_{s,2})^2 + (\hat{x}_3 - x_{s,3})^2}\right)$$
$$- 3.2(\log_{10}(11.75\hat{x}_3))^2 + g(f)$$

Likewise, the Jacobian derivative of this measurement model is defined as:

$$\frac{\partial h(\hat{x}(k))}{\partial \hat{x}} = \frac{\partial PL}{\partial d} \frac{\partial d}{\partial \hat{x}}(k) =$$

$$\begin{pmatrix} \frac{(a_1 + \alpha_3 \log_{10}(h_{bs}))(\hat{x}_1(k) - x_{s,1}(k))}{\ln(10)\left[(\hat{x}_1(k) - x_{s,1}(k))^2 + (\hat{x}_2(k) - x_{s,2}(k))^2 + (\hat{x}_3(k) - x_{s,3}(k))^2\right]}, \\ \frac{(a_1 + \alpha_3 \log_{10}(h_{bs}))(\hat{x}_2(k) - x_{s,2}(k))}{\ln(10)\left[(\hat{x}_1(k) - x_{s,1}(k))^2 + (\hat{x}_2(k) - x_{s,2}(k))^2 + (\hat{x}_3(k) - x_{s,3}(k))^2\right]}, \\ \frac{(a_1 + \alpha_3 \log_{10}(h_{bs}))(\hat{x}_3(k) - x_{s,3}(k))}{\ln(10)\left[(\hat{x}_1(k) - x_{s,1}(k))^2 + (\hat{x}_2(k) - x_{s,2}(k))^2 + (\hat{x}_3(k) - x_{s,3}(k))^2\right]} - \\ \frac{2 \cdot 3.2 \log_{10}(11.75\hat{x}_3)}{\ln(10)\hat{x}_3} \end{pmatrix}'$$

Some embodiments of the present disclosure can utilize a two movement-mode IMM model for aerial UE state estimation that is based only on measurements of Doppler shift. These two movement modes are:
1. 3D (almost constant) velocity Wiener process, with a UE Doppler bias state.
2. 3D (maneuver) velocity Wiener process, with a UE Doppler bias state.

Since Doppler shifts will all be identically zero during times when the drone is hovering, it would be pointless to try and update the states for such a mode. In fact, it would be impossible since there would be no velocity in a constant position mode and the Doppler shift measurement prediction can then not be formally computed from the set of states of the hovering mode.

Therefore, the model builds on two constant velocity models with a driving acceleration noise. One mode uses a very small (or zero) acceleration noise, while the other maneuvering mode uses a large acceleration noise. There is an extra state intended to estimate the Doppler shift bias of the UE in both modes. This is modeled as a random walk. The Doppler shift bias of the UE results from inaccuracies in the UE's reference oscillator, and the same value will be observed in all Doppler shift measurements by RAN nodes.

The continuous time equations for the above two movements modes are given by the following, where superscript denotes mode:

$$dx^1(t) = \begin{pmatrix} 0 & 0 & 0 & 1 & 0 & 0 & 0 \\ 0 & 0 & 0 & 0 & 1 & 0 & 0 \\ 0 & 0 & 0 & 0 & 0 & 1 & 0 \\ 0 & 0 & 0 & 0 & 0 & 0 & 0 \\ 0 & 0 & 0 & 0 & 0 & 0 & 0 \\ 0 & 0 & 0 & 0 & 0 & 0 & 0 \\ 0 & 0 & 0 & 0 & 0 & 0 & 0 \end{pmatrix} x^1(t)dt + \begin{pmatrix} 0 & 0 & 0 & 0 \\ 0 & 0 & 0 & 0 \\ 0 & 0 & 0 & 0 \\ 1 & 0 & 0 & 0 \\ 0 & 1 & 0 & 0 \\ 0 & 0 & 1 & 0 \\ 0 & 0 & 0 & 1 \end{pmatrix} w^1(t)dt$$

$$E[(w^1(t)dt)(w^1(s)ds)^T] = \begin{pmatrix} q^1_{11} & 0 & 0 & 0 \\ 0 & q^1_{22} & 0 & 0 \\ 0 & 0 & q^1_{33} & 0 \\ 0 & 0 & 0 & q_{bias} \end{pmatrix} dt$$

$$dx^2(t) = \begin{pmatrix} 0 & 0 & 0 & 1 & 0 & 0 & 0 \\ 0 & 0 & 0 & 0 & 1 & 0 & 0 \\ 0 & 0 & 0 & 0 & 0 & 1 & 0 \\ 0 & 0 & 0 & 0 & 0 & 0 & 0 \\ 0 & 0 & 0 & 0 & 0 & 0 & 0 \\ 0 & 0 & 0 & 0 & 0 & 0 & 0 \\ 0 & 0 & 0 & 0 & 0 & 0 & 0 \end{pmatrix} x^2(t)dt + \begin{pmatrix} 0 & 0 & 0 & 0 \\ 0 & 0 & 0 & 0 \\ 0 & 0 & 0 & 0 \\ 1 & 0 & 0 & 0 \\ 0 & 1 & 0 & 0 \\ 0 & 0 & 1 & 0 \\ 0 & 0 & 0 & 1 \end{pmatrix} w^2(t)dt$$

$$E[(w^2(t)dt)(w^2(s)ds)^T] = \begin{pmatrix} q^2_{11} & 0 & 0 & 0 \\ 0 & q^2_{22} & 0 & 0 \\ 0 & 0 & q^2_{33} & 0 \\ 0 & 0 & 0 & q_{bias} \end{pmatrix} dt$$

In the above, x denotes the state vector, w denotes the systems noise, $q_{11}$ is the variance of the acceleration noise in the x-dimension, $q_{22}$ is the variance of the acceleration noise in the y-dimension, $q_{33}$ is the variance of the acceleration noise in the vertical z-dimension, and $q_{bias}$ is the variance of the drift rate of the UE Doppler bias.

Using $T_k = t_k - t_{k-1}$ to denote a variable sampling interval (i.e., between successive samples), a formal sampling of the models above renders the following relationships:

$$F^1(t_k, t_{k-1}) = \begin{pmatrix} 1 & 0 & 0 & T_k & 0 & 0 & 0 \\ 0 & 1 & 0 & 0 & T_k & 0 & 0 \\ 0 & 0 & 1 & 0 & 0 & T_k & 0 \\ 0 & 0 & 0 & 1 & 0 & 0 & 0 \\ 0 & 0 & 0 & 0 & 1 & 0 & 0 \\ 0 & 0 & 0 & 0 & 0 & 1 & 0 \\ 0 & 0 & 0 & 0 & 0 & 0 & 1 \end{pmatrix}$$

$$Q^1(t_k, t_{k-1}) = \begin{pmatrix} 1/3 q^1_{11} T_k^3 & 0 & 0 & 1/2 q^1_{11} T_k^2 & 0 & 0 & 0 \\ 0 & 1/3 q^1_{22} T_k^3 & 0 & 0 & 1/2 q^1_{22} T_k^2 & 0 & 0 \\ 0 & 0 & 1/3 q^1_{33} T_k^3 & 0 & 0 & 1/2 q^1_{33} T_k^2 & 0 \\ 1/2 q^1_{11} T_k^2 & 0 & 0 & q^1_{11} T_k & 0 & 0 & 0 \\ 0 & 1/2 q^1_{22} T_k^2 & 0 & 0 & q^1_{22} T_k & 0 & 0 \\ 0 & 0 & 1/2 q^1_{33} T_k^2 & 0 & 0 & q^1_{33} T_k & 0 \\ 0 & 0 & 0 & 0 & 0 & 0 & q_{bias} T_k \end{pmatrix}$$

$$F^2(t_k, t_{k-1}) = \begin{pmatrix} 1 & 0 & 0 & T_k & 0 & 0 & 0 \\ 0 & 1 & 0 & 0 & T_k & 0 & 0 \\ 0 & 0 & 1 & 0 & 0 & T_k & 0 \\ 0 & 0 & 0 & 1 & 0 & 0 & 0 \\ 0 & 0 & 0 & 0 & 1 & 0 & 0 \\ 0 & 0 & 0 & 0 & 0 & 1 & 0 \\ 0 & 0 & 0 & 0 & 0 & 0 & 1 \end{pmatrix}$$

-continued $$Q^2(t_k, t_{k-1}) = \begin{pmatrix} 1/3q_{11}^2 T_k^3 & 0 & 0 & 1/2q_{11}^2 T_k^2 & 0 & 0 & 0 \\ 0 & 1/3q_{22}^2 T_k^3 & 0 & 0 & 1/2q_{22}^2 T_k^2 & 0 & 0 \\ 0 & 0 & 1/3q_{33}^2 T_k^3 & 0 & 0 & 1/2q_{33}^2 T_k^2 & 0 \\ 1/2q_{11}^2 T_k^2 & 0 & 0 & q_{11}^2 T_k & 0 & 0 & 0 \\ 0 & 1/2q_{22}^2 T_k^2 & 0 & 0 & q_{22}^2 T_k & 0 & 0 \\ 0 & 0 & 1/2q_{33}^2 T_k^2 & 0 & 0 & q_{33}^2 T_k & 0 \\ 0 & 0 & 0 & 0 & 0 & 0 & q_{bias} T_k \end{pmatrix}.$$

The Doppler shift due to the movement of a UE manifests itself as a frequency shift in the received UL signals. A signal that reaches the base station as s(t) absent a Doppler shift is instead received as $e^{i2\pi f_D t}$s(t) with frequency shift $f_D$. There are several ways to estimate the frequency shift in an OFDM system. For example, two identical transmitted signals may be correlated after reception and the phase change between the two identical signals is then used to estimate the frequency shift.

It is also possible to consider the frequency shift to be part of the propagation channel, h(t; τ) where t is time and τ is the delay. Then the impact of the frequency shift is that h(t; τ) is replaced by $e^{i2\pi f_D t}$h(t; τ).

Various UL signals or channels can be used for frequency shift estimation, including Physical Uplink Control CHannel (PUCCH), Physical Uplink Shared CHannel (PUSCH), and sounding reference signals (SRS). Whereas PUCCH and SRS can be sent without dynamic scheduling, PUSCH can be scheduled with varying transmit power to obtain the required energy for acceptable estimation accuracy of $\varphi_i$ and, hence, $f_D$. Although the signal transmitted from the UE is intended for the serving cell, it is possible to receive the signal in other neighbor cells, thereby facilitating multi-RAN-node Doppler shift measurement.

For aerial UEs, the channel is typically non-dispersive and can therefore be described as h(t). Let $\varphi_i = \angle h(t_i)$ (i.e., the phase of the channel at time $t_i$) and let ^ denote estimate. Then the frequency shift f is estimated using two channel estimates for two different reference signals (e.g., associated with PUSCH) as:

$$\hat{f} = \frac{\hat{\varphi}_2 - \hat{\varphi}_1}{2\pi \Delta T},$$

where $\Delta T = t_2 - t_1$ is the time difference between the two channel estimates. The estimation accuracy depends on the accuracies of both $\hat{\varphi}_i$ and $\Delta T$:

$$\sigma_f^2 = \frac{2\sigma_\varphi^2}{(2\pi \Delta T)^2},$$

where $\sigma_f^2$ and $\sigma_\varphi^2$ are the variances for the frequency shift estimate $\hat{f}$ and for the phase estimate $\hat{\varphi}$, respectively. The variance $\sigma_\varphi^2$ decreases with increasing signal-to-noise ratio (SNR).

UE transmit power control aims to reach a power target for each resource block (RB) of the received signal in the serving cell. The power target is set to obtain sufficiently high SNR for reliable data reception by the base station receiver while avoiding excessive interference to neighbor cells. The received signal is typically lower in the neighbor cells than in the serving cell, which also leads to lower frequency shift estimation accuracy in neighbor cells.

One way to increase the received SNR is to increase the number of scheduled RBs for PUSCH. Since the total received energy is proportional to the number of RBs granted for transmission, the total energy increases with RB allocation so long as the UE is not power-limited. Another way to increase the received energy and hence the estimation accuracy is to grant the UE UL transmissions in several subframes and average the frequency offset estimates. For example, averaging may be performed with a one-tap Infinite Impulse Response (IIR) filter:

$$\bar{f}_n = \alpha \hat{f}_n + (1-\alpha) \bar{f}_{n-1}$$

where $\hat{f}_n$ and $\bar{f}_n$ are the $n^{th}$ sample of the unfiltered and filtered frequency shift estimates, respectively, and a is a constant, $0 < \alpha < 1$.

As stated above the UE frequency shift bias is modeled as a random walk, and the mode states are augmented with one extra state that models the Doppler shift bias, $x_7$. The Doppler shift measurements are modelled as:

$$z(t_k) = -\frac{f_c}{c} v_s(t_k) + x_7(t_k),$$

where $v_s(t_k)$ denotes the speed with which the distance between the site s and the aerial UE increases. c denotes the speed of light. The negative sign indicates that Doppler shift is positive when the UE approaches the base station. As discussed above, the Doppler bias is dominated by UE oscillator inaccuracy and is the same as observed by all RAN nodes.

To relate the measured Doppler frequency shift to the estimated states in a measurement equation, it is noted that a simple scalar product computation, between the rate of the UE ($\dot{r}$) and the direction vector between a site s and the UE ($\hat{r}-r_s$) leads to:

$$v_S(\hat{x}) = \frac{(\hat{r}-r_s)}{\|\hat{r}-r_s\|} \cdot \dot{r} = \frac{(\hat{x}_1 - x_{s,1})\hat{x}_4 + (\hat{x}_2 - x_{s,2})\hat{x}_5 + (\hat{x}_3 - x_{s,3})\hat{x}_6}{\sqrt{(\hat{x}_1 - x_{s,1})^2 + (\hat{x}_2 - x_{s,2}) + (\hat{x}_3 - x_{s,3})}}.$$

The measurement equation for one Doppler shift measurement made at site s is:

$$\hat{z}^i(\hat{x}^i) = h(\hat{x}^i) = -\frac{f_c}{c} \frac{\left((\hat{x}_1^i - x_{s,1})\hat{x}_4^i + (\hat{x}_2^i - x_{s,2})\hat{x}_5^i + (\hat{x}_3^i - x_{s,3})\hat{x}_6^i\right)}{\sqrt{(\hat{x}_1^i - x_{s,1})^2 + (\hat{x}_2^i - x_{s,2})^2 + (\hat{x}_3^i - x_{s,3})^2}} + \hat{x}_7^i.$$

The measurement equation is evaluated using predicted states as indicated in the EKF iteration equations above; however, the time dependence is not shown here. Using the measurement equation, the partial derivatives with respect to the states can be computed to define the linearized measurement equation. This results in the following relations:

$$\frac{\partial h(\hat{x})}{\partial \hat{x}}\bigg|_{\hat{x}=\hat{x}^i} = \left(\frac{\partial h(\hat{x})}{\partial \hat{x}_1} \frac{\partial h(\hat{x})}{\partial \hat{x}_2} \frac{\partial h(\hat{x})}{\partial \hat{x}_3} \frac{\partial h(\hat{x})}{\partial \hat{x}_4} \frac{\partial h(\hat{x})}{\partial \hat{x}_5} \frac{\partial h(\hat{x})}{\partial \hat{x}_6} \frac{\partial h(\hat{x})}{\partial \hat{x}_7}\right)\bigg|_{\hat{x}=\hat{x}^i}$$

$$\frac{\partial h(\hat{x})}{\partial \hat{x}_1}\bigg|_{\hat{x}=\hat{x}^i} = -\frac{fc}{c}\frac{\hat{x}_4^i}{\sqrt{(\hat{x}_1^i-x_{s,1})^2+(\hat{x}_2^i-x_{s,2})^2+(\hat{x}_3^i-x_{s,3})^2}}+$$

$$\frac{fc}{c}\frac{(\hat{x}_1^i-x_{s,1})\left((\hat{x}_1^i-x_{s,1})\hat{x}_4^i+(\hat{x}_2^i-x_{s,2})\hat{x}_5^i+(\hat{x}_3^i-x_{s,3})\hat{x}_6^i\right)}{\left((\hat{x}_1^i-x_{s,1})^2+(\hat{x}_2^i-x_{s,2})^2+(\hat{x}_3^i-x_{s,3})^2\right)^{\frac{3}{2}}},$$

$$\frac{\partial h(\hat{x})}{\partial \hat{x}_2}\bigg|_{\hat{x}=\hat{x}^i} = -\frac{fc}{c}\frac{\hat{x}_5^i}{\sqrt{(\hat{x}_1^i-x_{s,1})^2+(\hat{x}_2^i-x_{s,2})^2+(\hat{x}_3^i-x_{s,3})^2}}+$$

$$\frac{fc}{c}\frac{(\hat{x}_2^i-x_{s,2})\left((\hat{x}_1^i-x_{s,1})\hat{x}_4^i+(\hat{x}_2^i-x_{s,2})\hat{x}_5^i+(\hat{x}_3^i-x_{s,3})\hat{x}_6^i\right)}{\left((\hat{x}_1^i-x_{s,1})^2+(\hat{x}_2^i-x_{s,2})^2+(\hat{x}_3^i-x_{s,3})^2\right)^{\frac{3}{2}}},$$

$$\frac{\partial h(\hat{x})}{\partial \hat{x}_3}\bigg|_{\hat{x}=\hat{x}^i} = -\frac{fc}{c}\frac{\hat{x}_6^i}{\sqrt{(\hat{x}_1^i-x_{s,1})^2+(\hat{x}_2^i-x_{s,2})^2+(\hat{x}_3^i-x_{s,3})^2}}+$$

$$\frac{fc}{c}\frac{(\hat{x}_3^i-x_{s,3})\left((\hat{x}_1^i-x_{s,1})\hat{x}_4^i+(\hat{x}_2^i-x_{s,2})\hat{x}_5^i+(\hat{x}_3^i-x_{s,3})\hat{x}_6^i\right)}{\left((\hat{x}_1^i-x_{s,1})^2+(\hat{x}_2^i-x_{s,2})^2+(\hat{x}_3^i-x_{s,3})^2\right)^{\frac{3}{2}}},$$

$$\frac{\partial h(\hat{x})}{\partial \hat{x}_4}\bigg|_{\hat{x}=\hat{x}^i} = -\frac{fc}{c}\frac{(\hat{x}_1^i-x_{s,1})}{\sqrt{(\hat{x}_1^i-x_{s,1})^2+(\hat{x}_2^i-x_{s,2})^2+(\hat{x}_3^i-x_{s,3})^2}},$$

$$\frac{\partial h(\hat{x})}{\partial \hat{x}_5}\bigg|_{\hat{x}=\hat{x}^i} = -\frac{fc}{c}\frac{(\hat{x}_2^i-x_{s,2})}{\sqrt{(\hat{x}_1^i-x_{s,1})^2+(\hat{x}_2^i-x_{s,2})^2+(\hat{x}_3^i-x_{s,3})^2}},$$

$$\frac{\partial h(\hat{x})}{\partial \hat{x}_6}\bigg|_{\hat{x}=\hat{x}^i} = -\frac{fc}{c}\frac{(\hat{x}_3^i-x_{s,3})}{\sqrt{(\hat{x}_1^i-x_{s,1})^2+(\hat{x}_2^i-x_{s,2})^2+(\hat{x}_3^i-x_{s,3})^2}},$$

$$\frac{\partial h(\hat{x})}{\partial \hat{x}_7}\bigg|_{\hat{x}=\hat{x}^i} = 1.$$

The above-described embodiments, the measurement updates are irregular and scalar; hence the measurement covariance matrix is also scalar and equal to $r^i$.

The mode transition matrix is fixed in the standard IMM filter, assuming regular/periodic measurement updates. In some embodiments, the measurement updates may be irregular and/or aperiodic, which can affect the performance. In particular, the mode mixing of the IMM filter will become very high per second, possibly leading to an under-utilization of the straight-line movement mode.

To handle this potential issue, some embodiments provide a continuous time mode transition probability model that is then sampled. The parameters of this model can then be determined from a well working mode transition matrix, for a given difference between measurement update times, this difference being denotes "sampling period" hereafter. Then the continuous time model can be re-sampled (re-discretized) every time a new measurement arrives.

The continuous-time model should reflect that the net increase of each mode probability equals the sum of diffused probability from the other modes minus the diffusion from the same mode. A reasonable model for the diffused mode probability from a mode i is the product of a mode unique diffusion rate parameter, $\Delta_{ij}$, the time increment h, and the mode probability of the originating mode, $\mu_i(t)$. This gives the vector model:

$$\begin{pmatrix}\mu_1(t+h)\\\vdots\\\mu_n(t+h)\end{pmatrix} = \begin{pmatrix}\mu_1(t)\\\vdots\\\mu_n(t)\end{pmatrix} + \begin{pmatrix}\lambda_{11} & \cdots & \lambda_{1n}\\\vdots & \ddots & \vdots\\\lambda_{n1} & \cdots & \lambda_{nn}\end{pmatrix}h\begin{pmatrix}\mu_1(t)\\\vdots\\\mu_n(t)\end{pmatrix}.$$

A rearrangement gives:

$$\frac{1}{h}\left(\begin{pmatrix}\mu_1(t+h)\\\vdots\\\mu_n(t+h)\end{pmatrix} - \begin{pmatrix}\mu_1(t)\\\vdots\\\mu_n(t)\end{pmatrix}\right) = \begin{pmatrix}\lambda_{11} & \cdots & \lambda_{1n}\\\vdots & \ddots & \vdots\\\lambda_{n1} & \cdots & \lambda_{nn}\end{pmatrix}\begin{pmatrix}\mu_1(t)\\\vdots\\\mu_n(t)\end{pmatrix}.$$

The definition of the derivative then gives the ordinary differential equation $$\begin{pmatrix}\dot{\mu}_1(t)\\\vdots\\\dot{\mu}_n(t)\end{pmatrix} = \begin{pmatrix}\lambda_{11} & \cdots & \lambda_{1n}\\\vdots & \ddots & \vdots\\\lambda_{n1} & \cdots & \lambda_{nn}\end{pmatrix}\begin{pmatrix}\mu_1(t)\\\vdots\\\mu_n(t)\end{pmatrix},$$

with the solution of:

$$\begin{pmatrix}\mu_1(\tau)\\\vdots\\\mu_n(\tau)\end{pmatrix} = \exp\left(\begin{pmatrix}\lambda_{11} & \cdots & \lambda_{1n}\\\vdots & \ddots & \vdots\\\lambda_{n1} & \cdots & \lambda_{nn}\end{pmatrix}\tau\right)\begin{pmatrix}\mu_1(0)\\\vdots\\\mu_n(0)\end{pmatrix}.$$

The result is complicated and requires a numerical solution to compute the three unknowns. However, there is another constraint that is useful. Considering that for a stationary non-zero solution, the derivative is zero and the probabilities sum to unity, which leads to:

$$\lambda_{11} = -\lambda_{12}$$

$$\lambda_{22} = -\lambda_{21}.$$

Making use of these relations gives the following:

$$\exp\begin{pmatrix}\lambda_{11}\tau & -\lambda_{11}\tau\\-\lambda_{22}\tau & \lambda_{22}\tau\end{pmatrix} = \begin{pmatrix}\frac{\lambda_{22}+\lambda_{11}e^{(\lambda_{11}+\lambda_{22})\tau}}{\lambda_{11}+\lambda_{22}} & -\frac{\lambda_{11}(e^{(\lambda_{11}+\lambda_{22})\tau}-1)}{\lambda_{11}+\lambda_{22}}\\-\frac{\lambda_{22}(e^{(\lambda_{11}+\lambda_{22})\tau}-1)}{\lambda_{11}+\lambda_{22}} & \frac{\lambda_{11}+\lambda_{22}e^{(\lambda_{11}+\lambda_{22})\tau}}{\lambda_{11}+\lambda_{22}}\end{pmatrix}$$

For IMM embodiments applicable to irregularly sampled measurements, the sampled version of the mode switching matrix is needed. This can be obtained by replacing $\tau$ with $T_k = t_k - t_{k-1}$ to represent a variable sampling interval (i.e., between successive samples). Consequently, the mixing probabilities are given by:

$$\mu_{i|j} = \exp\left(\begin{pmatrix}\lambda_{11} & \lambda_{12}\\\lambda_{21} & \lambda_{22}\end{pmatrix}T_k\right).$$

In the simplified cases with additional conditions imposed, the above becomes:

$$\mu_{i|j} =$$

$$\exp\begin{pmatrix}\lambda_{11}T_k & -\lambda_{11}T_k\\-\lambda_{22}T_k & \lambda_{22}T_k\end{pmatrix} = \begin{pmatrix}\frac{\lambda_{22}+\lambda_{11}e^{(\lambda_{11}+\lambda_{22})T_k}}{\lambda_{11}+\lambda_{22}} & -\frac{\lambda_{11}(e^{(\lambda_{11}+\lambda_{22})T_k}-1)}{\lambda_{11}+\lambda_{22}}\\-\frac{\lambda_{22}(e^{(\lambda_{11}+\lambda_{22})T_k}-1)}{\lambda_{11}+\lambda_{22}} & \frac{\lambda_{11}+\lambda_{22}e^{(\lambda_{11}+\lambda_{22})T_k}}{\lambda_{11}+\lambda_{22}}\end{pmatrix}.$$

Therefore, given the continuous time parameters and the sampling period, a time varying discrete time transition probability matrix can be computed. This makes the mode mixing invariant with respect to the variation between successive measurement times.

The following describes simulation techniques that can be used to validate the performance of exemplary embodiments described above. In these techniques, an actual trajectory of an aerial UE can be generated with acceleration control. This creates data that cannot be perfectly modeled by the constant velocity filters, like in actual state estimation scenarios. An acceleration profile is set up manually to drive the drone. The simulation also specifies the number of RAN nodes and locates their antenna centers in the coordinate system, using a locked random generator seed. The actual trajectory of the aerial UE is generated with numerical integration with a selected integration time of 0.1 sec. The average and random parts of the sampling period of each RAN node are then specified, thereby creating asynchronous measurements with some jitter. The simulation also defines a UE Doppler shift bias of 70 Hz as well as the measurement standard deviation of each RAN node.

The simulated Doppler shift measurements of each RAN node is then obtained by interpolation of the aerial UE state to each measurement time, followed by application of the nonlinear measurement equation and addition of random noise. Extensive simulations were then run to tune the performance of the aerial UE state estimator according to various embodiments. The results are summarized in Table 2 below and FIGS. 13-16.

additional measurement to resolve. In practice, however, one or more additional measurements may be needed and/or preferred for improving state estimation performance, e.g., due to singular lower-dimensional measurement subspaces in the measurement coordinates.

When a state estimation process is initiated, the relevant set of neighbor RAN nodes need to be prepared for measurement and reporting of measured results. This means that the serving RAN node (e.g., for the aerial UE) must select the particular set of neighbor RAN nodes from all available neighbor RAN nodes (e.g., in the vicinity). Various embodiments of selection techniques are described below.

In some embodiments, the serving RAN node can utilize a pre-determined set of neighbors $1 \ldots S(c)$ for each cell, c, which can be expressed as:

$$ID_{neighbours} = \{ID_{c(1)}, \ldots ID_{c(l)}, \ldots, ID_{c(S(c))}\},$$

where the respective IDs can be cell global identifiers (CGIs), node identifiers, etc. For example, the list of IDs could be a subset of a neighbor CGI list that is used for UE positioning in LTE. That choice can be particularly useful since the cellular system typically stores associations between CGIs, antenna coordinates, and antenna pointing directions in managed object models (MoMs) used for logical modeling of the network. One drawback with this solution is that it requires some degree of manual configuration.

In other embodiments, the above list can be used as a starting point and then refined during an initialization and/or setup period. This procedure can be described by the following three steps and/or operations, which are illustrated respectively by FIGS. 17A-C.

1. (FIG. 17A) Starting with a complete neighbor cell list, select a subset according to:

$$ID_{neighbour,subset} \subset ID_{neighbours}.$$

The subset can be selected in various ways and/or using various criteria. For example, the selection can be based on least distance from the center of the serving cell for the aerial UE. In addition or as an alternative, neighbor cells having antennas pointing in the direction of the center of the serving cell could also be favored over those that do not. Significantly more cells than a preferred number of ~5 could be initially selected. Another criteria that can be considered is random selection from suitable cells, such that the same cells and/or RAN nodes would not be selected repetitively. This could be done by first selecting a number of candidate cells (e.g., based on closeness) followed by a random selection of $ID_{neighbour,subset}$ from the candidates.

TABLE 2

| Parameter | Description | Value |
| --- | --- | --- |
| $r^i$ | The assumed Doppler shift measurement standard deviation of mode i. Note: In case measurement SNR is estimated and signaled, $r^i$ may be set to the corresponding Doppler shift standard deviation value, for each measurement. | 5.0 Hz |
| $\sqrt{q_{11}^1}$ | Almost constant velocity mode acceleration systems noise. | 4.0 m/s² |
| $\sqrt{q_{22}^1}$ | Almost constant velocity mode acceleration systems noise. | 4.0 m/s² |
| $\sqrt{q_{33}^1}$ | Almost constant velocity mode acceleration systems noise. | 4.0 m/s² |
| $\sqrt{q_{11}^2}$ | Maneuver velocity mode acceleration systems noise. | 25.0 m/s² |
| $\sqrt{q_{22}^2}$ | Maneuver velocity mode acceleration systems noise. | 25.0 m/s² |
| $\sqrt{q_{33}^2}$ | Maneuver velocity mode acceleration systems noise. | 25.0 m/s² |
| $\sqrt{q_{bias}}$ | UE Doppler drift rate systems noise. | 1/180 Hz/s |
| $\lambda_{11}$ | Mode switch rate 1→1 | −0.20 s⁻¹ |
| $\lambda_{22}$ | Mode switch rate 2→2 | −0.10 s⁻¹ |

Figure 13:
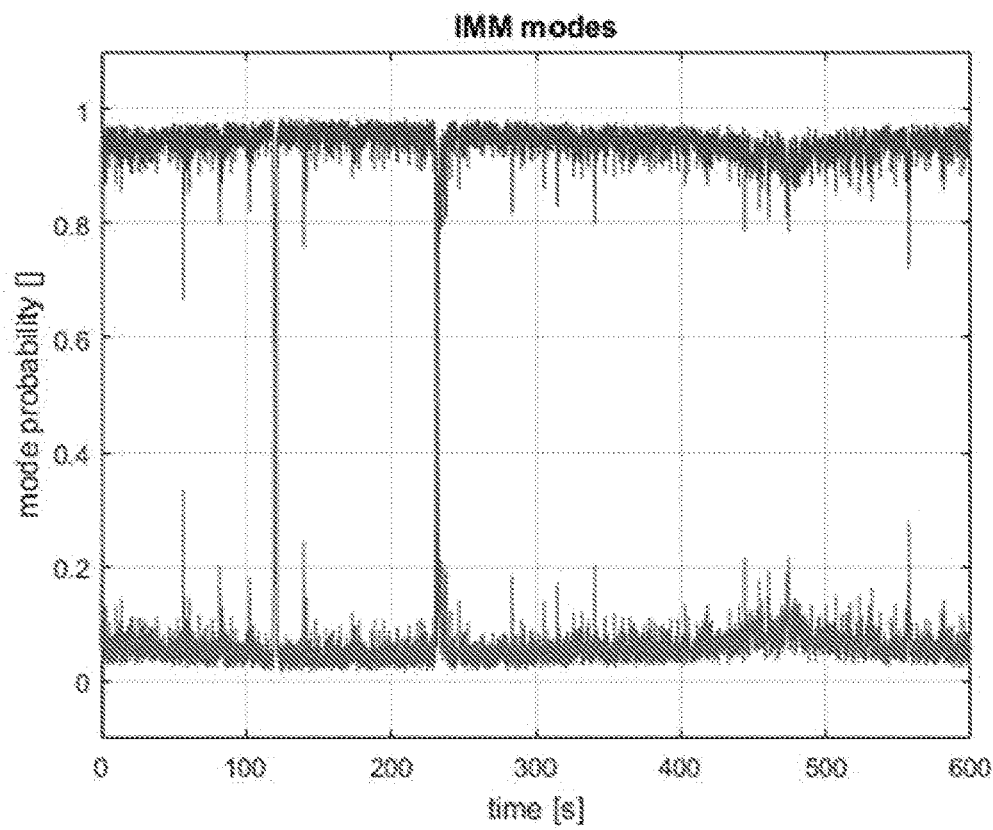
FIGS. 13-16 show various simulation results for an aerial UE state estimator configured according to exemplary embodiments described herein.
Figure 14:
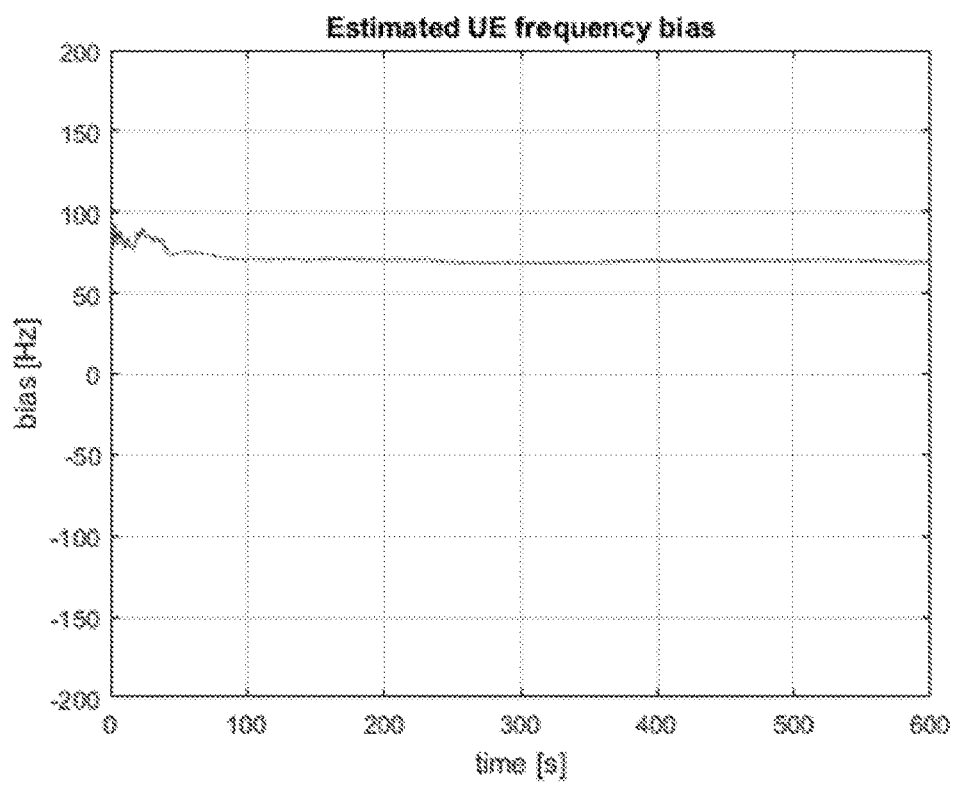

FIG. 13 shows a graph of mode probabilities for an average sampling period per site (for six sites) of 0.5 sec and a Doppler shift standard deviation of 5.0 Hz. The top curve represents the almost constant velocity mode while the bottom curve represents the maneuver velocity mode. FIG. 14 shows a graph of the Doppler bias estimate for the same arrangement. Note the quick convergence to the actual value of 70 Hz.

Figure 15:
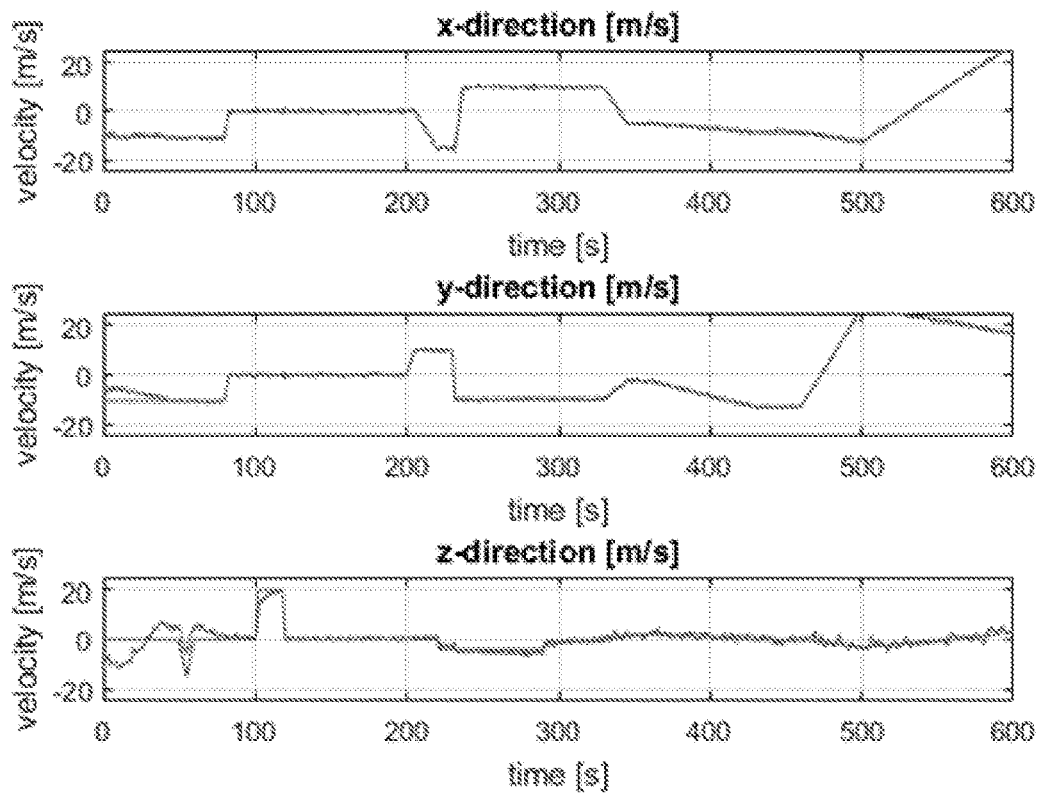
Figure 16:
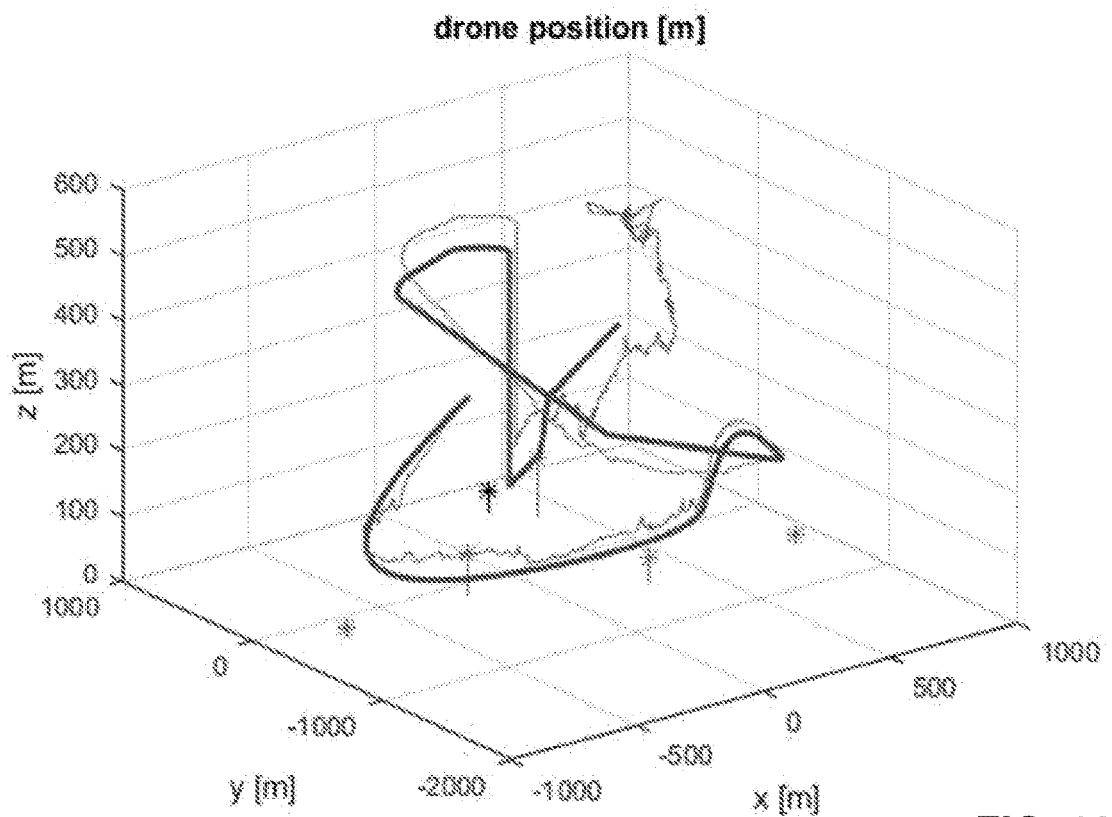

FIG. 15 shows a graph of aerial UE velocity estimates in three dimensions or directions (in m/s) for the same arrangement. Finally, FIG. 16 shows the aerial UE position estimation performance in three dimensions. Note the asterisks (*) represent the 3D positions of the six network antenna sites corresponding to the measurements.

As mentioned above, some embodiments involve techniques for generating and utilizing a set of neighbor RAN nodes for measurement and reporting of range- and range rate-related measurements such as RTT, TOA, pathloss, Doppler shift, etc. In general, the minimum number of neighbor cell measurements are three for ranges and four for range rates, since the UE Doppler bias estimation requires an 2. (FIG. 17B) Initialize state estimation based on $ID_{neighbour,subset}$ and then monitor:
   i. which neighbor RAN nodes/cells are able to report a result, and
   ii. the quality of reported results (e.g., signal to interference and noise ratio, SINR). Both of these can be aggregated over time into various statistics and/or quantities for each reporting neighbor cell, e.g. mean, standard deviation, probability distribution, likelihood of reporting, etc. Various post processing can be applied on the aggregated statistics and/or quantities, after which the neighbor RAN nodes and/or cells are sorted in increasing order of preference. The sorted list is denoted $ID_{neighbour,subset,sorted}$.
3. (FIG. 17C) After enough statistics have been collected, the serving RAN node can adapt the neighbor selection process to select only from neighbor RAN nodes and/or cells with the best statistics, e.g., above some predetermined threshold. This is shown in FIG. 17C as selecting from $ID_{neighbour,subset,sorted}$ instead of $ID_{neighboursubset}$.

Various information about the selected neighbor RAN nodes and/or cells is needed to initialize the aerial UE state estimation in the serving RAN node. This includes some or all of the following for each:

ID of the neighbor RAN node and/or cell that will perform the measurement, further subdivided to antenna direction level (mandatory, preferably CGI);

3D Cartesian position of the antenna used for measurement (mandatory);

3D Cartesian coordinate system of the antenna position, such as earth-centered earth-fixed (ECEF), etc. (optional, may be pre-coordinated);

Orientation of the antenna used for measurement, e.g., azimuth and elevation angles (optional).

Figure 18:
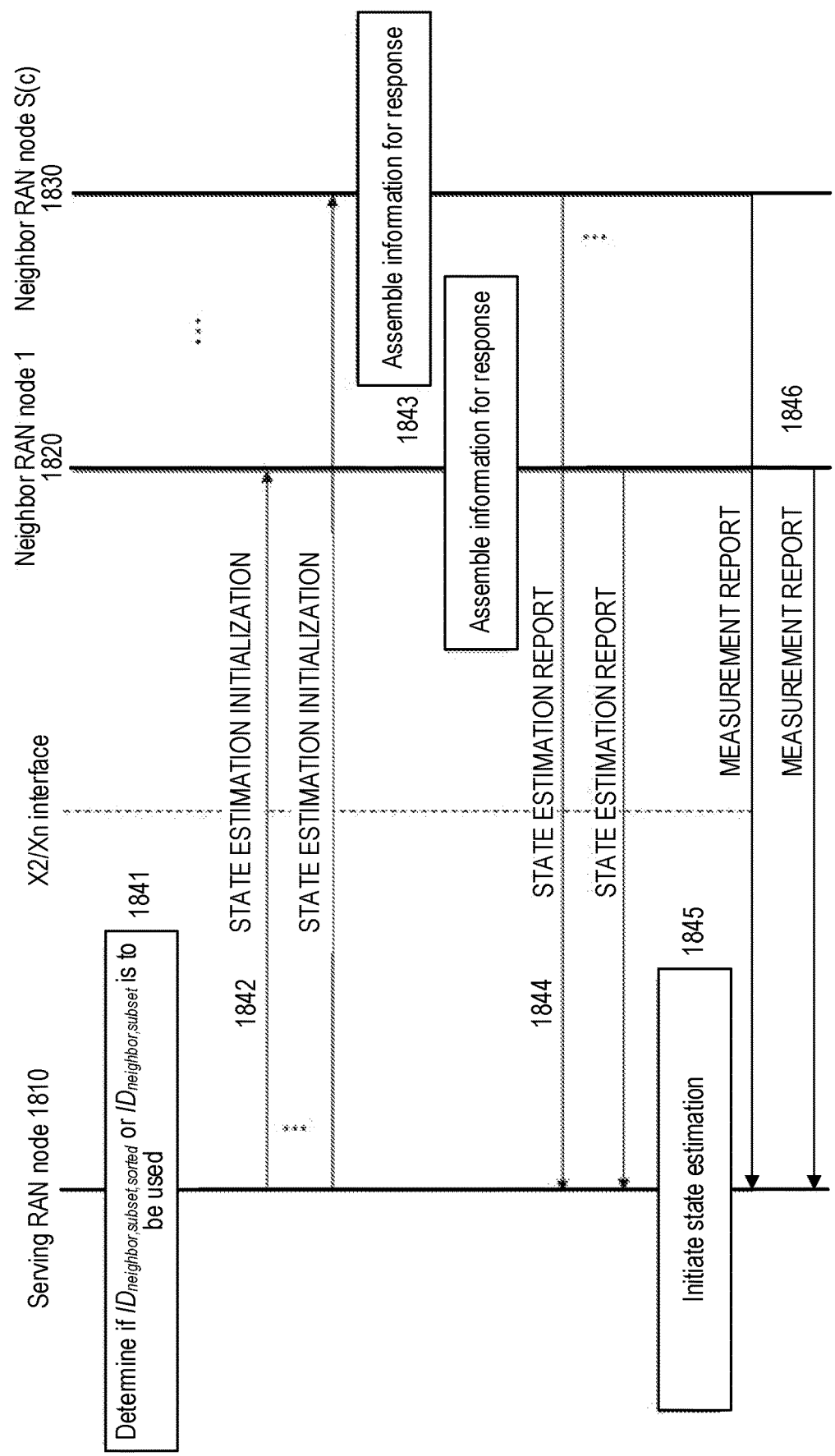
FIG. 18 is a signal flow diagram that illustrates various operations performed by a serving RAN node and neighbor RAN nodes with respect to supporting aerial UE state estimation by the serving RAN node, according to various exemplary embodiments of the present disclosure.

FIG. 18 is a signal flow diagram that illustrates various operations performed by a serving RAN node and neighbor RAN nodes with respect to supporting aerial UE state estimation by the serving RAN node. In particular, FIG. 18 shows conventional interfaces and protocols between a serving RAN node 1810, a first neighbor RAN node 1820, and a neighbor RAN node S(c) 1830. However, nodes 1820 and 1830 are merely representative of various other neighbor RAN nodes that can be involved in the procedure.

In operation 1841, the serving RAN node determines if $ID_{neighbour,subset,sorted}$ or $ID_{neighbour,subset}$ should be used for selecting neighbor RAN nodes to provide measurements supporting aerial UE state estimation by the serving RAN node. This operation can correspond to operations shown in FIG. 17C, discussed above. After choosing one of these lists, the serving RAN node selects S(c) neighbor cells from this list, which are represented by at least nodes 1820 and 1830.

In operation 1842, the serving RAN node sends STATE ESTIMATION INITIALIZATION messages to each of the selected neighbor RAN nodes. This message can include information identifying the aerial UE that can facilitate the respective RAN nodes to perform the requested measurements. For example, each STATE ESTIMATION INITIALIZATION message can include one or more of the following: an identifier of the serving cell; scrambling code associated with the aerial UE's uplink (UL) transmission in the serving cell; and timing alignment of the aerial UE's UL transmissions in relation to the serving cell.

In operation 1843, the neighbor RAN nodes can assemble the relevant neighbor cell information needed by the serving RAN node to initiate state estimation, as discussed above. In operation 1844, the neighbor RAN nodes can send respective STATE ESTIMATION REPORT messages with the assembled information. For example, any of the following can be included for each neighbor cell: identifier of the neighbor cell (e.g., CGI, PCI), type of antenna used for the neighbor cell, geographic location of the antenna for the neighbor cell, direction or orientation of the antenna for the neighbor cell, and downlink transmission power used in the neighbor cell.

In some embodiments, reception of a STATE ESTIMATION INITIALIZATION message can cause a neighbor RAN node to begin performing measurements based on the information included in this message. This arrangement is shown in FIG. 18. The neighbor RAN node(s) can begin performing measurements as soon as possible, or a predetermined delay, after reception of this message. In other embodiments, the serving RAN node can send additional messages (e.g., MEASUREMENT INITIATION) to the respective neighbor RAN nodes to request and/or initiate the measurements on the UE in the neighbor cells. These optional messages can be sent/received after the STATE ESTIMATION REPORT messages. In some cases, these message may include additional information about UE transmissions that can facilitate the measurements.

In operation 1845, the serving RAN node can initiate aerial UE state estimation based on the information received from the neighbor RAN nodes. In operation 1846, the various neighbor RAN nodes can send MEASUREMENT REPORT messages to the serving RAN node. In general, each measurement report message can include the following measurements for each neighbor cell in which measurements of the aerial UE were performed:

range and distance between the UE and respective antennas for the neighbor cells; and/or range rate or Doppler shift between the UE and respective antennas for the neighbor cells.

Such messages can also include other information associated with such measurements, including measurement time and various measurement statistics (e.g., SINR, standard deviation, variance, etc.) that can be useful for EKF-based state estimation.

The various messages shown in FIG. 18 can be sent over an existing interface between the RAN nodes, such as an X2 interface (e.g., between eNBs and/or en-gNBs) or an Xn interface (e.g., between gNBs and/or ng-eNBs). The specific messages can be specified in a 3GPP standard or can be vendor-proprietary, e.g., if all involved RAN nodes are from the same vendor.

For example, an X2AP private extension can be used by an eNB to offer an extended set of services to its neighbors. With the X2AP private extension, proprietary information can be attached to standard X2AP messages. Extensions may be attached at the PDU (message) level or within specific (standard) Information Elements (IEs).

As another example, an X2AP private extension can be modelled as a private X2AP sub-layer on top of the standard X2AP sub-layer. An X2AP-private-PDU is transported between the peer private X2AP entities, carried in the PRIVATE MESSAGE provided by the standard X2AP sub-layer. The X2AP-private-PDUs can be used for vendor-specific X2AP procedures.

As another example, extension of standard X2AP PDUs can be used in specific cases. The extensions can complement the standard X2AP procedures. Those extensions are placed in private IEs within a vendor specific X2AP conveyor IE, attached to a specific standard X2AP PDU/message. On request from sending private X2AP entity, the eNB initiating the procedure sends a PRIVATE MESSAGE to the peer eNB. The eNB initiating the procedure includes the X2AP-private-PDU IE in the PRIVATE MESSAGE. If X2AP-private-PDU IE is included in the PRIVATE MESSAGE, the receiving eNB forwards the private X2AP PDU to the receiving private X2AP entity.

As another example, an X2AP conveyor IE is a vendor-specific IE that is placed as the very last element within a specific standard X2AP message or IE. It can be used to convey vendor-proprietary IEs that are applicable as a complement to the specific standard X2AP message or IE to which it is attached.

As mentioned above, certain embodiments include techniques for initialization of an IMM drone state estimator in multiple points of the serving cell for an aerial UE. These embodiments are based on the principle that an IMM movement mode is characterized by the following:

Dynamic model, including the covariance matrices; and
Initial variables, e.g., initial mean state vector $x_0$ and initial mean covariance matrix $P_0$.

Based on these principles, embodiments provide initialization at multiple points by creating multiple copies of a movement mode (e.g., maneuver velocity mode discussed above), each with a separate pair of $x_0$ and $P_0$. Subsequently, the IMM filter will automatically identify over some number of iterations the initial value (i.e., the movement mode copy) that best fits the measured data. After a while, which is generally much shorter than if one initial value were used, the multiple modes will converge to a situation where one subset of modes have very similar state estimates and a sum of mode probabilities that are very close to unity, while other sets will have mode probabilities very close to zero, indicating that the initialization for these modes/initial values has failed and/or has not yet converged.

In some embodiments, the maneuver modes are preferred to be selected for replication since, as observed by Applicant, these are more likely to reach a true state estimate much faster than almost-constant velocity and hovering mode models. The maneuver modes can include a constant velocity movement model with a high amount of systems noise, as simulated above. Alternately, a maneuver mode may use a constant acceleration model. A preferred way to create a set of initial conditions for maneuver modes are described below, in which the maneuver mode initial values are indexed as:

$$x_{o,m} = \begin{pmatrix} x_{0,pos,m} \\ x_{0,vel,m} \end{pmatrix}, \quad P_{0,m} = \begin{pmatrix} P_{0,pos,pos,m} & P_{0,pos,vel,m} \\ P_{0,pos,vel,m} & P_{0,vel,vel,m} \end{pmatrix}, \quad m = 1, \ldots, M.$$

The subscript "pos" denotes a 3D position state while the subscript "vel" denotes a 3D velocity state. In case of an acceleration model the above model can be augmented with three acceleration states and the initial covariance matrix can be augmented correspondingly.

In some embodiments, the state variables $x_{0,vel}$ and $x_{0,acc}$ can be initialized as $x_{0,vel,m}=0$ and $x_{0,acc,m}=0$, since there is generally no knowledge about prior velocity or acceleration vector of the aerial UE. As a consequence, the corresponding covariance matrices may typically be selected as:

$$P_{0,vel,vel,m} = k_{0,vel,vel,m} \begin{pmatrix} (\max(x_4))^2 & 0 & 0 \\ 0 & (\max(x_5))^2 & 0 \\ 0 & 0 & (\max(x_6))^2 \end{pmatrix},$$

-continued $$P_{0,acc,acc,m} = k_{0,acc,acc,m} \begin{pmatrix} (\max(x_7))^2 & 0 & 0 \\ 0 & (\max(x_8))^2 & 0 \\ 0 & 0 & (\max(x_9))^2 \end{pmatrix}.$$

This accounts for any initial movement of the aerial UE. Typical values for drones may be $\max(x_4)=20$ m/s, $\max(x_5)=20$ m/s, $\max(x_6)=5\text{-}10$ m/s. In addition, $\max(x_7)=5\text{-}25$ m/s$^2$, $\max(x_8)=5\text{-}25$ m/s$^2$, $\max(x_9)=5\text{-}25$ m/s$^2$. The terms $k_{0,vel,m}$ and $k_{0,vel,m}$ are scale factors that are approximately one. The cross-covariance matrix blocks can be initialized to zero, since there is no such information available.

Furthermore, there is typically no information about exactly where the aerial UE is within the cell. It may enter the cell coverage area from a neighbor cell, or it could be launched from anywhere within the cell. It is therefore only possible to let $P_{0,pos,pos,m}$ equal the cell size uncertainty, expressed in terms of the cell radius $r_c$ and the maximum aerial UE altitude $h_{max}$:

$$P_{0,pos,pos,m} = \left( k_{0,pos,pos,m} \begin{pmatrix} (r_c/s)^2 & 0 & 0 \\ 0 & (r_c/s)^2 & 0 \\ 0 & 0 & (h_{max}/2)^2 \end{pmatrix} \right).$$

Typical values for $h_{max}$ are a few thousand meters. Cell radii can vary between 10 m and 20 km but are generally well known within each cellular RAN.

The $x_{0,pos,m}$ initial values can be selected in various ways according to various embodiments of the present disclosure. Unless specifically noted otherwise, the same techniques can be applied to both types of maneuver mode models described above.

In some embodiments, since the UE is attached to the serving cell, the center of the serving cell can be used for an $x_{0,pos,m}$ initial value:

$$x_{0,pos,1} = x_{center}.$$

The center of the cell can be computed in several ways according to the shape of the serving cell, e.g., as the center of gravity. For example, a cell can be represented by a Polygon shape specified by 3GPP, from which a center of gravity can be computed using known techniques. In such case, one of the modes can be initialized using the center of gravity while the remaining M−1 modes can be initialized using other techniques, such as described below.

In some embodiments, the serving RAN node can initialize one or more of $x_{0,pos,m}$ by randomly selecting one or more 3D positions within the coordinate space of the serving cell, as:

$$x_{0,pos,m} = x_{random}.$$

As an example, the serving RAN node can randomly select values for $x_1$ and $x_2$ within the range $[-r_c, r_c]$ of the cell center, and a value for $x_3$ in the range $[0, h_{max}]$. The random distributions used to select the respective values may be uniform or non-uniform (e.g., weighted more heavily toward cell center).

Even so, all positions within these ranges do not fall within the coverage area of the cell. There is therefore a need to check if the resulting $x_{random}$ is within the interior of the 3GPP-defined Polygon shape used to describe the cell's coverage area. An exemplary algorithm for this purpose is described in "RTT Positioning in WCDMA", *Proc. 5th*

Figure 19:
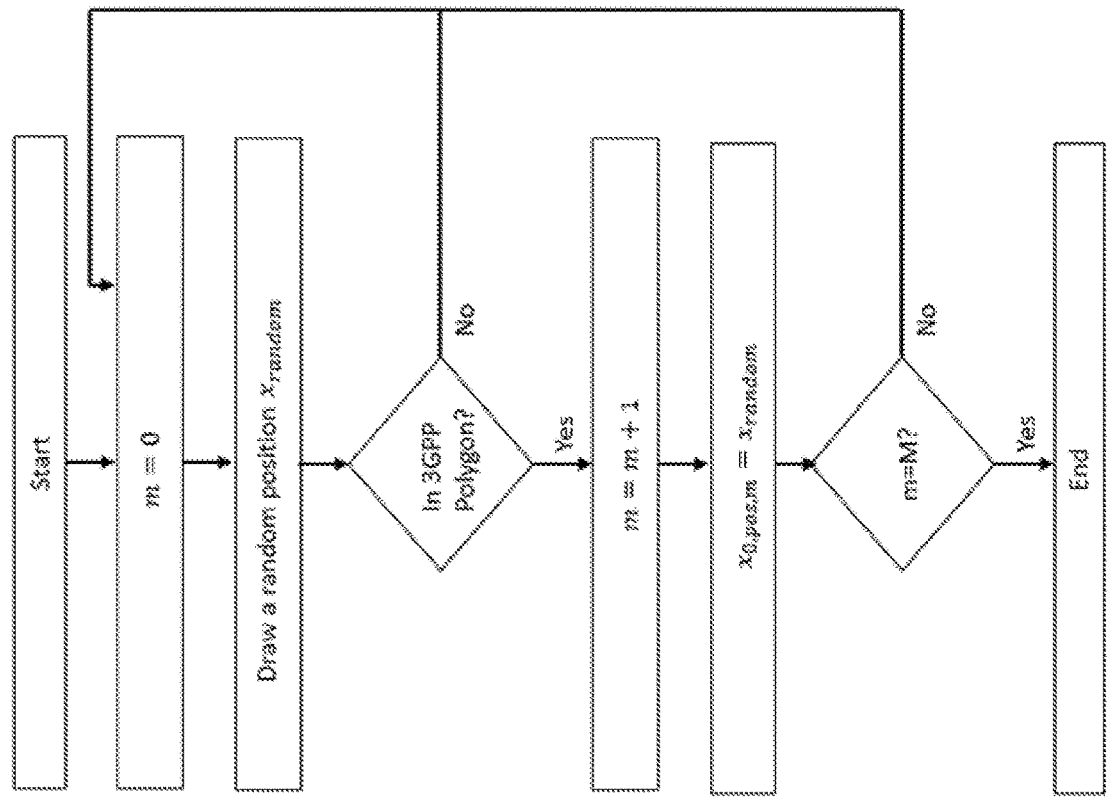

*International Conference on Wireless and Mobile Communications*, Cannes, France, 2009. If this or another exemplary algorithm determines that the randomly selected position is within the 3GPP Polygon, the point is used to initialize of one of the modes m=1, . . . , M. The procedure can be repeated until all M modes are initialized. FIG. 19 shows an exemplary flow chart of an initialization procedure according to these embodiments.

Figure 20:
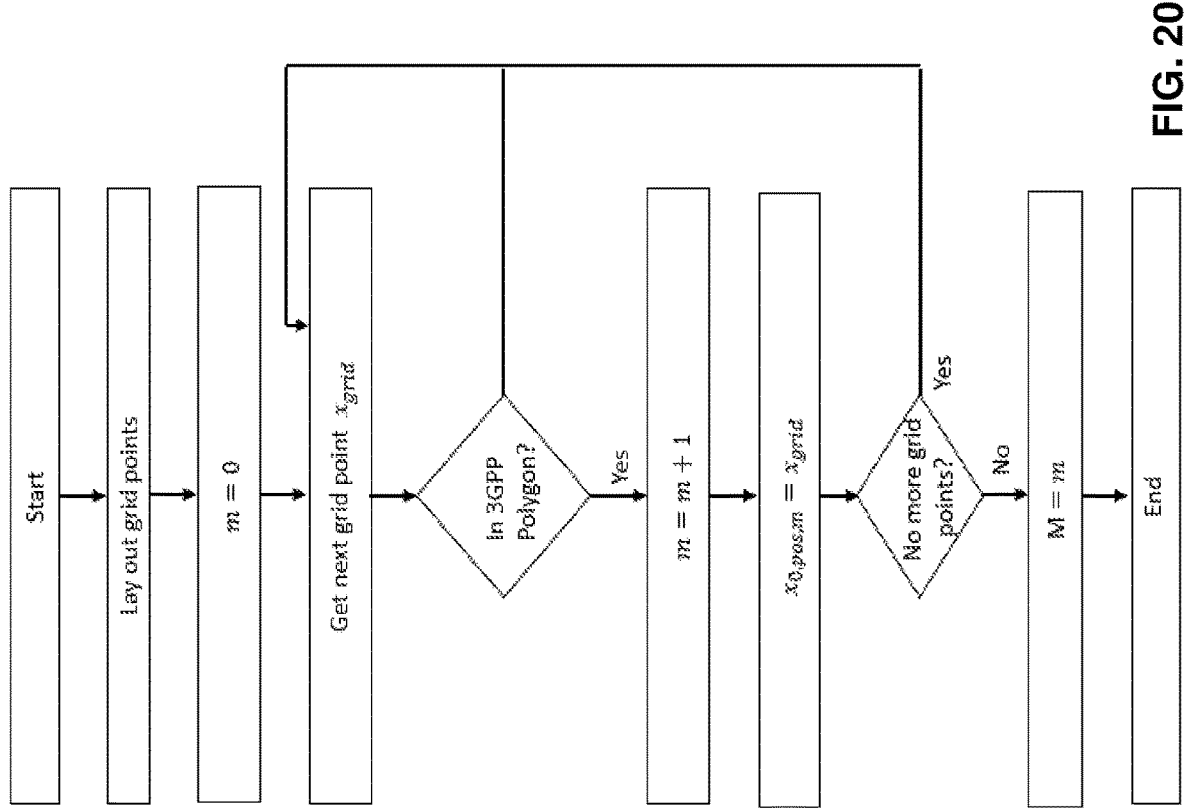
FIGS. 19-20 are flow diagrams of procedures for selecting initial position estimates for aerial UE state estimation, according to various exemplary embodiments of the present disclosure.

In some embodiments, a deterministic uniform grid of points within the 3D volume $\{[-r_c, r_c], [-r_c, r_c], [0, h_{max}]\}$ can be established with a known resolution in all three dimensions. The grid resolution can be the same in all three dimensions or can vary by dimension as needed and/or desired. Points of the uniform grid that are within the 3GPP Polygon describing the serving cell can be determined, e.g., in the same manner as described above. Grid points can be selected randomly, deterministically, or by a combination thereof. In some cases, the number of grid points within the 3GPP Polygon describing the cell can be equal to M, such that all grid points are used. FIG. 20 shows an exemplary flow chart of an initialization procedure according to these embodiments.

In some embodiments, the serving RAN node can exploit the fact that some drones enter via the cell border and some are launched within the cell when selecting initial values of $x_{0,pos,m}$. For example, $M_1$ initialization positions (i.e., $x_{0,pos,m}$ m=1 . . . $M_1$) can be selected on or near the boundary of the 3GPP Polygon describing the cell. The boundary points can be selected randomly, deterministically, or by a combination thereof. An exemplary technique is discussed in "Wireless hybrid positioning based on surface modeling with polygon support", *Proc. VTC* 2018 Spring, Porto, Portugal, June 2018.

Figure 21A:
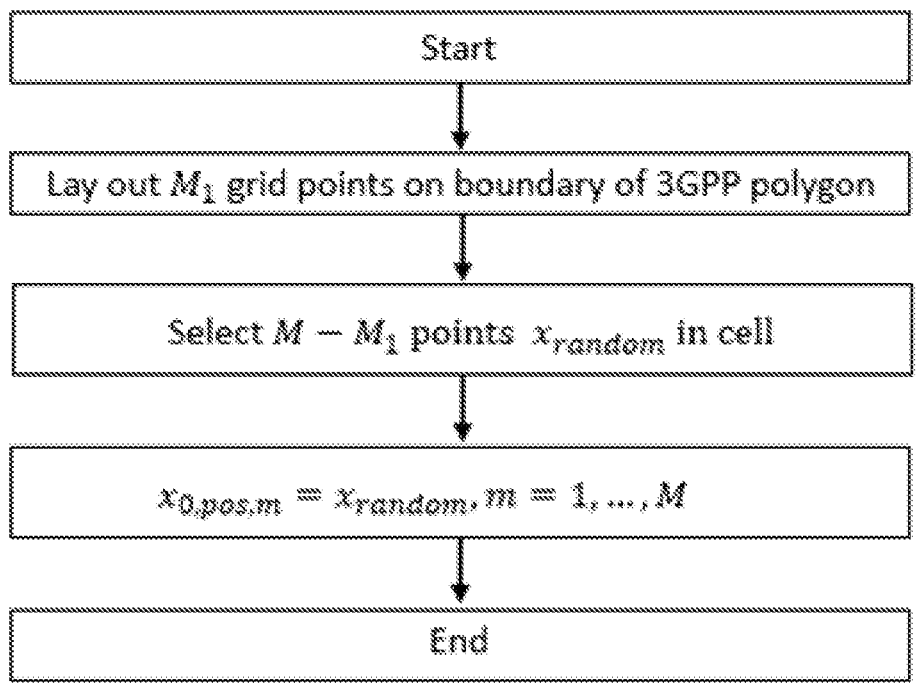
FIGS. 21A-B, shows flow diagrams of two variants of a procedure for selecting initial position estimates for aerial UE state estimation, according to various exemplary embodiments of the present disclosure.
Figure 21B:
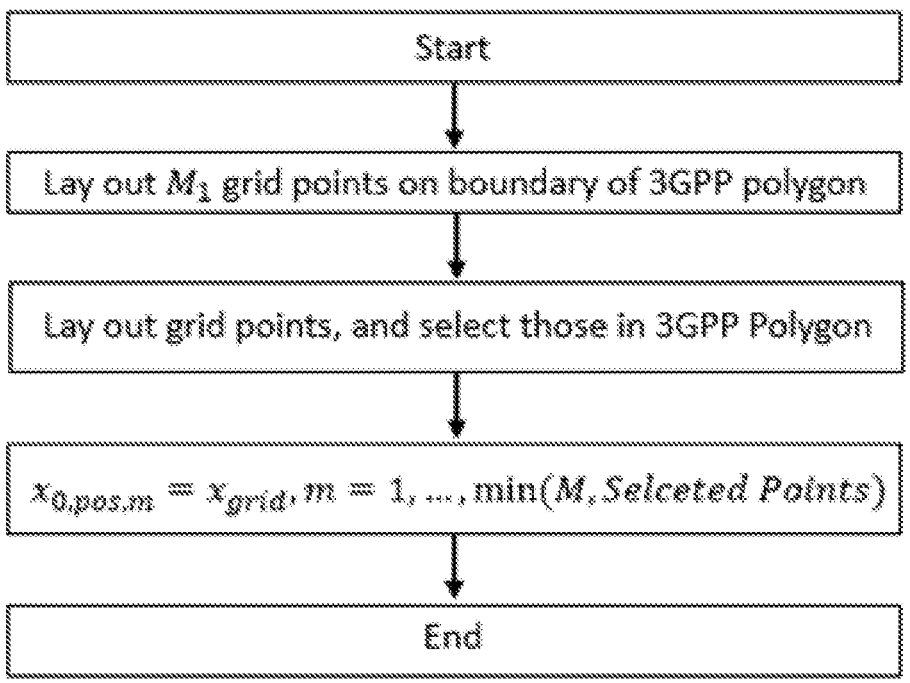

The serving RAN node can initialize the remaining M-$M_1$ positions based on any of the other embodiments discussed above. FIG. 21A shows an exemplary flow chart of an initialization procedure in which the remaining M-$M_1$ positions are selected randomly within a 3D region, similar to certain embodiments discussed above. FIG. 21B shows an exemplary flow chart of an initialization procedure in which the remaining M-$M_1$ positions are selected from a grid covering a 3D region, similar to other embodiments discussed above.

Figure 22A:
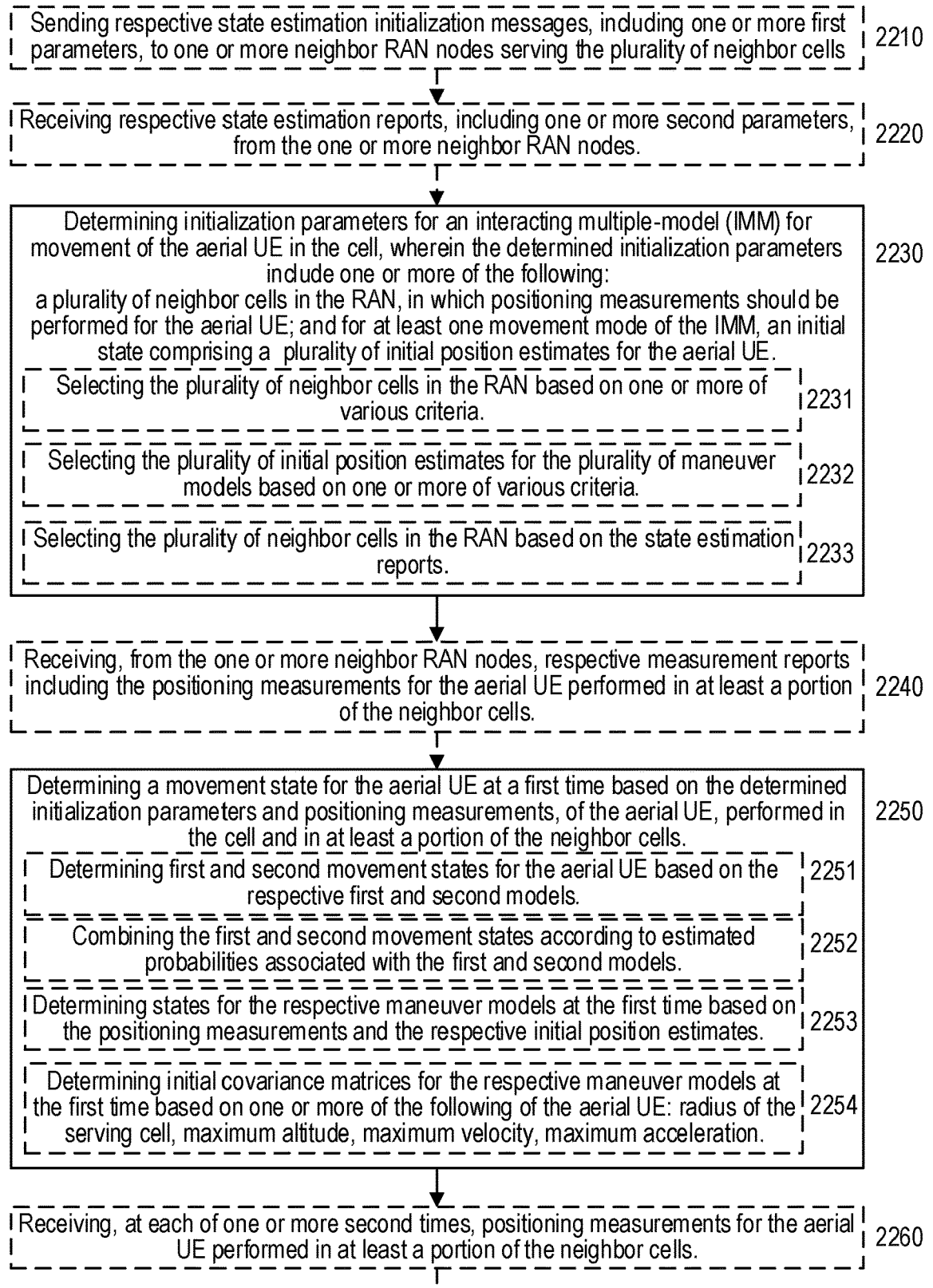
FIG. 22 is a flow diagram illustrating an exemplary method (e.g., procedure) for a first radio access network (RAN) node (e.g., base station, eNB, gNB, ng-eNB, en-gNB, etc. or component thereof), according to various exemplary embodiments of the present disclosure.
Figure 22B:
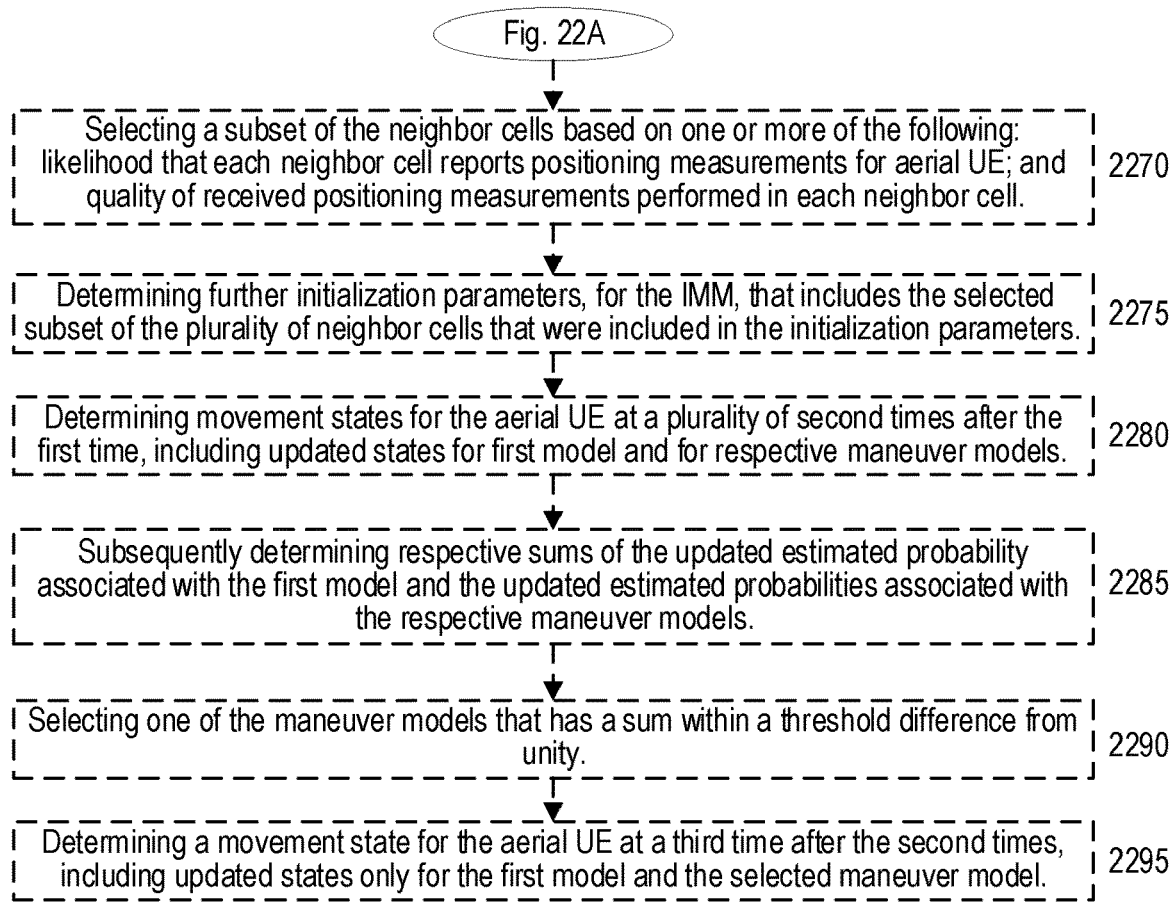
Figure 23:
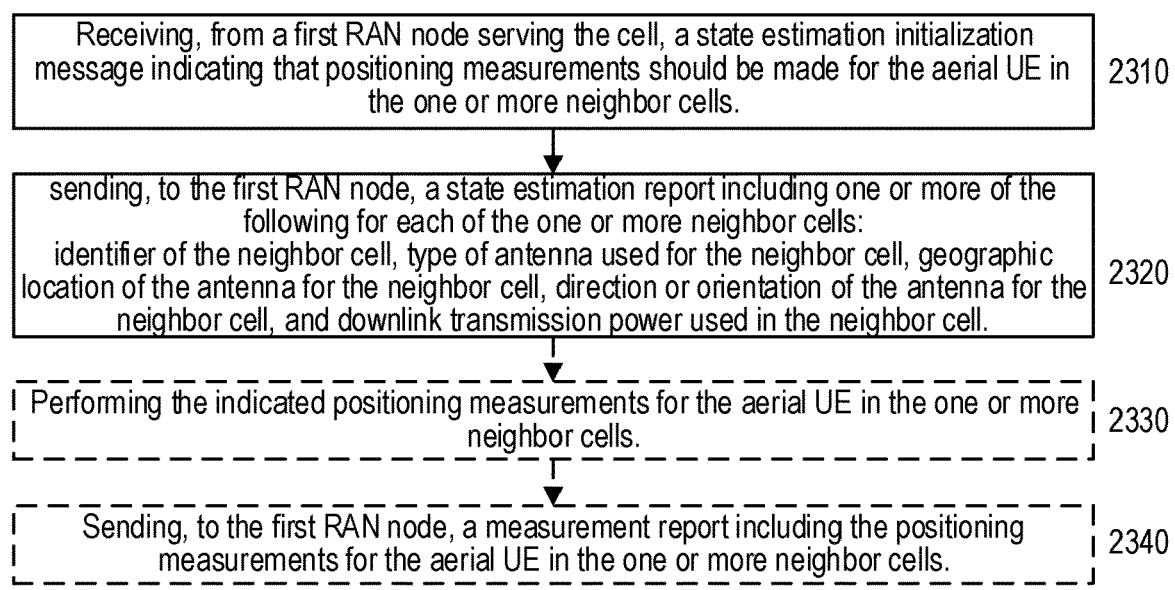
FIG. 23 is a flow diagram illustrating an exemplary method (e.g., procedure) for a second radio access network (RAN) node (e.g., base station, eNB, gNB, ng-eNB, en-gNB, etc. or component thereof), according to various exemplary embodiments of the present disclosure.

The embodiments described above can be further illustrated with reference to FIGS. 22-23, which depict exemplary methods (e.g., procedures) for a first RAN node and a second RAN node, respectively. In other words, various features of operations described below correspond to various embodiments described above. The exemplary methods shown in FIGS. 22-23 can also be used cooperatively (i.e., with each other and/or with other procedures described herein) to provide various exemplary benefits and/or advantages. Although FIGS. 22-23 show specific blocks in particular orders, the operations of the respective methods can be performed in different orders than shown and can be combined and/or divided into blocks having different functionality than shown. Optional blocks or operations are indicated by dashed lines.

In particular, FIG. 22 shows a flow diagram of an exemplary method (e.g., procedure) for estimating movement of an aerial user equipment (UE), according to various exemplary embodiments of the present disclosure. The exemplary method can be performed by a first radio access network (RAN) node (e.g., base station, eNB, gNB, ng-eNB, en-gNB, etc., or component thereof) serving the aerial UE in a cell of the RAN (e.g., E-UTRAN, NG-RAN).

The exemplary method can include the operations of block 2230, in which the first RAN node can determine initialization parameters for an interacting multiple-model (IMM) for movement of the aerial UE in the cell. The determined initialization parameters can include one or more of the following: a plurality of neighbor cells, in the RAN, in which positioning measurements should be performed for the aerial UE; and for at least one movement mode of the IMM, an initial state comprising a plurality of initial position estimates for the aerial UE. The exemplary method can also include the operations of block 2250, in which the first RAN node can determine a movement state for the aerial UE at a first time based on the determined initialization parameters and positioning measurements of the aerial UE that are performed in the cell and in at least a portion of the neighbor cells.

In some embodiments, the determining operations in block 2230 can include the operations of sub-block 2231, where the first RAN node can select the plurality of neighbor cells in the RAN based on one or more of the following criteria:

least distance from the center of the cell serving the aerial UE;
antenna coverage in the direction of the center of the cell serving the aerial UE; and
randomly from a number of suitable neighbor cells that is greater than the plurality.

Figure 17A:
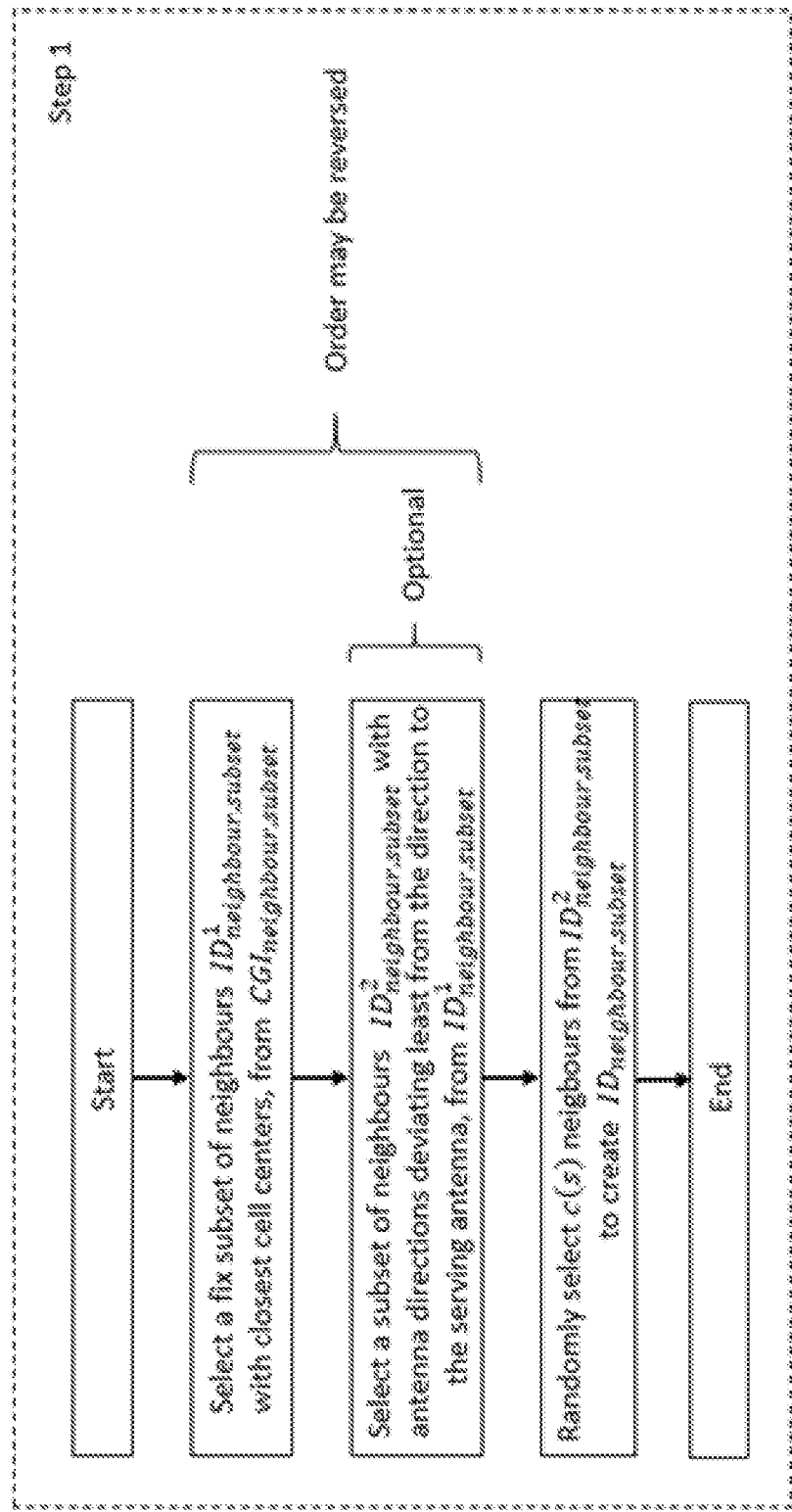
FIGS. 17A-C, shows various operations of a neighbor cell selection procedure, according to various exemplary embodiments of the present disclosure.

An example of these embodiments is shown in FIG. 17A, discussed above.

Figure 17B:
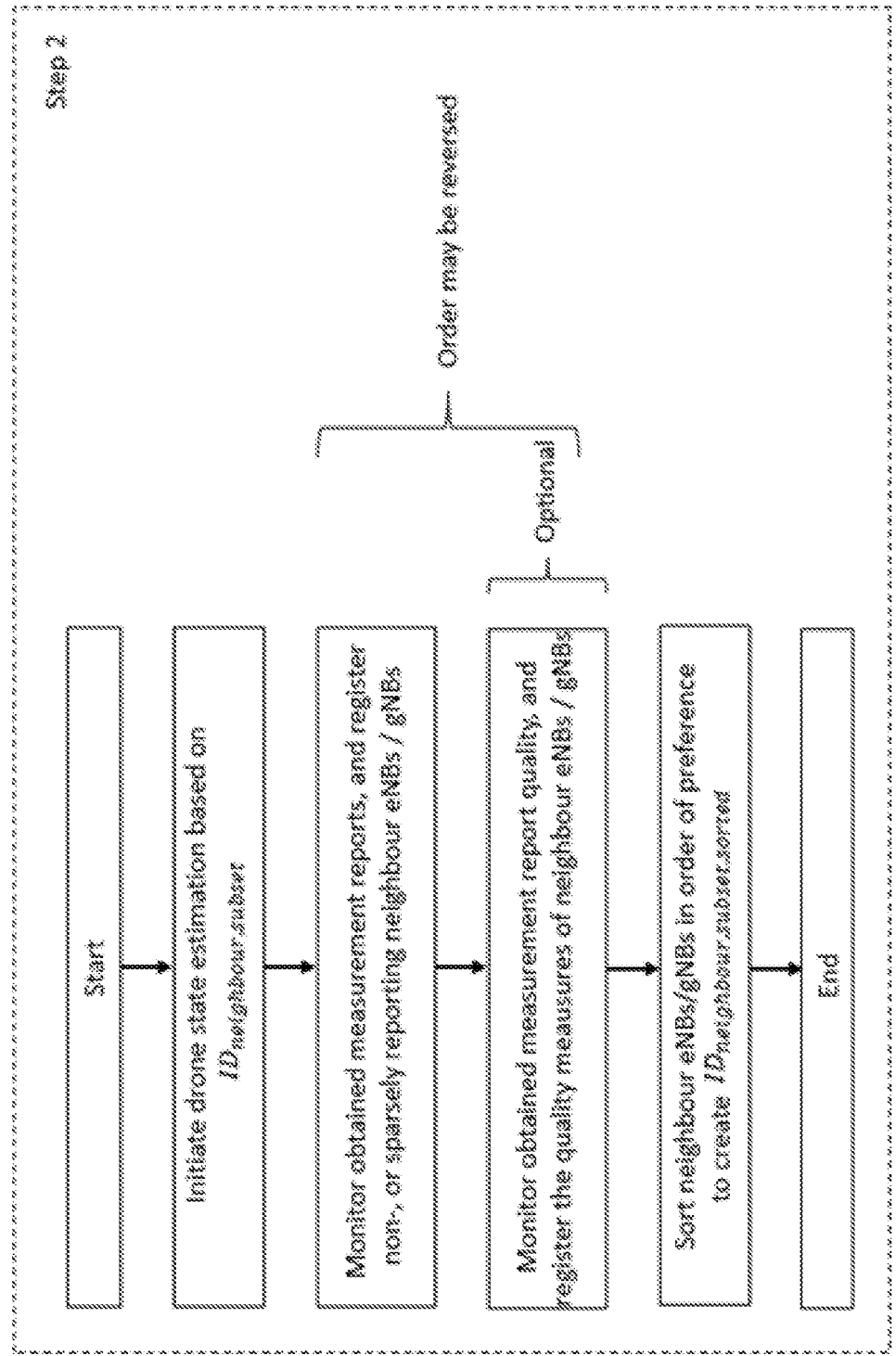
Figure 17C:
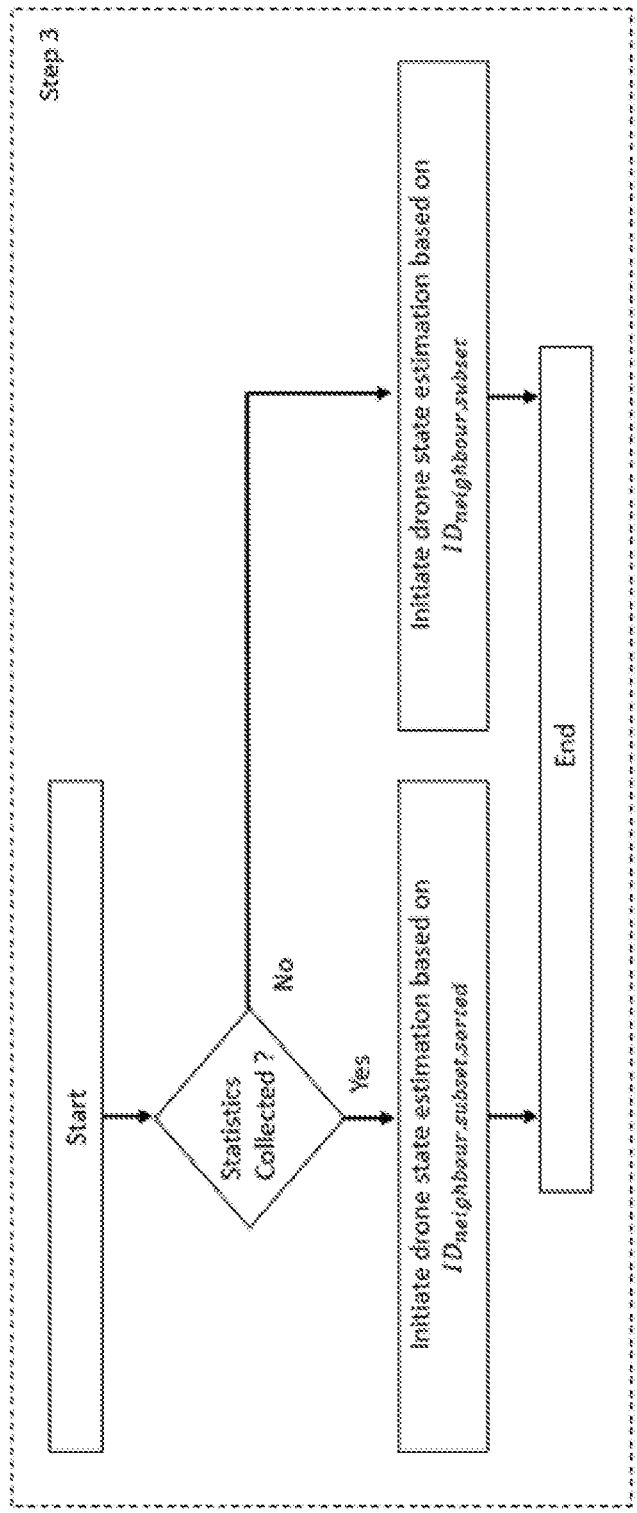

In some embodiments, the exemplary method can also include the operations of block 2260-2270. In block 2260, the first RAN node can receive, at each of one or more second times, positioning measurements for the aerial UE performed in at least a portion of the neighbor cells. In block 2270, the first RAN node can select a subset of the neighbor cells based on one or more of the following: likelihood that each neighbor cell will report positioning measurements for the aerial UE; and quality of received positioning measurements performed in each neighbor cell. In some of these embodiments, the exemplary method can also include the operations of block 2275, where the first RAN node can determine further initialization parameters, for the IMM, that includes the selected subset of the plurality of neighbor cells that were included in the initialization parameters. Examples of these embodiments are shown in FIGS. 17B-C, discussed above.

In various embodiments, the positioning measurements include measurements of one or more of the following:

range or distance between the UE and an antenna for the cell;
range and distance between the UE and respective antennas for the neighbor cells; and
range rate or Doppler shift between the UE and respective antennas for the cell and the neighbor cells.

In some of these embodiments, the plurality of neighbor cells can include at least three neighbor cells and the positioning measurements only include range rate or Doppler shift between the UE and the respective antennas.

In some embodiments, the IMM model can include the following features:

a first model, including an almost-constant velocity model with a Doppler shift bias state,
a second model, including at least one maneuver model with a Doppler shift bias state, and
estimated probabilities associated with the first and second models.

In some embodiments, the IMM can also include a Hidden Markov Model (HMM) comprising respective transition probabilities of the aerial UE between any of the first and second models during successive updates of the movement state. In addition, each transition probability can be dependent on the duration between successive updates of the movement state. Examples of such HMMs are discussed in more detail above.

In some of these embodiments, the determining operations of block 2250 can include the operations of sub-blocks 2251-2252. In sub-block 2251, the first RAN node can determine first and second movement states for the aerial UE based on the respective first and second models. In sub-block 2252, the first RAN node can combine the first and second movement states according to estimated probabilities associated with the first and second models. In some of these embodiments, the first and second movement states can be determined using respective extended Kalman filters (EKFs), such as those discussed in more detail above.

In some of these embodiments, the second maneuver model can include a plurality of maneuver models associated with a respective plurality of initial position estimates and a respective plurality of estimated probabilities. In such embodiments, the determining operations of block 2250 can include the operations of sub-block 2253, where the first RAN node can determine states for the respective maneuver models at the first time based on the positioning measurements and the respective initial position estimates.

In some of these embodiments, the exemplary method can also include the operations of blocks 2280-2290. In block 2280, the first RAN node can determine movement states for the aerial UE at a plurality of second times after the first time, including updated states for the first model and for the respective (plurality of) maneuver models. In block 2285, the first RAN node can subsequently determine respective sums of the updated estimated probability associated with the first model and the updated estimated probabilities associated with the respective maneuver models. In other words, this can involve summing each of the maneuver model probabilities with the same almost-constant velocity model probability.

In block 2290, the first RAN node can select one of the maneuver models that has a sum within a threshold difference from unity. In this manner, the first RAN node can eliminate all but one of the maneuver modes (i.e., corresponding to different initial position estimates) for use in future updates. In some of these embodiments, the exemplary method can also include the operations of block 2295, where the first RAN node can determine a movement state for the aerial UE at a third time after the second times, including updated states only for the first model and the selected maneuver model.

In some of these embodiments (i.e., involving multiple maneuver models), the determining operations of block 2230 can include the operations of block 2232, where the first RAN node can select the plurality of initial position estimates for the plurality of maneuver models based on one or more of the following criteria:
the center of the cell serving the aerial UE;
randomly from a coordinate space of the cell serving the aerial UE;
a deterministic grid of points in the coordinate space of the cell serving the aerial UE; and
a deterministic grid of points near boundaries of the cell serving the aerial UE.
Some examples of these embodiments are shown in FIGS. 19-20, discussed above. In some of these embodiments, the coordinate space of the cell serving the UE can be bounded in altitude by a maximum altitude of the aerial UE.

In some of these embodiments, the plurality of initial position estimates (e.g., selected in sub-block 2232) can include a first number of points selected from the deterministic grid of points near boundaries of the cell serving the aerial UE, and a second number of points selected according to a different one of the criteria listed immediately above. Examples of such embodiments are shown in FIGS. 21A-B, discussed above.

In some of these embodiments, the plurality of maneuver models can also be associated with a respective plurality of initial covariance matrices. In such embodiments, the determining operations of block 2250 can include the operations of sub-block 2254, where the first RAN node can determine initial covariance matrices for the respective maneuver models at the first time based on one or more of the following: radius of the cell serving the aerial UE, maximum altitude of the aerial UE, maximum velocity of the aerial UE, and maximum acceleration of the aerial UE.

In some embodiments, the exemplary method can also include the operations of blocks 2210, 2220, and 2240. In block 2210, the first RAN node can send respective state estimation initialization messages to one or more neighbor RAN nodes serving the plurality of neighbor cells. In block 2220, the first RAN node can receive respective state estimation reports from the one or more neighbor RAN nodes. In block 2240, the first RAN node can receive, from the one or more neighbor RAN nodes, respective measurement reports including the positioning measurements for the aerial UE performed in at least a portion of the neighbor cells. An example of such operations is shown in FIG. 18, discussed above. For example, the first RAN node can determine the movement state for the UE at the first time (e.g., in block 2250) based on the measurement reports.

In some embodiments, each state estimation initialization message (e.g., sent in block 2210) can include one or more of the following: an identifier of the serving cell; scrambling code associated with the aerial UE's uplink (UL) transmission in the serving cell; and timing alignment of the aerial UE's UL transmissions in relation to the serving cell.

In some embodiments, the determining operations in block 2230 can include the operations of sub-block 2233, where the first RAN node can select the plurality of neighbor cells in the RAN based on the state estimation reports. For example, each state estimation report can include one or more of the following for at least one neighbor cell: identifier of the neighbor cell, type of antenna used for the neighbor cell, geographic location of the antenna for the neighbor cell, direction or orientation of the antenna for the neighbor cell, and downlink transmission power used in the neighbor cell.

In some embodiments, each state estimation initialization message can be sent (e.g., in block 2210) and each state estimation report can be received (e.g., in block 2220) as one of the following: a standardized message, a vendor-specific private message; or a vendor-specific information element in a standardized message.

In some embodiments, each positioning measurement received in one of the measurement reports (e.g., in block 2240) can include a measurement of Doppler shift between the UE and an antenna for a neighbor cell, and one or more of the following: cell identifier for the neighbor cell, a time at which the Doppler shift measurement was made, signal-to-interference-and-noise ratio (SINR) of the Doppler shift measurement, standard deviation of the Doppler shift measurement, and variance of the Doppler shift measurement.

In various embodiments, the movement state for the aerial UE (e.g., determined in block 2250) can include one or more of the following:
- three-dimensional position relative to mean sea level;
- three-dimensional position relative to local ground level;
- two-dimensional position;
- three-dimensional velocity; and
- two-dimensional velocity.

In some embodiments, the movement state for the aerial UE can also include a Doppler shift bias.

In addition, FIG. 23 shows a flow diagram of an exemplary method (e.g., procedure) for a second RAN node, according to various exemplary embodiments of the present disclosure. The exemplary method can be performed by a RAN node (e.g., base station, eNB, gNB, ng-eNB, en-gNB, etc., or component thereof) serving one or more neighbor cells of a cell serving an aerial UE in the RAN (e.g., E-UTRAN, NG-RAN).

The exemplary method can include the operations of block 2310, where the second RAN node can receive, from a first RAN node serving the cell (i.e., the cell serving the aerial UE), a state estimation initialization message indicating that positioning measurements should be made for the aerial UE in the one or more neighbor cells (i.e., the cells served by the second RAN node). The exemplary method can also include the operations of block 2320, where the second RAN node can send, to the first RAN node, a state estimation report including one or more of the following for each of the one or more neighbor cells: identifier of the neighbor cell, type of antenna used for the neighbor cell, geographic location of the antenna for the neighbor cell, direction or orientation of the antenna for the neighbor cell, and downlink transmission power used in the neighbor cell.

In some embodiments, the exemplary method can also include the operations of blocks 2330-2340. In block 2330, the second RAN node can perform the positioning measurements (e.g., indicated in block 2210) for the aerial UE in the one or more neighbor cells. In block 2340, the first RAN node can send, to the first RAN node, a measurement report including the positioning measurements for the aerial UE in the one or more neighbor cells.

In some embodiments, each state estimation initialization message (e.g., received in block 2310) can include one or more of the following: an identifier of the serving cell; scrambling code associated with the aerial UE's uplink (UL) transmission in the serving cell; and timing alignment of the aerial UE's UL transmissions in relation to the serving cell. In such embodiments, performing the indicated positioning measurements (e.g., in block 2330) can be based on the scrambling code and/or the timing alignment.

In some embodiments, the positioning measurements can include measurements of one or more of the following:
- range and distance between the UE and respective antennas for the neighbor cells; and
- range rate or Doppler shift between the UE and respective antennas for the neighbor cells.

In some embodiments, each positioning measurement (e.g., sent in block 2340) can include a measurement of Doppler shift between the UE and an antenna for a neighbor cell, and one or more of the following: cell identifier for the neighbor cell, a time at which the Doppler shift measurement was made, signal-to-interference-and-noise ratio (SINR) of the Doppler shift measurement, standard deviation of the Doppler shift measurement, and variance of the Doppler shift measurement.

In some embodiments, each state estimation initialization message can be received (e.g., in block 2310) and each state estimation report can be sent (e.g., in block 2320) as one of the following: a standardized message, a vendor-specific private message; or a vendor-specific information element in a standardized message.

Although various embodiments are described above in terms of methods, techniques, and/or procedures, the person of ordinary skill will readily comprehend that such methods, techniques, and/or procedures can be embodied by various combinations of hardware and software in various systems, communication devices, computing devices, control devices, apparatuses, non-transitory computer-readable media, computer program products, etc.

Figure 24:
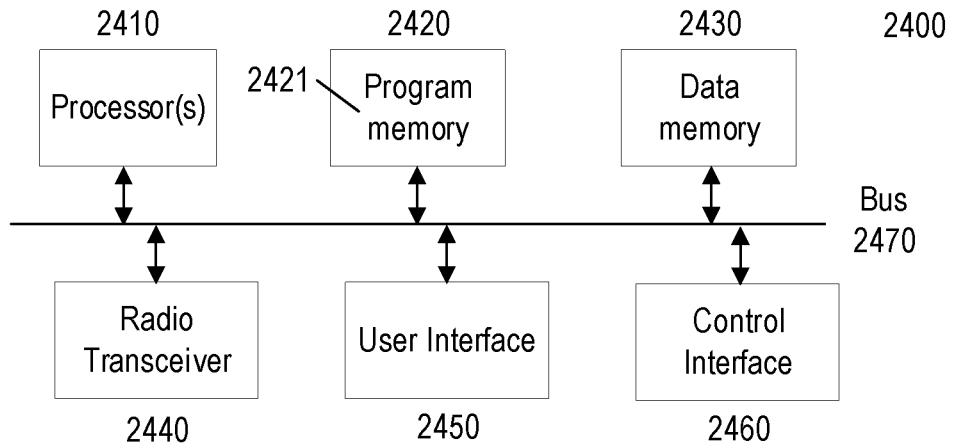
FIG. 24 shows a block diagram of an exemplary wireless device or UE, according to various exemplary embodiments of the present disclosure.

FIG. 24 shows a block diagram of an exemplary wireless device or user equipment (UE) 2400 (hereinafter referred to as "UE 2400") according to various embodiments of the present disclosure, including those described above with reference to other figures. For example, UE 2400 can be configured by execution of instructions, stored on a computer-readable medium, to perform operations corresponding to one or more of the exemplary methods and/or procedures described above.

UE 2400 can include a processor 2410 (also referred to as "processing circuitry") that can be operably connected to a program memory 2420 and/or a data memory 2430 via a bus 2470 that can comprise parallel address and data buses, serial ports, or other methods and/or structures known to those of ordinary skill in the art. Program memory 2420 can store software code, programs, and/or instructions (collectively shown as computer program product 2421 in FIG. 24) that, when executed by processor 2410, can configure and/or facilitate UE 2400 to perform various operations, including operations described below. For example, execution of such instructions can configure and/or facilitate UE 2400 to communicate using one or more wired or wireless communication protocols, including one or more wireless communication protocols standardized by 3GPP, 3GPP2, or IEEE, such as those commonly known as 5G/NR, LTE, LTE-A, UMTS, HSPA, GSM, GPRS, EDGE, 1×RTT, CDMA2000, 802.11 WiFi, HDMI, USB, Firewire, etc., or any other current or future protocols that can be utilized in conjunction with radio transceiver 2440, user interface 2450, and/or control interface 2460.

As another example, processor 2410 can execute program code stored in program memory 2420 that corresponds to MAC, RLC, PDCP, and RRC layer protocols standardized by 3GPP (e.g., for NR and/or LTE). As a further example, processor 2410 can execute program code stored in program memory 2420 that, together with radio transceiver 2440, implements corresponding PHY layer protocols, such as Orthogonal Frequency Division Multiplexing (OFDM), Orthogonal Frequency Division Multiple Access (OFDMA), and Single-Carrier Frequency Division Multiple Access (SC-FDMA). As another example, processor 2410 can execute program code stored in program memory 2420 that, together with radio transceiver 2440, implements device-to-device (D2D) communications with other compatible devices and/or UEs.

Program memory 2420 can also include software code executed by processor 2410 to control the functions of UE 2400, including configuring and controlling various components such as radio transceiver 2440, user interface 2450, and/or host interface 2460. Program memory 2420 can also comprise one or more application programs and/or modules comprising computer-executable instructions embodying any of the exemplary methods and/or procedures described herein. Such software code can be specified or written using any known or future developed programming language, such as e.g., Java, C++, C, Objective C, HTML, XHTML, machine code, and Assembler, as long as the desired functionality, e.g., as defined by the implemented method steps, is preserved. In addition, or as an alternative, program memory 2420 can comprise an external storage arrangement (not shown) remote from UE 2400, from which the instructions can be downloaded into program memory 2420 located within or removably coupled to UE 2400, so as to enable execution of such instructions.

Data memory 2430 can include memory area for processor 2410 to store variables used in protocols, configuration, control, and other functions of UE 2400, including operations corresponding to, or comprising, any of the exemplary methods and/or procedures described herein. Moreover, program memory 2420 and/or data memory 2430 can include non-volatile memory (e.g., flash memory), volatile memory (e.g., static or dynamic RAM), or a combination thereof. Furthermore, data memory 2430 can comprise a memory slot by which removable memory cards in one or more formats (e.g., SD Card, Memory Stick, Compact Flash, etc.) can be inserted and removed.

Persons of ordinary skill will recognize that processor 2410 can include multiple individual processors (including, e.g., multi-core processors), each of which implements a portion of the functionality described above. In such cases, multiple individual processors can be commonly connected to program memory 2420 and data memory 2430 or individually connected to multiple individual program memories and or data memories. More generally, persons of ordinary skill in the art will recognize that various protocols and other functions of UE 2400 can be implemented in many different computer arrangements comprising different combinations of hardware and software including, but not limited to, application processors, signal processors, general-purpose processors, multi-core processors, ASICs, fixed and/or programmable digital circuitry, analog baseband circuitry, radio-frequency circuitry, software, firmware, and middleware.

Radio transceiver 2440 can include radio-frequency transmitter and/or receiver functionality that facilitates the UE 2400 to communicate with other equipment supporting like wireless communication standards and/or protocols. In some exemplary embodiments, the radio transceiver 2440 includes one or more transmitters and one or more receivers that enable UE 2400 to communicate according to various protocols and/or methods proposed for standardization by 3GPP and/or other standards bodies. For example, such functionality can operate cooperatively with processor 2410 to implement a PHY layer based on OFDM, OFDMA, and/or SC-FDMA technologies, such as described herein with respect to other figures.

In some exemplary embodiments, radio transceiver 2440 includes one or more transmitters and one or more receivers that can facilitate the UE 2400 to communicate with various LTE, LTE-Advanced (LTE-A), and/or NR networks according to standards promulgated by 3GPP. In some exemplary embodiments of the present disclosure, the radio transceiver 2440 includes circuitry, firmware, etc. necessary for the UE 2400 to communicate with various NR, NR-U, LTE, LTE-A, LTE-LAA, UMTS, and/or GSM/EDGE networks, also according to 3GPP standards. In some embodiments, radio transceiver 2440 can include circuitry supporting D2D communications between UE 2400 and other compatible devices.

In some embodiments, radio transceiver 2440 includes circuitry, firmware, etc. necessary for the UE 2400 to communicate with various CDMA2000 networks, according to 3GPP2 standards. In some embodiments, the radio transceiver 2440 can be capable of communicating using radio technologies that operate in unlicensed frequency bands, such as IEEE 802.11 WiFi that operates using frequencies in the regions of 2.4, 5.6, and/or 60 GHz. In some embodiments, radio transceiver 2440 can include a transceiver that is capable of wired communication, such as by using IEEE 802.3 Ethernet technology. The functionality particular to each of these embodiments can be coupled with and/or controlled by other circuitry in the UE 2400, such as the processor 2410 executing program code stored in program memory 2420 in conjunction with, and/or supported by, data memory 2430.

User interface 2450 can take various forms depending on the particular embodiment of UE 2400, or can be absent from UE 2400 entirely. In some embodiments, user interface 2450 can comprise a microphone, a loudspeaker, slidable buttons, depressible buttons, a display, a touchscreen display, a mechanical or virtual keypad, a mechanical or virtual keyboard, and/or any other user-interface features commonly found on mobile phones. In other embodiments, the UE 2400 can comprise a tablet computing device including a larger touchscreen display. In such embodiments, one or more of the mechanical features of the user interface 2450 can be replaced by comparable or functionally equivalent virtual user interface features (e.g., virtual keypad, virtual buttons, etc.) implemented using the touchscreen display, as familiar to persons of ordinary skill in the art. In other embodiments, the UE 2400 can be a digital computing device, such as a laptop computer, desktop computer, workstation, etc. that comprises a mechanical keyboard that can be integrated, detached, or detachable depending on the particular exemplary embodiment. Such a digital computing device can also comprise a touch screen display. Many exemplary embodiments of the UE 2400 having a touch screen display are capable of receiving user inputs, such as inputs related to exemplary methods and/or procedures described herein or otherwise known to persons of ordinary skill in the art.

In some embodiments, UE 2400 can include an orientation sensor, which can be used in various ways by features and functions of UE 2400. For example, the UE 2400 can use outputs of the orientation sensor to determine when a user has changed the physical orientation of the UE 2400's touch screen display. An indication signal from the orientation sensor can be available to any application program executing on the UE 2400, such that an application program can change the orientation of a screen display (e.g., from portrait to landscape) automatically when the indication signal indicates an approximate 90-degree change in physical orientation of the device. In this exemplary manner, the application program can maintain the screen display in a manner that is readable by the user, regardless of the physical orientation of the device. In addition, the output of the orientation sensor can be used in conjunction with various exemplary embodiments of the present disclosure.

A control interface 2460 of the UE 2400 can take various forms depending on the particular exemplary embodiment of UE 2400 and of the particular interface requirements of other devices that the UE 2400 is intended to communicate with and/or control. For example, the control interface 2460 can comprise an RS-232 interface, a USB interface, an HDMI interface, a Bluetooth interface, an IEEE ("Firewire") interface, an I²C interface, a PCMCIA interface, or the like. In some exemplary embodiments of the present disclosure, control interface 2460 can comprise an IEEE 802.3 Ethernet interface such as described above. In some exemplary embodiments of the present disclosure, the control interface 2460 can comprise analog interface circuitry including, for example, one or more digital-to-analog (D/A) and/or analog-to-digital (A/D) converters.

Persons of ordinary skill in the art can recognize the above list of features, interfaces, and radio-frequency communication standards is merely exemplary, and not limiting to the scope of the present disclosure. In other words, the UE 2400 can comprise more functionality than is shown in FIG. 24 including, for example, a video and/or still-image camera, microphone, media player and/or recorder, etc. Moreover, radio transceiver 2440 can include circuitry necessary to communicate using additional radio-frequency communication standards including Bluetooth, GPS, and/or others. Moreover, the processor 2410 can execute software code stored in the program memory 2420 to control such additional functionality. For example, directional velocity and/or position estimates output from a GPS receiver can be available to any application program executing on the UE 2400, including various exemplary methods and/or computer-readable media according to various exemplary embodiments of the present disclosure.

Figure 25:
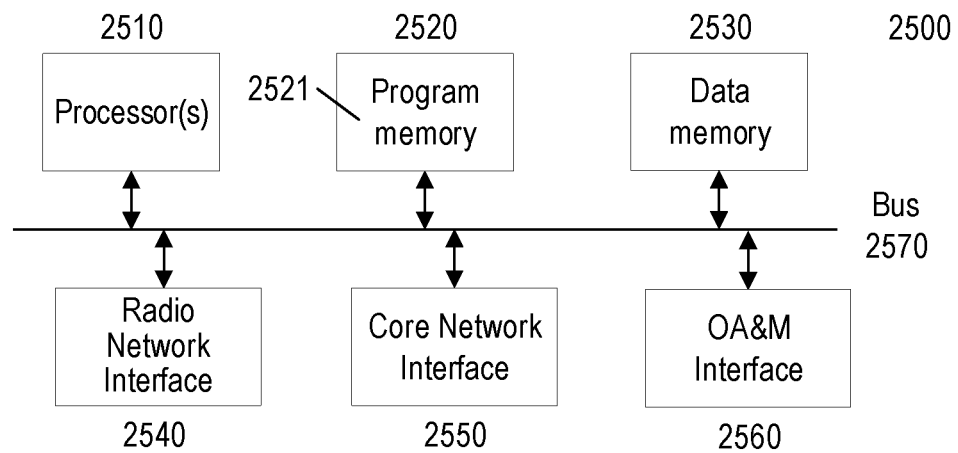
FIG. 25 shows a block diagram of an exemplary network node, according to various exemplary embodiments of the present disclosure.

FIG. 25 shows a block diagram of an exemplary network node 2500 according to various embodiments of the present disclosure, including those described above with reference to other figures. For example, exemplary network node 2500 can be configured by execution of instructions, stored on a computer-readable medium, to perform operations corresponding to one or more of the exemplary methods and/or procedures described above. In some exemplary embodiments, network node 2500 can comprise a base station, eNB, gNB, or one or more components thereof. For example, network node 2500 can be configured as a central unit (CU) and one or more distributed units (DUs) according to NR gNB architectures specified by 3GPP. More generally, the functionally of network node 2500 can be distributed across various physical devices and/or functional units, modules, etc.

Network node 2500 can include processor 2510 (also referred to as "processing circuitry") that is operably connected to program memory 2520 and data memory 2530 via bus 2570, which can include parallel address and data buses, serial ports, or other methods and/or structures known to those of ordinary skill in the art.

Program memory 2520 can store software code, programs, and/or instructions (collectively shown as computer program product 2521 in FIG. 25) that, when executed by processor 2510, can configure and/or facilitate network node 2500 to perform various operations. For example, execution of such stored instructions can configure network node 2500 to communicate with one or more other devices using protocols according to various embodiments of the present disclosure, including one or more exemplary methods and/or procedures discussed above. Program memory 2520 can also comprise software code executed by processor 2510 that can facilitate and specifically configure network node 2500 to communicate with one or more other devices using other protocols or protocol layers, such as one or more of the PHY, MAC, RLC, PDCP, and RRC layer protocols standardized by 3GPP for LTE, LTE-A, and/or NR, or any other higher-layer protocols utilized in conjunction with radio network interface 2540 and core network interface 2550. By way of example and without limitation, core network interface 2550 can comprise the S1 interface and radio network interface 2540 can comprise the Uu interface, as standardized by 3GPP. Program memory 2520 can further comprise software code executed by processor 2510 to control the functions of network node 2500, including configuring and controlling various components such as radio network interface 2540 and core network interface 2550.

Data memory 2530 can comprise memory area for processor 2510 to store variables used in protocols, configuration, control, and other functions of network node 2500. As such, program memory 2520 and data memory 2530 can comprise non-volatile memory (e.g., flash memory, hard disk, etc.), volatile memory (e.g., static or dynamic RAM), network-based (e.g., "cloud") storage, or a combination thereof. Persons of ordinary skill in the art will recognize that processor 2510 can include multiple individual processors (not shown), each of which implements a portion of the functionality described above. In such case, multiple individual processors may be commonly connected to program memory 2520 and data memory 2530 or individually connected to multiple individual program memories and/or data memories. More generally, persons of ordinary skill will recognize that various protocols and other functions of network node 2500 may be implemented in many different combinations of hardware and software including, but not limited to, application processors, signal processors, general-purpose processors, multi-core processors, ASICs, fixed digital circuitry, programmable digital circuitry, analog baseband circuitry, radio-frequency circuitry, software, firmware, and middleware.

Radio network interface 2540 can comprise transmitters, receivers, signal processors, ASICs, antennas, beamforming units, and other circuitry that enables network node 2500 to communicate with other equipment such as, in some embodiments, a plurality of compatible user equipment (UE). In some embodiments, interface 2540 can also enable network node 2500 to communicate with compatible satellites of a satellite communication network. In some exemplary embodiments, radio network interface 2540 can comprise various protocols or protocol layers, such as the PHY, MAC, RLC, PDCP, and/or RRC layer protocols standardized by 3GPP for LTE, LTE-A, LTE-LAA, NR, NR-U, etc.; improvements thereto such as described herein above; or any other higher-layer protocols utilized in conjunction with radio network interface 2540. According to further exemplary embodiments of the present disclosure, the radio network interface 2540 can comprise a PHY layer based on OFDM, OFDMA, and/or SC-FDMA technologies. In some embodiments, the functionality of such a PHY layer can be provided cooperatively by radio network interface 2540 and processor 2510 (including program code in memory 2520).

Core network interface 2550 can comprise transmitters, receivers, and other circuitry that enables network node 2500 to communicate with other equipment in a core network such as, in some embodiments, circuit-switched (CS) and/or packet-switched Core (PS) networks. In some embodiments, core network interface 2550 can comprise the S1 interface standardized by 3GPP. In some embodiments, core network interface 2550 can comprise the NG interface standardized by 3GPP. In some exemplary embodiments, core network interface 2550 can comprise one or more interfaces to one or more AMFs, SMFs, SGWs, MMES, SGSNs, GGSNs, and other physical devices that comprise functionality found in GERAN, UTRAN, EPC, 5GC, and CDMA2000 core networks that are known to persons of ordinary skill in the art. In some embodiments, these one or more interfaces may be multiplexed together on a single physical interface. In some embodiments, lower layers of core network interface 2550 can comprise one or more of asynchronous transfer mode (ATM), Internet Protocol (IP)-over-Ethernet, SDH over optical fiber, T1/E1/PDH over a copper wire, microwave radio, or other wired or wireless transmission technologies known to those of ordinary skill in the art.

In some embodiments, network node 2500 can include hardware and/or software that configures and/or facilitates network node 2500 to communicate with other network nodes in a RAN, such as with other eNBs, gNBs, ng-eNBs, en-gNBs, IAB nodes, etc. Such hardware and/or software can be part of radio network interface 2540 and/or core network interface 2550, or it can be a separate functional unit (not shown). For example, such hardware and/or software can configure and/or facilitate network node 2500 to communicate with other RAN nodes via the X2 or Xn interfaces, as standardized by 3GPP.

OA&M interface 2560 can comprise transmitters, receivers, and other circuitry that enables network node 2500 to communicate with external networks, computers, databases, and the like for purposes of operations, administration, and maintenance of network node 2500 or other network equipment operably connected thereto. Lower layers of OA&M interface 2560 can comprise one or more of asynchronous transfer mode (ATM), Internet Protocol (IP)-over-Ethernet, SDH over optical fiber, T1/E1/PDH over a copper wire, microwave radio, or other wired or wireless transmission technologies known to those of ordinary skill in the art. Moreover, in some embodiments, one or more of radio network interface 2540, core network interface 2550, and OA&M interface 2560 may be multiplexed together on a single physical interface, such as the examples listed above.

Figure 26:
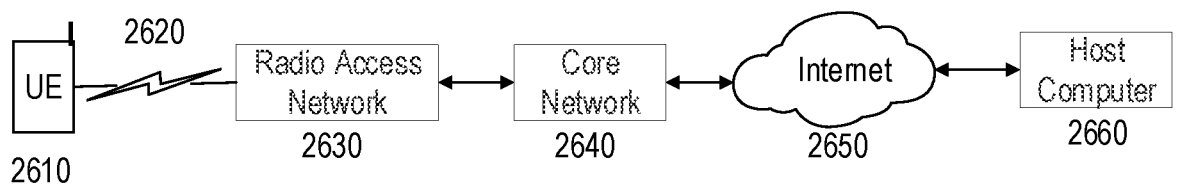
FIG. 26 shows a block diagram of an exemplary network configured to provide over-the-top (OTT) data services between a host computer and a UE, according to various exemplary embodiments of the present disclosure.

FIG. 26 is a block diagram of an exemplary communication network configured to provide over-the-top (OTT) data services between a host computer and a user equipment (UE), according to one or more exemplary embodiments of the present disclosure. UE 2610 can communicate with radio access network (RAN) 2630 over radio interface 2620, which can be based on protocols described above including, e.g., LTE, LTE-A, and 5G/NR. For example, UE 2610 can be configured and/or arranged as shown in other figures discussed above.

RAN 2630 can include one or more terrestrial network nodes (e.g., base stations, eNBs, gNBs, controllers, etc.) operable in licensed spectrum bands, as well one or more network nodes operable in unlicensed spectrum (using, e.g., LAA or NR-U technology), such as a 2.4-GHz band and/or a 5-GHz band. In such cases, the network nodes comprising RAN 2630 can cooperatively operate using licensed and unlicensed spectrum. In some embodiments, RAN 2630 can include, or be capable of communication with, one or more satellites comprising a satellite access network.

RAN 2630 can further communicate with core network 2640 according to various protocols and interfaces described above. For example, one or more apparatus (e.g., base stations, eNBs, gNBs, etc.) comprising RAN 2630 can communicate to core network 2640 via core network interface 1650 described above. In some exemplary embodiments, RAN 2630 and core network 2640 can be configured and/or arranged as shown in other figures discussed above. For example, eNBs comprising an E-UTRAN 2630 can communicate with an EPC core network 2640 via an S1 interface, such as shown in FIG. 1. As another example, gNBs comprising a NR RAN 2630 can communicate with a 5GC core network 2630 via an NG interface.

Core network 2640 can further communicate with an external packet data network, illustrated in FIG. 26 as Internet 2650, according to various protocols and interfaces known to persons of ordinary skill in the art. Many other devices and/or networks can also connect to and communicate via Internet 2650, such as exemplary host computer 2660. In some exemplary embodiments, host computer 2660 can communicate with UE 2610 using Internet 2650, core network 2640, and RAN 2630 as intermediaries. Host computer 2660 can be a server (e.g., an application server) under ownership and/or control of a service provider. Host computer 2660 can be operated by the OTT service provider or by another entity on the service provider's behalf.

For example, host computer 2660 can provide an over-the-top (OTT) packet data service to UE 2610 using facilities of core network 2640 and RAN 2630, which can be unaware of the routing of an outgoing/incoming communication to/from host computer 2660. Similarly, host computer 2660 can be unaware of routing of a transmission from the host computer to the UE, e.g., the routing of the transmission through RAN 2630. Various OTT services can be provided using the exemplary configuration shown in FIG. 26 including, e.g., streaming (unidirectional) audio and/or video from host computer to UE, interactive (bidirectional) audio and/or video between host computer and UE, interactive messaging or social communication, interactive virtual or augmented reality, etc.

The exemplary network shown in FIG. 26 can also include measurement procedures and/or sensors that monitor network performance metrics including data rate, latency and other factors that are improved by exemplary embodiments disclosed herein. The exemplary network can also include functionality for reconfiguring the link between the endpoints (e.g., host computer and UE) in response to variations in the measurement results. Such procedures and functionalities are known and practiced; if the network hides or abstracts the radio interface from the OTT service provider, measurements can be facilitated by proprietary signaling between the UE and the host computer.

The exemplary embodiments described herein provide techniques for generating and configuring (e.g., via signaling) a set of neighbor RAN nodes for measurement and reporting of range- and range rate-related measurements for aerial UEs operation in a RAN (e.g., RAN 2630). Embodiments also include techniques for initialization of an interacting multiple-model (IMM) state estimator in multiple points of the serving cell for an aerial UE. When used in RAN nodes (e.g., gNBs comprising RAN 2630), exemplary embodiments described herein can provide various improvements, benefits, and/or advantages to OTT service providers and end-users, including better detection of unauthorized aerial UE operation, which can reduce service interruptions, interference, and/or other reductions in user experience due to "rogue drones."

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, and procedures that, although not explicitly shown or described herein, embody the principles of the disclosure and can be thus within the spirit and scope of the disclosure. Various exemplary embodiments can be used together with one another, as well as interchangeably therewith, as should be understood by those having ordinary skill in the art.

The term unit, as used herein, can have conventional meaning in the field of electronics, electrical devices and/or electronic devices and can include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

As described herein, device and/or apparatus can be represented by a semiconductor chip, a chipset, or a (hardware) module comprising such chip or chipset; this, however, does not exclude the possibility that a functionality of a device or apparatus, instead of being hardware implemented, be implemented as a software module such as a computer program or a computer program product comprising executable software code portions for execution or being run on a processor. Furthermore, functionality of a device or apparatus can be implemented by any combination of hardware and software. A device or apparatus can also be regarded as an assembly of multiple devices and/or apparatuses, whether functionally in cooperation with or independently of each other. Moreover, devices and apparatuses can be implemented in a distributed fashion throughout a system, so long as the functionality of the device or apparatus is preserved. Such and similar principles are considered as known to a skilled person.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In addition, certain terms used in the present disclosure, including the specification, drawings and exemplary embodiments thereof, can be used synonymously in certain instances, including, but not limited to, e.g., data and information. It should be understood that, while these words and/or other words that can be synonymous to one another, can be used synonymously herein, that there can be instances when such words can be intended to not be used synonymously. Further, to the extent that the prior art knowledge has not been explicitly incorporated by reference herein above, it is explicitly incorporated herein in its entirety. All publications referenced are incorporated herein by reference in their entireties.

The invention claimed is:

1. A method for estimating movement of an aerial user equipment (UE) by a first radio access network (RAN) node serving the aerial UE in a cell of the RAN, the method comprising:
   determining initialization parameters for an interacting multiple-model (IMM) for movement of the aerial UE in the cell, wherein the determined initialization parameters include one or more of the following:
      a plurality of neighbor cells, in the RAN, in which positioning measurements should be performed for the aerial UE, and
      for at least one movement mode of the IMM, an initial state comprising a plurality of initial position estimates for the aerial UE; and
   determining a movement state for the aerial UE at a first time based on:
      the determined initialization parameters, and
      positioning measurements of the aerial UE that are performed in the cell and in at least a portion of the neighbor cells.

2. The method of claim 1, wherein determining the initialization parameters comprises selecting the plurality of neighbor cells in the RAN based on one or more of the following criteria:
   least distance from the center of the cell serving the aerial UE;
   antenna coverage in the direction of the center of the cell serving the aerial UE; and
   randomly from a number of suitable neighbor cells that is greater than the plurality.

3. The method of claim 1, further comprising:
   receiving, at each of one or more second times, positioning measurements for the aerial UE performed in at least a portion of the neighbor cells; and
   selecting a subset of the neighbor cells based on one or more of the following:
      likelihood that each neighbor cell will report positioning measurements for the aerial UE; and
      quality of received positioning measurements performed in each neighbor cell.

4. The method of claim 3, further comprising determining further initialization parameters, for the IMM, that include the selected subset of the plurality of neighbor cells that were included in the initialization parameters.

5. The method of claim 1, wherein the positioning measurements include measurements of one or more of the following:
   range or distance between the UE and an antenna for the cell;
   range or distance between the UE and respective antennas for the neighbor cells; and
   range rate or Doppler shift between the UE and respective antennas for the cell and the neighbor cells.

6. The method of claim 5, wherein:
   the plurality of neighbor cells include at least three neighbor cells; and
   the positioning measurements only include range rate or Doppler shift between the UE and the respective antennas for the cell and the neighbor cells.

7. The method of claim 1, wherein the IMM model includes:
   a first model, including an almost-constant velocity model with a Doppler shift bias state,
   a second model, including at least one maneuver model with a Doppler shift bias state, and estimated probabilities associated with the first and second models.

8. The method of claim 7, wherein:
the IMM model also includes a Hidden Markov Model (HMM) comprising respective transition probabilities of the aerial UE between any of the first and second models during successive updates of the movement state; and
each transition probability is dependent on the duration between successive updates of the movement state.

9. The method of claim 7, wherein determining the movement state for the aerial UE at the first time comprises:
determining first and second movement states for the aerial UE based on the respective first and second models; and
combining the first and second movement states according to estimated probabilities associated with the first and second models.

10. The method of claim 8, wherein the first and second movement states are determined using respective extended Kalman filters (EKFs).

11. The method of claim 8, wherein:
the second model includes a plurality of maneuver models associated with a respective plurality of initial position estimates and a respective plurality of estimated probabilities; and
determining the movement state for the aerial UE at the first time comprises determining states for the respective maneuver models at the first time based on the positioning measurements and the respective initial position estimates.

12. The method of claim 11, further comprising:
determining movement states for the aerial UE at a plurality of second times after the first time, including updated states for the first model and for the respective maneuver models;
subsequently determining respective sums of the updated estimated probability associated with the first model with the respective updated estimated probabilities associated with the respective maneuver models; and
selecting one of the maneuver models for which the determined sum is within a threshold difference from unity.

13. The method of claim 12, further comprising determining a movement state for the aerial UE at a third time after the second times, including updated states only for the first model and the selected maneuver model.

14. The method of claim 12, wherein determining the initial state for the IMM comprises selecting the plurality of initial position estimates for the plurality of maneuver models based on one or more of the following criteria:
the center of the cell serving the aerial UE;
randomly from a coordinate space of the cell serving the aerial UE;
a deterministic grid of points in the coordinate space of the cell serving the aerial UE; and
a deterministic grid of points near boundaries of the cell serving the aerial UE.

15. The method of claim 14, wherein the plurality of initial position estimates include:
a first number of points selected from the deterministic grid of points near boundaries of the cell serving the aerial UE, and
a second number of points selected according to a different one of the criteria.

16. The method of claim 14, wherein the coordinate space of the cell serving the UE is bounded in altitude by a maximum altitude of the aerial UE.

17. The method of claim 12, wherein:
the plurality of maneuver models are also associated with a respective plurality of initial covariance matrices; and
determining the movement state for the aerial UE at the first time comprises determining initial covariance matrices for the respective maneuver models at the first time based on one or more of the following:
radius of the cell serving the aerial UE,
maximum altitude of the aerial UE,
maximum velocity of the aerial UE, and
maximum acceleration of the aerial UE.

18. The method of claim 1, further comprising:
sending respective state estimation initialization messages to one or more neighbor RAN nodes serving the plurality of neighbor cells;
receiving respective state estimation reports from the one or more neighbor RAN nodes; and
receiving, from the one or more neighbor RAN nodes, respective measurement reports including the positioning measurements for the aerial UE performed in at least a portion of the neighbor cells.

19. A method for a second radio access network (RAN) node configured to serve one or more neighbor cells of a cell serving an aerial user equipment (UE) in the RAN, the method comprising:
receiving, from a first RAN node serving the cell, a state estimation initialization message indicating that positioning measurements should be made for the aerial UE in the one or more neighbor cells; and
sending, to the first RAN node, a state estimation report including one or more of the following for each of the one or more neighbor cells:
identifier of the neighbor cell,
type of antenna used for the neighbor cell,
geographic location of the antenna for the neighbor cell,
direction or orientation of the antenna for the neighbor cell, and
downlink transmission power used in the neighbor cell.

20. The method of claim 19, further comprising:
performing the indicated positioning measurements for the aerial UE in the one or more neighbor cells; and
sending, to the first RAN node, a measurement report including the positioning measurements for the aerial UE in the one or more neighbor cells.

21. A first radio access network (RAN) node configured to estimate movement of an aerial user equipment (UE) in a cell served by the first RAN node, the first RAN node comprising:
communication interface circuitry configured to communicate with one or more neighbor RAN nodes; and
processing circuitry operably coupled to the communication interface circuitry, whereby the processing circuitry and the communication interface circuitry are configured to perform operations corresponding to the method of claim 1.

22. A non-transitory, computer-readable medium storing computer-executable instructions that, when executed by processing circuitry of a first radio access network (RAN) node configured to estimate movement of an aerial user equipment (UE) in a cell served by the first RAN node, configure the first RAN node to perform operations corresponding to the method of claim 1.

23. A second radio access network (RAN) node configured to serve one or more neighbor cells of a cell serving an aerial user equipment (UE) in the RAN, the second RAN node comprising:
- communication interface circuitry configured to communicate with a first RAN node serving the cell; and
- processing circuitry operably coupled to the communication interface circuitry, whereby the processing circuitry and the communication interface circuitry are configured to perform operations corresponding to the method of claim 19.

24. A non-transitory, computer-readable medium storing computer-executable instructions that, when executed by processing circuitry of a second radio access network (RAN) node configured to serve one or more neighbor cells of a cell serving an aerial user equipment (UE), configure the second RAN node to perform operations corresponding to the method of claim 19.

\* \* \* \* \*